United States Patent
Beenau et al.

(10) Patent No.: US 7,070,112 B2
(45) Date of Patent: Jul. 4, 2006

(54) TRANSPARENT TRANSACTION DEVICE

(75) Inventors: Blayn W. Beenau, Peoria, AZ (US); David S. Bonalle, New Rochelle, NY (US); Becky Vander Eyk, Rochester Hills, MI (US); Susan E. Isenberg, London (GB); Leigh Malnati, Mountain Lakes, NJ (US); Sue Mueller, Phoenix, AZ (US); Zarita Norcross, Glendale, AZ (US); Lee J. Peart, Epsom (GB); Peter D. Saunders, Salt Lake City, UT (US); Lisa Skilling-Belmond, New York, NY (US); Lisa Webb, Darien, CT (US); John R. Williamson, Jersey City, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/708,548

(22) Filed: Mar. 10, 2004

(65) Prior Publication Data

US 2005/0040242 A1    Feb. 24, 2005

Related U.S. Application Data

(63) Continuation-in-part of application No. 10/611,563, filed on Jun. 30, 2003, and a continuation-in-part of application No. 10/394,914, filed on Mar. 21, 2003, and a continuation-in-part of application No. 10/302,658, filed on Nov. 22, 2002, now abandoned, and a continuation-in-part of application No. 10/192,488, filed on Jul. 9, 2002, said application No. 10/394,914 is a continuation-in-part of application No. 10/092,681, filed on Mar. 7, 2002, now Pat. No. 6,764,014, and a continuation-in-part of application No. 10/062,106, filed on Jan. 31, 2002, now Pat. No. 6,749,123.

(60) Provisional application No. 60/304,216, filed on Jul. 10, 2001, provisional application No. 60/171,689, filed on Dec. 21, 1999, provisional application No. 60/167,405, filed on Nov. 24, 1999, provisional application No. 60/160,519, filed on Oct. 20, 1999, provisional application No. 60/153,112, filed on Sep. 7, 1999.

(51) Int. Cl.
G02B 26/10 (2006.01)

(52) U.S. Cl. ...................................... 235/488; 235/487

(58) Field of Classification Search ................ 235/487, 235/468, 380, 445, 482, 488
See application file for complete search history.

(56) References Cited

U.S. PATENT DOCUMENTS

| | | |
|---|---|---|
| D061,466 S | 9/1922 | Foltz |
| 3,536,894 A | 10/1970 | Travioli |
| 3,573,731 A | 4/1971 | Schwend |
| 3,725,647 A | 4/1973 | Retzky |
| 3,763,356 A | 10/1973 | Berler |
| 3,829,662 A | 8/1974 | Furahashi |
| 3,838,252 A | 9/1974 | Hynes et al. |
| 3,873,813 A | 3/1975 | Lahr et al. |
| 3,894,756 A | 7/1975 | Ward |
| 3,955,295 A | 5/1976 | Mayer |
| 4,044,231 A | 8/1977 | Beck et al. |
| 4,058,839 A | 11/1977 | Darjany |
| 4,119,361 A | 10/1978 | Greenaway |
| 4,202,491 A | 5/1980 | Suzuki |
| 4,303,904 A | 12/1981 | Chasek |
| 4,361,757 A | 11/1982 | Ehrat |
| D270,546 S | 9/1983 | Malmberg |
| 4,436,991 A | 3/1984 | Albert et al. |
| 4,475,308 A | 10/1984 | Heise et al. |
| 4,504,084 A | 3/1985 | Jauch |
| D280,214 S | 8/1985 | Opel |
| 4,538,059 A | 8/1985 | Rudland |
| 4,547,002 A | 10/1985 | Colgate, Jr. |
| 4,563,024 A | 1/1986 | Blyth |
| 4,583,766 A | 4/1986 | Wessel |
| 4,593,936 A | 6/1986 | Opel |
| 4,597,814 A | 7/1986 | Colgate, Jr. |

| | | | | | |
|---|---|---|---|---|---|
| 4,639,765 A | 1/1987 | d'Hont | 5,519,381 A | 5/1996 | Marsh et al. |
| 4,641,017 A | 2/1987 | Lopata | 5,522,083 A | 5/1996 | Gove et al. |
| 4,672,021 A | 6/1987 | Blumel et al. | 5,525,992 A | 6/1996 | Froschermeier |
| 4,684,795 A | 8/1987 | Colgate, Jr. | 5,525,994 A | 6/1996 | Hurta et al. |
| 4,692,394 A | 9/1987 | Drexler | 5,530,232 A | 6/1996 | Taylor |
| 4,694,148 A | 9/1987 | Diekemper et al. | 5,541,604 A | 7/1996 | Meier |
| 4,697,073 A | 9/1987 | Hara | 5,543,798 A | 8/1996 | Schuermann |
| 4,711,690 A | 12/1987 | Haghiri-Tehrani | 5,544,246 A | 8/1996 | Mandelbaum et al. |
| 4,739,328 A | 4/1988 | Koelle et al. | 5,548,291 A | 8/1996 | Meier et al. |
| 4,779,898 A | 10/1988 | Berning et al. | 5,550,536 A | 8/1996 | Flaxl |
| 4,794,142 A | 12/1988 | Alberts et al. | 5,550,548 A | 8/1996 | Schuermann |
| 4,795,894 A | 1/1989 | Sugimoto et al. | 5,552,789 A | 9/1996 | Schuermann |
| 4,852,911 A | 8/1989 | Hoppe | 5,557,279 A | 9/1996 | d'Hont |
| 4,863,819 A | 9/1989 | Drexler et al. | 5,557,516 A | 9/1996 | Hogan |
| 4,889,366 A | 12/1989 | Fabbiani | 5,561,430 A | 10/1996 | Knebelkamp |
| D310,386 S | 9/1990 | Michels et al. | 5,563,582 A | 10/1996 | d'Hont |
| 4,961,142 A | 10/1990 | Elliott et al. | 5,569,187 A | 10/1996 | Kaiser |
| 5,010,243 A | 4/1991 | Fukushima et al. | 5,572,226 A | 11/1996 | Tuttle |
| 5,023,782 A | 6/1991 | Lutz et al. | 5,577,109 A | 11/1996 | Stimson et al. |
| 5,053,774 A | 10/1991 | Schuermann et al. | 5,581,630 A | 12/1996 | Bonneau, Jr. |
| 5,099,226 A | 3/1992 | Andrews | 5,592,150 A | 1/1997 | d'Hont |
| 5,101,200 A | 3/1992 | Swett | 5,592,405 A | 1/1997 | Gove et al. |
| 5,106,125 A | 4/1992 | Antes | 5,594,233 A | 1/1997 | Kenneth et al. |
| 5,111,033 A | 5/1992 | Fujita et al. | 5,594,448 A | 1/1997 | d'Hont |
| 5,142,383 A | 8/1992 | Mallik | 5,597,534 A | 1/1997 | Kaiser |
| 5,197,140 A | 3/1993 | Balmer | 5,600,175 A | 2/1997 | Orthmann |
| 5,212,777 A | 5/1993 | Gove et al. | 5,602,538 A | 2/1997 | Orthmann et al. |
| 5,217,844 A | 6/1993 | Fukushima et al. | 5,602,919 A | 2/1997 | Hurta et al. |
| 5,221,838 A | 6/1993 | Gutman et al. | 5,604,342 A | 2/1997 | Fujioka |
| 5,222,282 A | 6/1993 | Sukonnik et al. | 5,606,520 A | 2/1997 | Gove et al. |
| 5,226,989 A | 7/1993 | Sukonnik | 5,606,594 A | 2/1997 | Register et al. |
| 5,239,654 A | 8/1993 | Ing-Simmons et al. | 5,607,522 A | 3/1997 | McDonnell |
| 5,247,304 A | 9/1993 | d'Hont | 5,608,203 A | 3/1997 | Finkelstein et al. |
| 5,251,937 A | 10/1993 | Ojster | 5,608,406 A | 3/1997 | Eberth et al. |
| 5,256,473 A | 10/1993 | Kotani et al. | 5,608,778 A | 3/1997 | Partridge, III |
| 5,272,326 A | 12/1993 | Fujita et al. | 5,613,146 A | 3/1997 | Gove et al. |
| 5,274,392 A | 12/1993 | d'Hont et al. | 5,619,207 A | 4/1997 | d'Hont |
| 5,285,100 A | 2/1994 | Byatt | 5,621,396 A | 4/1997 | Flaxl |
| 5,300,764 A | 4/1994 | Hoshino et al. | 5,621,411 A | 4/1997 | Hagl et al. |
| 5,304,789 A | 4/1994 | Lob et al. | 5,621,412 A | 4/1997 | Sharpe et al. |
| 5,305,002 A | 4/1994 | Holodak et al. | 5,625,366 A | 4/1997 | d'Hont |
| 5,329,617 A | 7/1994 | Asal | 5,625,370 A | 4/1997 | d'Hont |
| 5,331,138 A | 7/1994 | Saroya | 5,625,695 A | 4/1997 | M'Raihi et al. |
| 5,339,447 A | 8/1994 | Balmer | 5,629,981 A | 5/1997 | Nerlikar |
| 5,349,357 A | 9/1994 | Schurmann et al. | 5,638,080 A | 6/1997 | Orthmann et al. |
| 5,351,052 A | 9/1994 | d'Hont et al. | 5,640,002 A | 6/1997 | Ruppert et al. |
| 5,351,142 A | 9/1994 | Cueli | 5,646,607 A | 7/1997 | Schuermann et al. |
| 5,355,411 A | 10/1994 | MacDonald | 5,657,388 A | 8/1997 | Weiss |
| 5,371,896 A | 12/1994 | Gove et al. | 5,660,319 A | 8/1997 | Falcone et al. |
| 5,373,303 A | 12/1994 | d'Hont | 5,673,106 A | 9/1997 | Thompson |
| 5,383,687 A | 1/1995 | Suess et al. | D384,971 S | 10/1997 | Kawan |
| 5,407,893 A | 4/1995 | Koshizuka et al. | 5,675,342 A | 10/1997 | Sharpe |
| 5,408,243 A | 4/1995 | d'Hont | 5,686,920 A | 11/1997 | Hurta et al. |
| 5,410,142 A | 4/1995 | Tsuboi et al. | 5,691,731 A | 11/1997 | van Erven |
| 5,410,649 A | 4/1995 | Gove | 5,692,132 A | 11/1997 | Hogan |
| 5,428,363 A | 6/1995 | d'Hont | 5,696,913 A | 12/1997 | Gove et al. |
| 5,453,747 A | 9/1995 | d'Hont et al. | 5,697,649 A | 12/1997 | Dames et al. |
| 5,471,592 A | 11/1995 | Gove et al. | 5,698,837 A | 12/1997 | Furuta |
| 5,485,510 A | 1/1996 | Colbert | 5,699,528 A | 12/1997 | Hogan |
| 5,488,376 A | 1/1996 | Hurta et al. | 5,700,037 A | 12/1997 | Keller |
| 5,489,411 A | 2/1996 | Jha et al. | 5,701,127 A | 12/1997 | Sharpe |
| 5,489,908 A | 2/1996 | Orthmann et al. | 5,704,046 A | 12/1997 | Hogan |
| 5,490,079 A | 2/1996 | Sharpe et al. | 5,705,798 A | 1/1998 | Tarbox |
| 5,491,483 A | 2/1996 | d'Hont | 5,720,500 A | 2/1998 | Okazaki et al. |
| 5,491,484 A | 2/1996 | Schuermann | 5,721,781 A | 2/1998 | Deo et al. |
| 5,491,715 A | 2/1996 | Flaxl | 5,729,053 A | 3/1998 | Orthmann |
| 5,493,312 A | 2/1996 | Knebelkamp | 5,729,236 A | 3/1998 | Flaxl |
| 5,497,121 A | 3/1996 | d'Hont | 5,731,957 A | 3/1998 | Brennan |
| 5,500,651 A | 3/1996 | Schuermann | 5,732,579 A | 3/1998 | d'Hont et al. |
| 5,513,525 A | 5/1996 | Schurmann | 5,748,137 A | 5/1998 | d'Hont |
| 5,514,860 A | 5/1996 | Berson | 5,748,737 A | 5/1998 | Daggar |
| 5,516,153 A | 5/1996 | Kaule | 5,758,195 A | 5/1998 | Balmer |
| 5,518,810 A | 5/1996 | Nishihara et al. | 5,761,306 A | 6/1998 | Lewis |

| | | | | | |
|---|---|---|---|---|---|
| 5,761,493 A | 6/1998 | Blakeley et al. | 5,987,155 A | 11/1999 | Dunn et al. |
| 5,768,609 A | 6/1998 | Gove et al. | 5,987,498 A | 11/1999 | Athing et al. |
| 5,774,882 A | 6/1998 | Keen et al. | 5,989,950 A | 11/1999 | Wu |
| 5,777,903 A | 7/1998 | Piosenka et al. | 5,991,608 A | 11/1999 | Leyten |
| 5,778,067 A | 7/1998 | Jones et al. | 5,991,750 A | 11/1999 | Watson |
| 5,785,680 A | 7/1998 | Niezink et al. | 5,996,076 A | 11/1999 | Rowney et al. |
| 5,786,587 A | 7/1998 | Colgate, Jr. | 6,002,438 A | 12/1999 | Hocevar et al. |
| 5,789,733 A | 8/1998 | Jachimowicz et al. | 6,002,767 A | 12/1999 | Kramer |
| 5,792,337 A | 8/1998 | Padovani et al. | 6,003,014 A | 12/1999 | Lee et al. |
| 5,793,324 A | 8/1998 | Aslanidis et al. | 6,005,942 A | 12/1999 | Chan et al. |
| 5,794,095 A | 8/1998 | Thompson | 6,006,216 A | 12/1999 | Griffin et al. |
| 5,797,060 A | 8/1998 | Thompson | 6,012,049 A | 1/2000 | Kawan |
| 5,797,085 A | 8/1998 | Beuk et al. | 6,014,645 A | 1/2000 | Cunningham |
| 5,797,133 A | 8/1998 | Jones et al. | 6,018,717 A | 1/2000 | Lee et al. |
| 5,798,709 A | 8/1998 | Flaxl | 6,024,286 A | 2/2000 | Bradley et al. |
| 5,808,758 A | 9/1998 | Solmsdorf | 6,029,149 A | 2/2000 | Dykstra et al. |
| 5,809,142 A | 9/1998 | Hurta et al. | 6,038,584 A | 3/2000 | Balmer |
| 5,809,288 A | 9/1998 | Balmer | 6,047,888 A | 4/2000 | Dethloff |
| 5,809,633 A | 9/1998 | Mundigl et al. | 6,052,675 A | 4/2000 | Checchio |
| 5,825,007 A | 10/1998 | Jesadanont | 6,064,320 A | 5/2000 | d'Hont et al. |
| 5,825,302 A | 10/1998 | Stafford | 6,070,003 A | 5/2000 | Gove et al. |
| 5,826,077 A | 10/1998 | Blakeley et al. | 6,072,870 A | 6/2000 | Nguyen et al. |
| 5,828,044 A | 10/1998 | Jun et al. | 6,073,840 A | 6/2000 | Marion |
| 5,834,756 A | 11/1998 | Gutman et al. | 6,078,888 A | 6/2000 | Johnson, Jr. |
| 5,841,364 A | 11/1998 | Hagl et al. | RE36,788 E | 7/2000 | Mansvelt et al. |
| 5,842,088 A | 11/1998 | Thompson | 6,088,686 A | 7/2000 | Walker et al. |
| 5,844,218 A | 12/1998 | Kawan et al. | 6,092,057 A | 7/2000 | Zimmerman et al. |
| 5,844,230 A | 12/1998 | Lalonde | 6,101,174 A | 8/2000 | Langston |
| 5,845,267 A | 12/1998 | Ronen | 6,102,162 A | 8/2000 | Teicher |
| 5,851,149 A | 12/1998 | Xidos et al. | 6,102,672 A | 8/2000 | Woollenweber et al. |
| 5,854,891 A | 12/1998 | Postlewaite et al. | 6,105,008 A | 8/2000 | Davis et al. |
| 5,856,048 A | 1/1999 | Tahara et al. | 6,105,013 A | 8/2000 | Curry et al. |
| 5,857,709 A | 1/1999 | Chock | 6,105,865 A | 8/2000 | Hardesty |
| 5,858,006 A | 1/1999 | Van der AA et al. | 6,109,525 A | 8/2000 | Blomqvist et al. |
| 5,859,779 A | 1/1999 | Giordano et al. | 6,112,152 A | 8/2000 | Tuttle |
| 5,864,323 A | 1/1999 | Berthon | 6,115,360 A | 9/2000 | Quay et al. |
| 5,867,100 A | 2/1999 | d'Hont | 6,116,423 A | 9/2000 | Troxtell, Jr. et al. |
| 5,870,031 A | 2/1999 | Kaiser et al. | 6,116,505 A | 9/2000 | Withrow |
| 5,870,915 A | 2/1999 | d'Hont | 6,118,189 A | 9/2000 | Flaxl |
| D406,861 S | 3/1999 | Leedy, Jr. | 6,121,544 A | 9/2000 | Petsinger |
| 5,878,215 A | 3/1999 | Kling et al. | 6,123,223 A | 9/2000 | Watkins |
| 5,878,403 A | 3/1999 | DeFrancesco et al. | 6,129,274 A | 10/2000 | Suzuki |
| 5,880,675 A | 3/1999 | Trautner | 6,133,834 A | 10/2000 | Eberth et al. |
| 5,881,272 A | 3/1999 | Balmer | 6,138,913 A | 10/2000 | Cyr et al. |
| 5,886,333 A | 3/1999 | Miyake | 6,141,651 A | 10/2000 | Riley et al. |
| 5,887,266 A | 3/1999 | Heinonen et al. | 6,155,168 A | 12/2000 | Sakamoto |
| 5,890,137 A | 3/1999 | Koreeda | 6,167,236 A | 12/2000 | Kaiser et al. |
| D408,054 S | 4/1999 | Leedy, Jr. | 6,177,860 B1 | 1/2001 | Cromer et al. |
| 5,898,783 A | 4/1999 | Rohrbach | 6,179,205 B1 | 1/2001 | Sloan |
| 5,900,954 A | 5/1999 | Katz et al. | 6,179,206 B1 | 1/2001 | Matsumori |
| 5,903,830 A | 5/1999 | Joao et al. | 6,188,994 B1 | 2/2001 | Egendorf |
| 5,905,798 A | 5/1999 | Nerlikar et al. | 6,192,255 B1 | 2/2001 | Lewis et al. |
| 5,912,678 A | 6/1999 | Saxena et al. | 6,198,728 B1 | 3/2001 | Hulyalkar et al. |
| 5,920,628 A | 7/1999 | Indeck et al. | 6,198,875 B1 | 3/2001 | Edenson et al. |
| 5,928,788 A | 7/1999 | Riedl | 6,202,927 B1 | 3/2001 | Bashan et al. |
| 5,929,801 A | 7/1999 | Aslanidis et al. | 6,205,151 B1 | 3/2001 | Quay et al. |
| 5,931,917 A | 8/1999 | Nguyen et al. | 6,206,293 B1 | 3/2001 | Gutman et al. |
| 5,932,870 A | 8/1999 | Berson | 6,215,437 B1 | 4/2001 | Schurmann et al. |
| 5,933,624 A | 8/1999 | Balmer | 6,216,219 B1 | 4/2001 | Cai et al. |
| 5,943,624 A | 8/1999 | Fox et al. | 6,219,439 B1 | 4/2001 | Burger |
| 5,948,116 A | 9/1999 | Aslanidis et al. | D442,627 S | 5/2001 | Webb et al. |
| 5,953,512 A | 9/1999 | Cai et al. | D442,629 S | 5/2001 | Webb et al. |
| 5,955,717 A | 9/1999 | Vanstone | 6,223,984 B1 | 5/2001 | Renner et al. |
| 5,955,969 A | 9/1999 | d'Hont | 6,226,382 B1 | 5/2001 | M'Raihi et al. |
| 5,956,024 A | 9/1999 | Strickland et al. | 6,230,270 B1 | 5/2001 | Laczko, Sr. |
| 5,963,924 A | 10/1999 | Williams et al. | 6,232,917 B1 | 5/2001 | Baumer et al. |
| 5,970,148 A | 10/1999 | Meier | 6,233,683 B1 | 5/2001 | Chan et al. |
| 5,971,276 A | 10/1999 | Sano et al. | 6,237,848 B1 | 5/2001 | Everett |
| RE36,365 E | 11/1999 | Levine et al. | 6,239,675 B1 | 5/2001 | Flaxl |
| 5,978,348 A | 11/1999 | Tamura | 6,240,187 B1 | 5/2001 | Lewis |
| 5,978,840 A | 11/1999 | Nguyen et al. | 6,248,314 B1 | 6/2001 | Nakashimada et al. |
| 5,983,208 A | 11/1999 | Haller | 6,255,031 B1 | 7/2001 | Yao et al. |
| 5,987,140 A | 11/1999 | Rowney et al. | 6,257,486 B1 | 7/2001 | Teicher et al. |

| Patent Number | Date | Name |
|---|---|---|
| 6,259,769 B1 | 7/2001 | Page |
| 6,260,026 B1 | 7/2001 | Tomida et al. |
| 6,260,088 B1 | 7/2001 | Gove et al. |
| 6,264,106 B1 | 7/2001 | Bridgelall |
| 6,266,754 B1 | 7/2001 | Laczko, Sr. et al. |
| 6,273,335 B1 | 8/2001 | Sloan |
| 6,277,232 B1 | 8/2001 | Wang et al. |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,290,137 B1 | 9/2001 | Kiekhaefer |
| 6,296,188 B1 | 10/2001 | Kiekhaefer |
| 6,315,193 B1 | 11/2001 | Hogan |
| 6,317,721 B1 | 11/2001 | Hurta et al. |
| 6,318,636 B1 | 11/2001 | Reynolds et al. |
| 6,323,566 B1 | 11/2001 | Meier |
| 6,325,285 B1 | 12/2001 | Baratelli |
| 6,326,934 B1 | 12/2001 | Kinzie |
| 6,342,844 B1 | 1/2002 | Rozin |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,388,533 B1 | 5/2002 | Swoboda |
| 6,390,375 B1 | 5/2002 | Kayanakis |
| 6,400,272 B1 | 6/2002 | Holtzman et al. |
| 6,402,028 B1 | 6/2002 | Graham, Jr. et al. |
| 6,411,611 B1 | 6/2002 | van der Tuijn |
| 6,415,978 B1 | 7/2002 | McAllister |
| 6,422,464 B1 | 7/2002 | Terranova |
| 6,422,532 B1 | 7/2002 | Garner |
| 6,424,029 B1 | 7/2002 | Giesler |
| 6,457,996 B1 | 10/2002 | Shih |
| 6,466,804 B1 | 10/2002 | Pecen et al. |
| 6,471,127 B1 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,481,621 B1 | 11/2002 | Herrendoerfer et al. |
| 6,481,632 B1 | 11/2002 | Wentker et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,380 B1 | 12/2002 | Jarosz |
| 6,496,465 B1 | 12/2002 | Broome et al. |
| 6,507,762 B1 | 1/2003 | Amro et al. |
| 6,510,983 B1 | 1/2003 | Horowitz et al. |
| 6,510,998 B1 | 1/2003 | Stanford et al. |
| 6,513,015 B1 | 1/2003 | Ogasawara |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,588,660 B1 | 7/2003 | Buescher et al. |
| 6,589,119 B1 | 7/2003 | Orus et al. |
| 6,608,995 B1 | 8/2003 | Kawasaki et al. |
| 6,609,655 B1 | 8/2003 | Harrell |
| 6,626,356 B1 | 9/2003 | Davenport et al. |
| 6,628,961 B1 | 9/2003 | Ho et al. |
| 6,650,887 B1 | 11/2003 | McGregor et al. |
| 6,665,405 B1 | 12/2003 | Lenstra |
| 6,674,786 B1 | 1/2004 | Nakamura et al. |
| 6,679,427 B1 | 1/2004 | Kuroiwa |
| 6,684,269 B1 | 1/2004 | Wagner |
| 6,687,714 B1 | 2/2004 | Kogen et al. |
| 6,690,930 B1 | 2/2004 | Dupre |
| 6,693,513 B1 | 2/2004 | Tuttle |
| 6,705,530 B1 | 3/2004 | Kiekhaefer |
| 6,711,262 B1 | 3/2004 | Watanen |
| 6,732,936 B1 | 5/2004 | Kiekhaefer |
| 6,742,120 B1 | 5/2004 | Markakis et al. |
| 6,760,581 B1 | 7/2004 | Dutta |
| 6,789,012 B1 | 9/2004 | Childs et al. |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0039617 A1 | 11/2001 | Buhrlen et al. |
| 2002/0011519 A1 | 1/2002 | Shults |
| 2002/0028704 A1 | 3/2002 | Bloomfield et al. |
| 2002/0035548 A1 | 3/2002 | Hogan et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Stuila et al. |
| 2002/0194503 A1 | 12/2002 | Faith et al. |
| 2002/0196963 A1 | 12/2002 | Bardwell |
| 2003/0009382 A1 | 1/2003 | D'Arbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0046228 A1 | 3/2003 | Berney |
| 2003/0057278 A1 | 3/2003 | Wong |
| 2003/0069828 A1 | 4/2003 | Blazey et al. |
| 2003/0069846 A1 | 4/2003 | Marcon |
| 2003/0120554 A1 | 6/2003 | Hogan et al. |
| 2003/0121969 A1 | 7/2003 | Wankmueller |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |

| | | | | | |
|---|---|---|---|---|---|
| 2003/0195842 A1 | 10/2003 | Reece | JP | 6183187 | 7/1994 |
| 2003/0195843 A1 | 10/2003 | Matsuda et al. | JP | 6191137 | 7/1994 |
| 2003/0200184 A1 | 10/2003 | Dominguez et al. | JP | 6234287 | 8/1994 |
| 2003/0218066 A1 | 11/2003 | Fernandes et al. | JP | 7173358 | 7/1995 |
| 2003/0220876 A1 | 11/2003 | Burger et al. | JP | 7205569 | 8/1995 |
| 2003/0222153 A1 | 12/2003 | Pentz et al. | JP | 5224000 | 2/1997 |
| 2003/0225623 A1 | 12/2003 | Wankmueller | JP | 9274640 | 10/1997 |
| 2003/0225713 A1 | 12/2003 | Atkinson et al. | JP | 363071794 | 4/1998 |
| 2003/0227550 A1 | 12/2003 | Manico et al. | JP | 10129161 | 5/1998 |
| 2003/0233334 A1 | 12/2003 | Smith | JP | 11227367 | 8/1999 |
| 2004/0010462 A1 | 1/2004 | Moon et al. | JP | 2000-1109 A | 1/2000 |
| 2004/0015451 A1 | 1/2004 | Sahota et al. | JP | 2000015288 A | 1/2000 |
| 2004/0029569 A1 | 2/2004 | Khan et al. | JP | 2000-40181 A | 2/2000 |
| 2004/0039860 A1 | 2/2004 | Mills et al. | JP | 200067312 A | 3/2000 |
| 2004/0139021 A1 | 7/2004 | Reed et al. | JP | 2000177229 | 6/2000 |

FOREIGN PATENT DOCUMENTS

| | | | | | |
|---|---|---|---|---|---|
| | | | JP | 2000207641 A | 7/2000 |
| | | | JP | 2001-5931 A | 1/2001 |
| CH | 689070 | 8/1998 | JP | 2001504406 | 4/2001 |
| CH | 689680 | 8/1999 | JP | 2001283122 A | 10/2001 |
| DE | 2847756 | 5/1980 | JP | 2001315475 | 11/2001 |
| EP | 0181770 | 5/1986 | JP | 2002274087 | 9/2002 |
| EP | 0343829 | 11/1989 | WO | WO 81/00776 | 3/1981 |
| EP | 0354817 | 2/1990 | WO | WO 89/03760 | 5/1989 |
| EP | 0 358 525 A2 | 3/1990 | WO | WO 90/08661 | 8/1990 |
| EP | 0368570 | 5/1990 | WO | WO 92/16913 | 10/1992 |
| EP | 0388090 | 9/1990 | WO | WO 95/32919 | 12/1995 |
| EP | 0 424 726 A1 | 10/1990 | WO | WO 96/18972 | 6/1996 |
| EP | 0411602 | 2/1991 | WO | WO 99/03057 A1 | 1/1999 |
| EP | 0403134 | 1/1992 | WO | WO 99/14055 | 3/1999 |
| EP | 0473998 | 3/1992 | WO | WO 99/47983 | 9/1999 |
| EP | 0481388 | 4/1992 | WO | WO 00/10144 A1 | 2/2000 |
| EP | 0531605 | 3/1993 | WO | WO 00/38088 A1 | 6/2000 |
| EP | 0552047 | 7/1993 | WO | WO 01/04825 A1 | 1/2001 |
| EP | 0560318 | 9/1993 | WO | WO 01/15098 A1 | 3/2001 |
| EP | 5254283 | 9/1993 | WO | WO 01/43095 A2 | 6/2001 |
| EP | 0568185 | 11/1993 | WO | WO 01/72224 A1 | 10/2001 |
| EP | 0657297 | 6/1995 | WO | WO 01/77856 A1 | 10/2001 |
| EP | 0721850 | 7/1996 | WO | WO 01/80473 A2 | 10/2001 |
| EP | 0780839 | 6/1997 | WO | WO 01/86535 A1 | 11/2001 |
| EP | 0789316 | 8/1997 | WO | WO 01/90962 A1 | 11/2001 |
| EP | 0866420 | 9/1998 | WO | WO 01/95243 A2 | 12/2001 |
| EP | 0894620 | 2/1999 | WO | WO 02/01485 A1 | 1/2002 |
| EP | 0916519 | 5/1999 | WO | WO 02/13134 A2 | 2/2002 |
| EP | 0 933 717 A2 | 8/1999 | WO | WO 02/21903 A1 | 3/2002 |
| EP | 0 956 818 A1 | 11/1999 | WO | WO 02/063545 A2 | 8/2002 |
| EP | 0 959 440 A2 | 11/1999 | WO | WO 02/065246 A2 | 8/2002 |
| EP | 0 984 404 A2 | 3/2000 | WO | WO 02/065404 A2 | 8/2002 |
| EP | 1 016 947 A2 | 7/2000 | WO | WO 02/069221 A1 | 9/2002 |
| EP | 1 039 403 A2 | 9/2000 | WO | WO 02/073512 A1 | 9/2002 |
| EP | 1 104 909 A2 | 6/2001 | WO | WO 02/086665 A2 | 10/2002 |
| EP | 1 113 387 A2 | 7/2001 | WO | WO 02/091281 A1 | 11/2002 |
| EP | 1 199 684 A2 | 4/2002 | WO | WO 02/097575 A2 | 12/2002 |
| EP | 1 251 450 A1 | 10/2002 | WO | WO 02/101670 A2 | 12/2002 |
| GB | 1371254 | 10/1974 | | | |
| GB | 2108906 | 5/1983 | | | |
| GB | 2240948 | 8/1991 | | | |
| GB | 2347537 | 9/2000 | | | |
| JP | 6243774 | 3/1987 | | | |
| JP | 62264999 | 11/1987 | | | |
| JP | 6398689 | 4/1988 | | | |
| JP | 6372721 | 5/1988 | | | |
| JP | 63175987 | 7/1988 | | | |
| JP | 644934 | 1/1989 | | | |
| JP | 6487395 | 3/1989 | | | |
| JP | 6487396 | 3/1989 | | | |
| JP | 6487397 | 3/1989 | | | |
| JP | 149345 | 10/1989 | | | |
| JP | 2130737 | 5/1990 | | | |
| JP | 2252149 | 10/1990 | | | |
| JP | 3290780 | 12/1991 | | | |
| JP | 4303692 | 10/1992 | | | |
| JP | 569689 | 3/1993 | | | |

OTHER PUBLICATIONS

WorldNet 1.6, 1997 Princeton University "binder".
"What's New: Timex Watch Features Speedpass System", http://www.speedpass.com/news/article.jsp?id=51 (1 page).
"Physical Reality: A Second Look", Ken Sharp, Senior Technical Editor, http://www.idsystems.com/reader/1999_03/phys0399_pt2/phys0399_pt2.htm (6 pages).
"Magic Wands' to Speed Mobile Sales", BobBrewin, Jan. 15, 2001, http://www.computerworld.com/mobiletopics/mobile/story/1,10801,563300.html (4 pages).
"Mobile Speedpass Goes GLobal as Mobil Singpaore Rolls Out Asia's First RFID-Based Pay-At-The-Pump System", Press Release, Apr. 5, 1999, http://www.ti.com/tiris/docs/news_releases/rell2.htm (3 pages).
"Speedpass Unleashed", Jun. 4, 2002, http://www.cardweb.com/cardtrak/news/cf2_20a_97.html (2 pages).

Prophecy Central Update #9, Oct. 10, 1997, http://www.bible-prophecy.com/pcu9.htm (5 pages).

International newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnsport.xml?s=IDGNS (3 pages).

"Microsoft: See SPOT Run On Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to tests its QuickWave RFID payment card for another three months", RFID Journal, Jan. 23, 2003.

"MasterCard to Test RFID Card: Pilot will test whether consumers, merchants and credit card issuers value contactless payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Jornal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has released a Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instruments ISO 14443 payment platform promises faster data transfer rates and more security", RFID Journal, Mar. 6, 2003.

Multiple Frequency Transponders: "Volume production of dual-band RFID chips begins", Frontline Solutions, Jul. 16, 2003.

Functional Specification, Standard Card IC MFI IC S50, Philips Semiconductors, Product Specification Rev. 5.1 May 2001.

*Primary Examiner*—Daniel Stcyr
*Assistant Examiner*—Daniel A. Hess
(74) *Attorney, Agent, or Firm*—Fitzpatrick, Cella, Harper & Scinto

(57) ABSTRACT

The present invention relates to a process for producing an transparent or translucent transaction device having multiple features, such as a holographic foil, integrated circuit chip, RFID circuitry, silver magnetic stripe with text on the magnetic stripe, opacity gradient, an invisible optically recognizable compound, a translucent signature field such that the RFID circuitry and signature on back of the device is visible through the device body. The invisible optically recognizable compound is an infrared ink and/or film, which can be detected by a sensor found in an ATM or device manufacturing assembly line.

45 Claims, 33 Drawing Sheets

| Number | Material | Specifications | Source | Comments |
|---|---|---|---|---|
| | Construction 1 - white needs work, lamination temperature too low, pvc core | | | bond low. |
| 1 | pvc laminate | 1.60 | oberthur | front 4.1, 4.4; back 4.0, 4.0 |
| 2 | pet adhesive both sides | 2.50 | allied signal | |
| 3 | printed core - white #1 | 12.00 | oberthur | |
| 4 | printed core - white #1 | 12.00 | oberthur | |
| 5 | wl-35 pvc (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| Total | | 32.80 | | thickness .030 - .031 |
| | Construction 2 | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | wl-35 pvc (adh to pet) | 2.00 | klockner | |
| Total | | 34.80 | | |
| | Construction 3 | | | |
| 1 | pvc laminate | 1.60 | oberthur | |
| 2 | pet adhesive both sides | 2.50 | allied signal | |
| 3 | printed core | 12.00 | oberthur | |
| 4 | printed core | 12.00 | oberthur | |
| 5 | wl-35 pvc (adh to xir) | 2.00 | klockner | |
| 6 | xir (metal to pet gs) | 1.00 | southwall | |
| 7 | pet glue/stamp (adh to xir) | 1.70 | d & k | 1.2 mil adhesive, 0.5 mil pet. |
| 8 | gomar pvc (adh to pet) | 2.00 | allied signal | |
| Total | | 34.80 | | |
| | Construction 4 - white #2 too dark, temperature too low, pvc lamination bond | | | low |
| 1 | pvc laminate | 1.60 | oberthur | front - 4.0, 4.3; back tear |
| 2 | pet adhesive both sides | 2.50 | allied signal | |
| 3 | printed core - white #2 | 12.00 | oberthur | |
| 4 | printed core - white #2 | 12.00 | oberthur | |
| 5 | bemis (adh to xir) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| Total | | 32.80 | | thickness .030 - .031 |
| | Construction 5 - white #3 too dark, temperature too low - pvc lamination bon | | | low |
| 1 | pvc laminate | 1.60 | oberthur | |
| 2 | pet adhesive both sides | 2.50 | allied signal | |
| 3 | printed core - white #3 | 12.00 | oberthur | |
| 4 | printed core - white #3 | 12.00 | oberthur | |
| 5 | w-35 (adh to xir pet) | 2.00 | klockner | |
| 6 | xir (metal to pet gs) | 1.00 | southwall | |
| 7 | pet glue/stamp | 1.70 | d & k | 1.2 mil adhesive, 0.5 mil pet. |
| | Total | 32.80 | | thickness .030 - .031 |
| | howard 1.0 coating | | | |
| 1 | neocryl b725 | 33.60 | zeneca? | |
| 2 | EtOH | 31.20 | | |
| 3 | nPOAc | 31.20 | | |

FIGURE 13

|   |   |   |   |   |
|---|---|---|---|---|
| | 4 citraflex a4 | 4.00 | moreslip, greensboro | |
| Total | | 100.00 | | |
| | construction #6 - seems to stick ok, best so far, scale up. Make sub-laminat | | | (aka - s) |
| | 1 pvc laminate | 1.60 | oberthur | |
| | 2 core pvc | 12.00 | oberthur | |
| | 3 bemis | 2.00 | bemis | |
| | 4 petgs | 1.70 | d & k | |
| | 5 xir (metal to pet gs) | 1.00 | southwall | plasma treated |
| | 6 bemis | 2.00 | bemis | |
| | 7 core pvc | 12.00 | oberthur | |
| | 8 pvc laminate | 1.60 | oberthur | magnetics |
| Total | | 33.90 | | |
| | herslow sublamination | | | |
| Total Price | | | | |
| | construction #7 - seems to stick ok, best so far, scale up. Make sub-laminat | | | (aka - t) |
| | 1 pvc laminate | 1.60 | oberthur | |
| | 2 core pvc | 12.00 | oberthur | |
| | 3 w-35 | 2.00 | bemis | |
| | 4 petgs | 1.70 | d & k | |
| | 5 xir (metal to pet gs) | 1.00 | southwall | plasma treated |
| | 6 bemis | 2.00 | bemis | |
| | 7 core pvc | 12.00 | oberthur | |
| | 8 pvc laminate | 1.60 | oberthur | magnetics |
| Total | | 33.90 | | |
| | construction #7 - seems to stick ok, best so far, scale up. Make sub-laminat | | | (aka - t) |
| | 1 pvc laminate | 1.60 | oberthur | |
| | 2 core pvc | 12.00 | oberthur | |
| | 3 w-35 | 2.00 | bemis | |
| | 4 petgs | 1.70 | d & k | |
| | 5 xir (metal to pet gs) | 1.00 | southwall | plasma treated |
| | 6 w-35 | 2.00 | bemis | |
| | 7 core pvc | 12.00 | oberthur | core to core = 14.2 lb.in. |
| | 8 pvc laminate | 1.60 | oberthur | magnetics |
| Total | | 33.90 | | |
| | construction #8 - sublaminate to be used with 12 mil pvc core | | | |
| | 1 w-35 | 2.00 | | |
| | 2 petgs | 1.70 | | |
| | 3 xir (metal to pet gs) | 1.00 | | |
| Total | | 4.70 | | |
| | construction #9 - sublaminate to be used with 10 mil pvc core | | | |
| | 1 pvc laminate | 1.60 | | |
| | 2 w-35 | 2.00 | | |
| | 3 petgs | 1.70 | | |
| | 4 xir (metal to pet gs) | 1.00 | | |
| | 5 bemis | 2.00 | | |
| | 6 pvc laminate | 1.60 | | |
| Total | | 9.90 | | |
| | construction #10 (if u works) | | | |
| | 1 w35 | 2.00 | | |
| | 2 petgs | 1.70 | | |
| | 3 xir (metal to pet gs) | 1.00 | | |
| | 4 w35 | 2.00 | | |

FIGURE 13 (Continued)

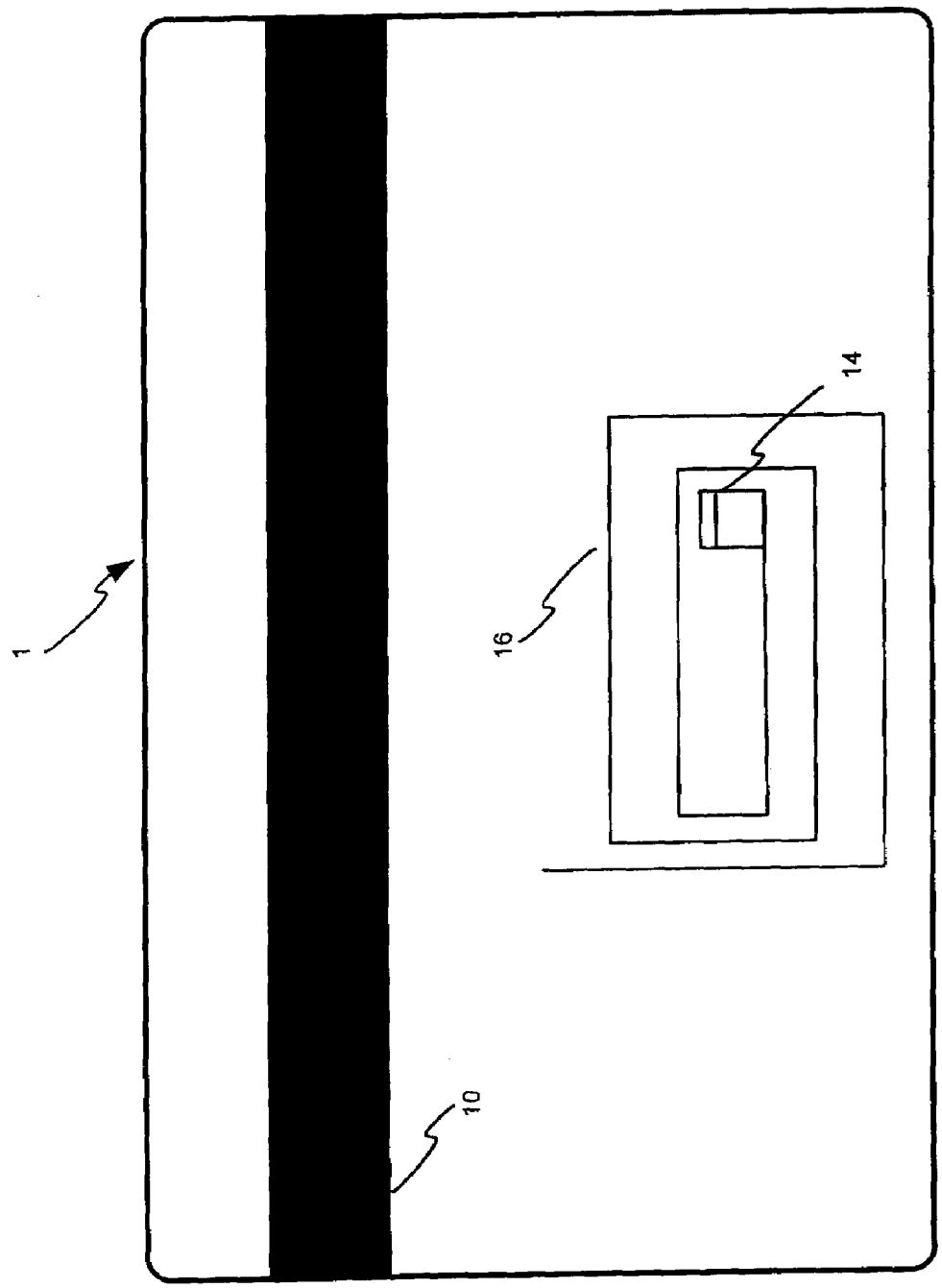

TRANSPARENT TRANSACTION DEVICE

CROSS REFERENCE TO RELATED APPLICATIONS

This invention is a continuation in part of and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001). This invention is also a continuation in part of U.S. patent application Ser. No. 10/394,914, entitled "TRANSACTION CARD," filed Mar. 21, 2003 (which itself claims priority to U.S. Provisional Patent Application No. 60/153,112, filed Sep. 7, 1999, U.S. Provisional Patent Application No. 60/160,519, filed Oct. 20, 1999, U.S. Provisional Application No. 60/167,405, filed Nov. 24, 1999, and to U.S. Provisional Patent Application No. 60/171,689, filed Dec. 21, 1999) and continuation in part U.S. patent application Ser. No. 10/611,563, filed on Jun. 30, 2003, entitled "TRANSPARENT TRANSACTION CARD," and of continuation in part U.S. patent application Ser. No. 10/302,658, entitled "TRANSACTION CARD WITH DUAL IC CHIPS," filed Nov. 22, 2002, all three of which claim priority to U.S. patent application Ser. No. 10/092,681, entitled "TRANSACTION CARD," filed Mar. 7, 2002 now U.S. Pat. No. 6,764,014, (which itself claims priority to U.S. Provisional Patent Application No. 60/153,112, filed Sep. 7, 1999, U.S. Provisional Patent Application No. 60/160,519, filed Oct. 20, 1999, U.S. Provisional Patent Application No. 60/167,405, filed Nov. 24, 1999, and to U.S. Provisional Patent Application No. 60/171,689, filed Dec. 21, 1999), which claims priority to U.S. patent application Ser. No. 10/062,106, entitled "TRANSACTION CARD," filed Jan. 31, 2002, now U.S. Pat. No. 6,749,123, the entire contents of which are hereby incorporated by reference.

FIELD OF INVENTION

The present invention generally relates to transaction devices, and more particularly, to a system and method for fabricating a transparent transaction device and using a transparent transaction device in contact and contactless transactions.

BACKGROUND OF INVENTION

For many years personal checks, travelers checks, money orders, traditional currency and the like were the most popular means for paying for goods or services. These payment means, however, were often difficult or impossible to replace if lost or stolen. This is typically true, since these means of payment were disposable in that they were typically single-use devices, meaning that once the devices were used, the ability to reuse the devices was instantly lost to the user.

As such, recent years has seen the development of transaction cards, such as credit cards, debit cards, smart cards, pre-paid cards and the like as a popular substitute for traditional means of payment. A transaction card is about the size of a driver's license, business card or the like making it easier to guard against theft by storing while maintaining control of the transaction card for later re-use. However, although transaction cards are typically configured for re-use, they, like the traditional means of payment discussed above, are often misplaced or lost by the user.

To enhance the chance that a user will have uninterrupted use of a transaction device conventional transaction account providers are increasingly providing transaction devices which are better suited for securing against loss or theft. For example, the transaction device may be embodied in a form factor attachable to the accountholder's person or to an often used personal article, such as a keychain, fob or tag. In this way, the user has increased security against loss, since the personal article is handled frequently. The security provided by this attachment method is limited, however, since the transaction device may still need to be handed over to a merchant to complete a transaction. As such, account providers have increasingly sought ways to enable the user to complete a transaction without the necessity for the user to relinquish control of the device. One such method involves providing a transaction device which is configured to transmit account payment information through a radio frequency transmission. A typical example is a Radio Frequency Identification (RFID) system.

Like barcode and voice data entry, RFID is a contactless information acquisition technology. RFID systems are wireless, and are usually extremely effective in hostile environments where conventional acquisition methods fail.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point of Sale (POS) device. Fob identification data is typically passed to a third party server database, where the identification data is referenced to a customer (e.g., user) credit or debit account for completion of a transaction.

By providing a RFID transaction device (e.g., fob) as described above, transaction account providers are able to attract account users in increasing numbers. The account users often prefer account providers which offer the RFID transaction device option because of the convenience of use and the security using a RF transaction fob provides. As such, because of the increased popularity and benefits associated with RFID transaction devices, many banking and financing institutions, department stores, petroleum companies and other organizations have developed their own RFID transaction devices for use by the organization's consumers.

The proliferation of RFID transaction devices has given the consumer many choices concerning which RFID transaction device to use. As such, device providers attempt to find ways to distinguish their device over a competitive device. In response to this competition, RFID transaction device providers have developed devices including different shapes and appearances. The variations are designed to encourage use of the device and to distinguish the device from other devices on the market.

Typical RFID transaction device providers encourage use of their transaction devices by making the device more aesthetically pleasing. For example, the transaction device provider may include on the surface of the device a logo, picture, apparition, or the like which holds some sentimental or endearing value to the user. The transaction device provider may address the aesthetics of a device by altering the shape of the form factor in which the RFID circuitry may be included.

While altering the appearance of the surface or shape of the device has proven successful for encouraging use of a particular transaction device, transaction device providers continue to look for other ways to improve the appearance of the device. As such, a system and method is desired which addresses the aesthetics of a transaction device with little regard for the device surface or shape.

SUMMARY OF INVENTION

The present invention relates to a contactless transparent transaction device and methods of using the same. Specifically, the present invention relates to a RFID transaction device which may be presented for completion of a transaction. The transaction device may include one or more layers that are transparent or otherwise clear so that the transaction device is viewable therethrough.

It is, therefore, an object of the present invention to provide a transaction device that is clear or otherwise transparent, thereby giving the transaction device a distinctive appearance. Moreover, it is an object of the present invention to provide a transparent transaction device having means for sending information to a machine or card reader in a contactless operating environment.

In addition, it is an object of the present invention to provide a transparent transaction device having one or more RF-based chips therein and corresponding antennae for sending information stored on the chips to a receiver or reader and receiving information from the same. The RF-based chips and antennae are incorporated into the clear transaction device to further give the transaction device a distinctive appearance, since the RF-based chip and the antenna are viewable through the transaction device body.

Further, it is an object of the present invention to provide a contactless transparent transaction device that allows consumers and merchants to more effectively, more quickly, and more efficiently conduct transactions. The present invention allows a consumer to maintain a substantial amount of control over the transaction device during transaction processing. In that regard, the present invention allows for a consumer to conduct a transaction with minimal need for, or without the need for, a representative of the merchant to be present.

In one embodiment, the present invention relates to a process for producing a transparent or translucent transaction device having any one or more features, such as a holographic foil, integrated circuit chip, silver magnetic stripe with text on the magnetic stripe, opacity gradient, perforations included in the transparent device body for forming an outline of a shape, an optically recognizable ink or film contained within the construction of the device, a translucent signature field such that the signature on back of the device is visible from the front of the device and an "active thru" date on the front of the device. The transparent transaction device is optically recognizable during, for example, manufacture, due to an invisible or transparent infrared ink or film which is distributed over the device's surface, thereby allowing the device to block (absorb, refract, diffuse and/or reflect) infrared light and transmit all other light. Particularly, when the transaction device is manufactured, the light beam from a IRED used for counting devices during manufacture is blocked by the infrared ink or film, thereby deactivating the phototransistor permitting the manufacturing equipment to detect transaction device presence. More particularly, during the manufacturer of transaction devices, the optically recognizable film allows an IRED light beam from a personalization device, inspection unit or counter device to count the number of transaction devices produced in an assembly line.

The transparent transaction device of the present invention may use RFID technology to initiate and complete financial transactions. In that regard, the transparent transaction device may include an RF transponder and antenna in the card body, which is visible by casual inspection. The transparent transaction device system described herein may include a RFID reader operable to provide a RF interrogation signal for powering the transparent transaction device transponder system, receiving a transponder system RF signal, and providing transponder system account data relative to the transponder system RF signal. The RFID reader may include an RFID protocol/sequence controller in electrical communication with one or more interrogators for providing an interrogation signal to a transponder, a RFID authentication circuit for authenticating the signal received from the transponder, and a serial or parallel interface for interfacing with a point of interaction device.

The transparent transaction device transponder system may further include one or more transponders (e.g., modules or chips) responsive to the interrogation signal and for providing an authentication signal for verifying that the transponder and/or the RFID reader are authorized to operate within the transponder-reader payment system. In this way, since the transponder system may include multiple transponders, the transponder may be responsive to multiple interrogation signals provided at different frequencies.

The RFID reader may be configured to send a standing RFID recognition signal which may be continuously or intermittently transmitted from the RFID reader via radio frequency (or electromagnetic) propagation. In one instance, the transparent transaction device may be placed within proximity to the RFID reader such that the RFID recognition signal may interrogate the device and initialize device identification procedures.

Additional features and advantages of the present invention are described in, and will be apparent from, the detailed description of the present exemplary embodiments and from the drawings.

BRIEF DESCRIPTION OF DRAWINGS

A more complete understanding of the present invention may be derived by referring to the detailed description and claims when considered in connection with the Figures, where like reference numbers refer to similar elements throughout the Figures, and:

FIGS. 7A–7I show exemplary test results for various device embodiments in a graph of percent transmission v.

Figure 8:
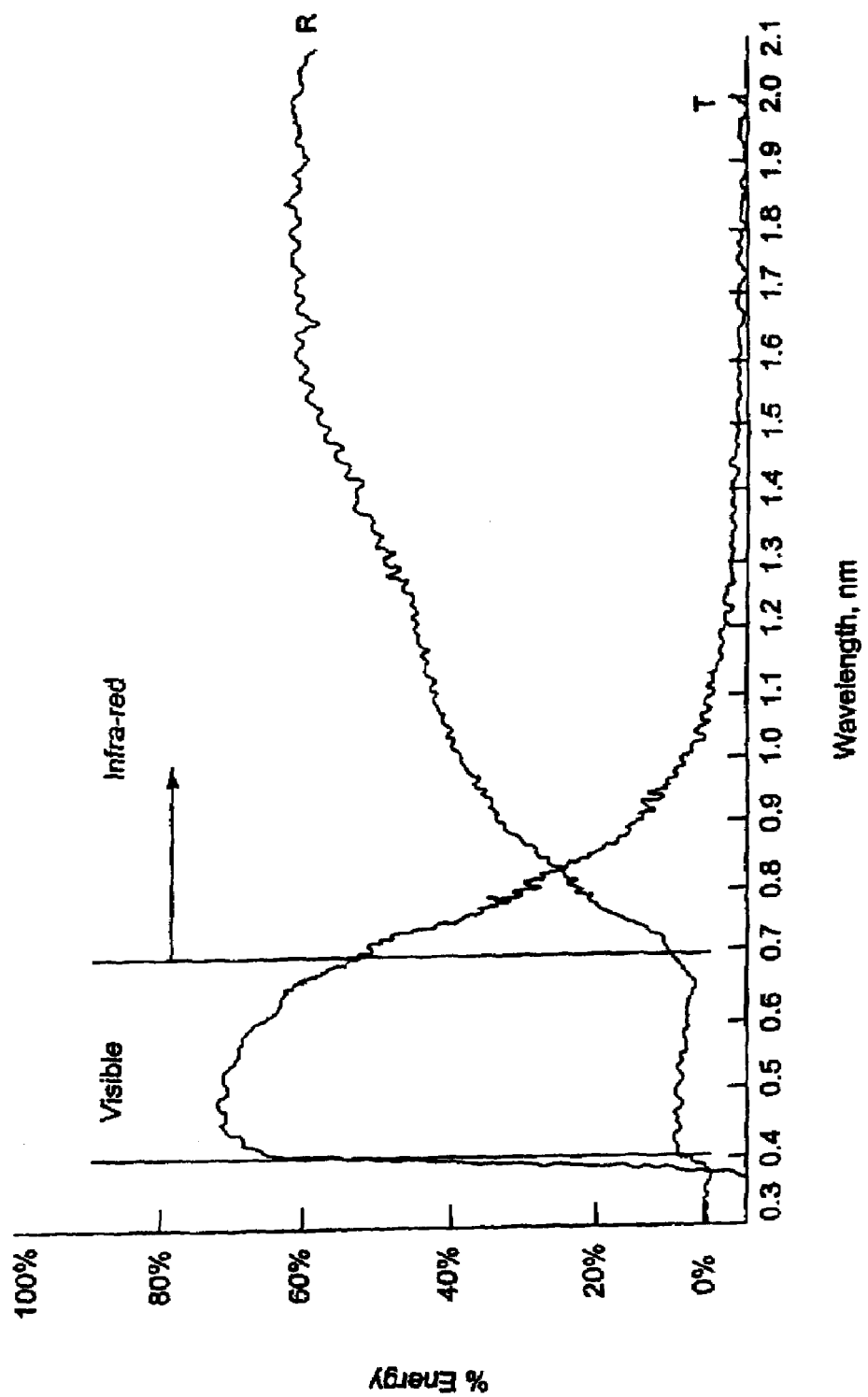
Figure 9:
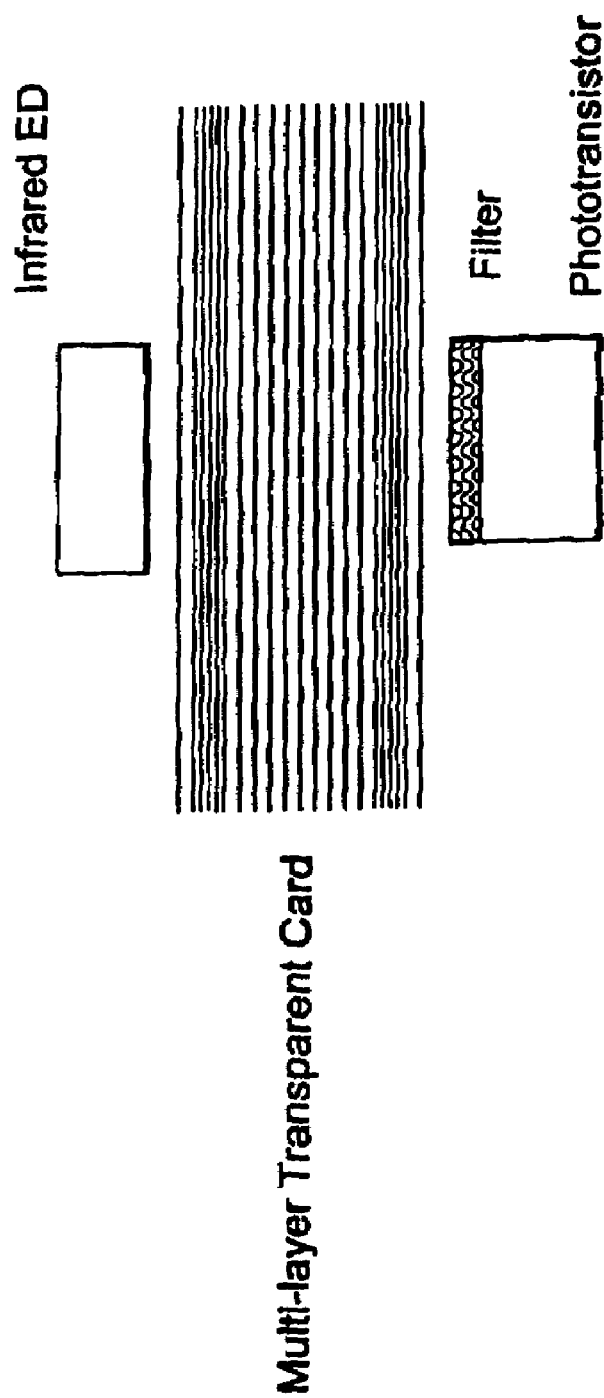
Figure 10:
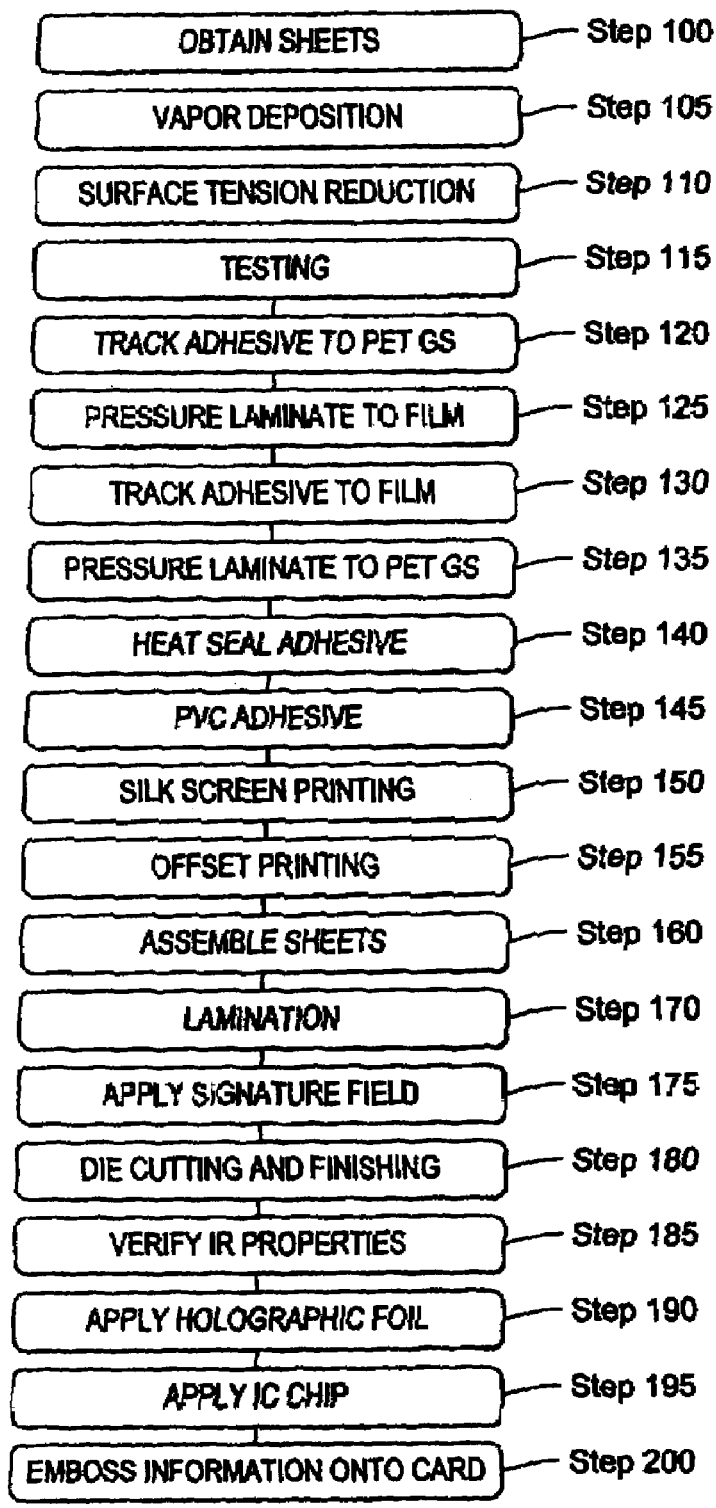
Figure 12A:
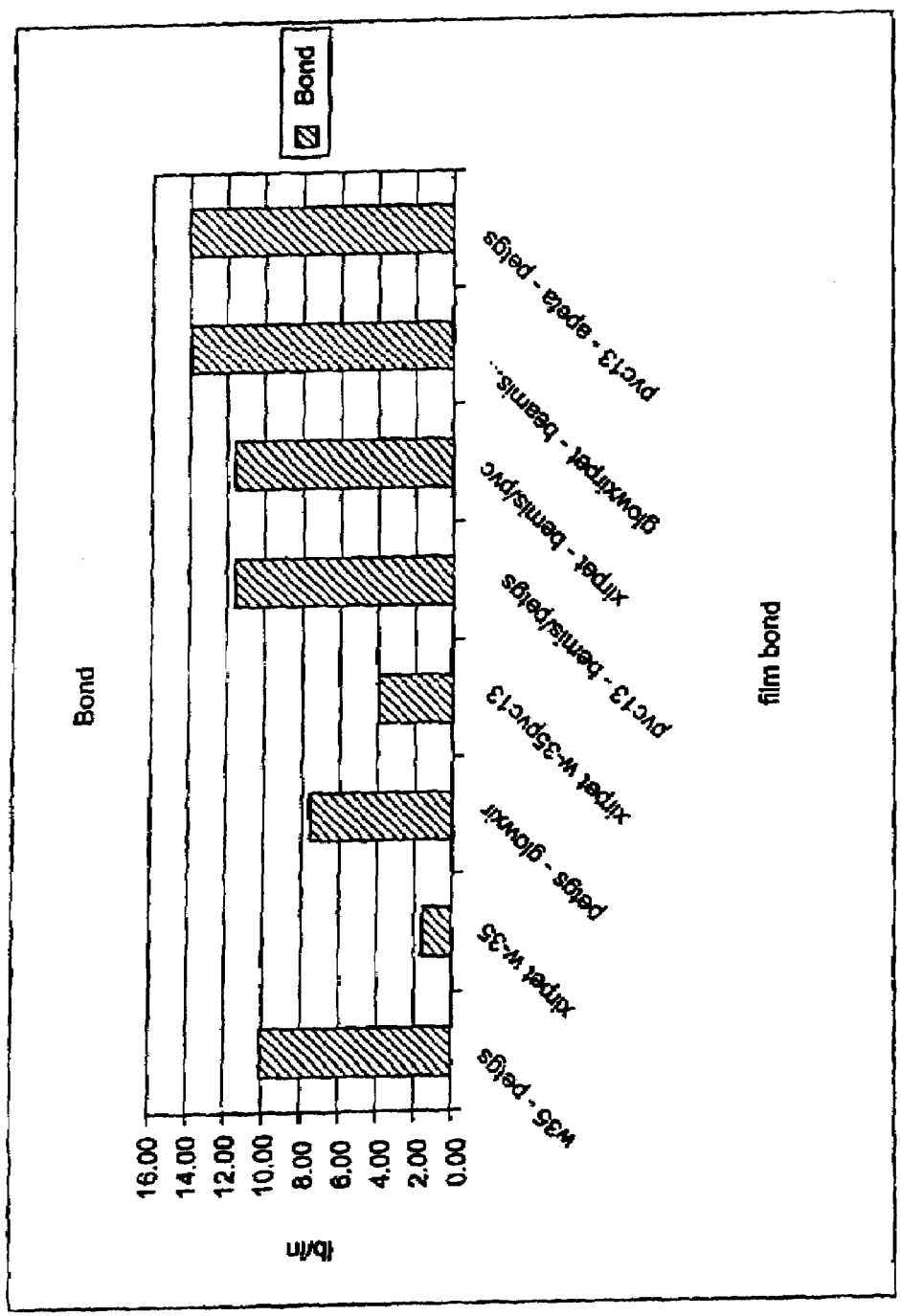
Figure 12B:
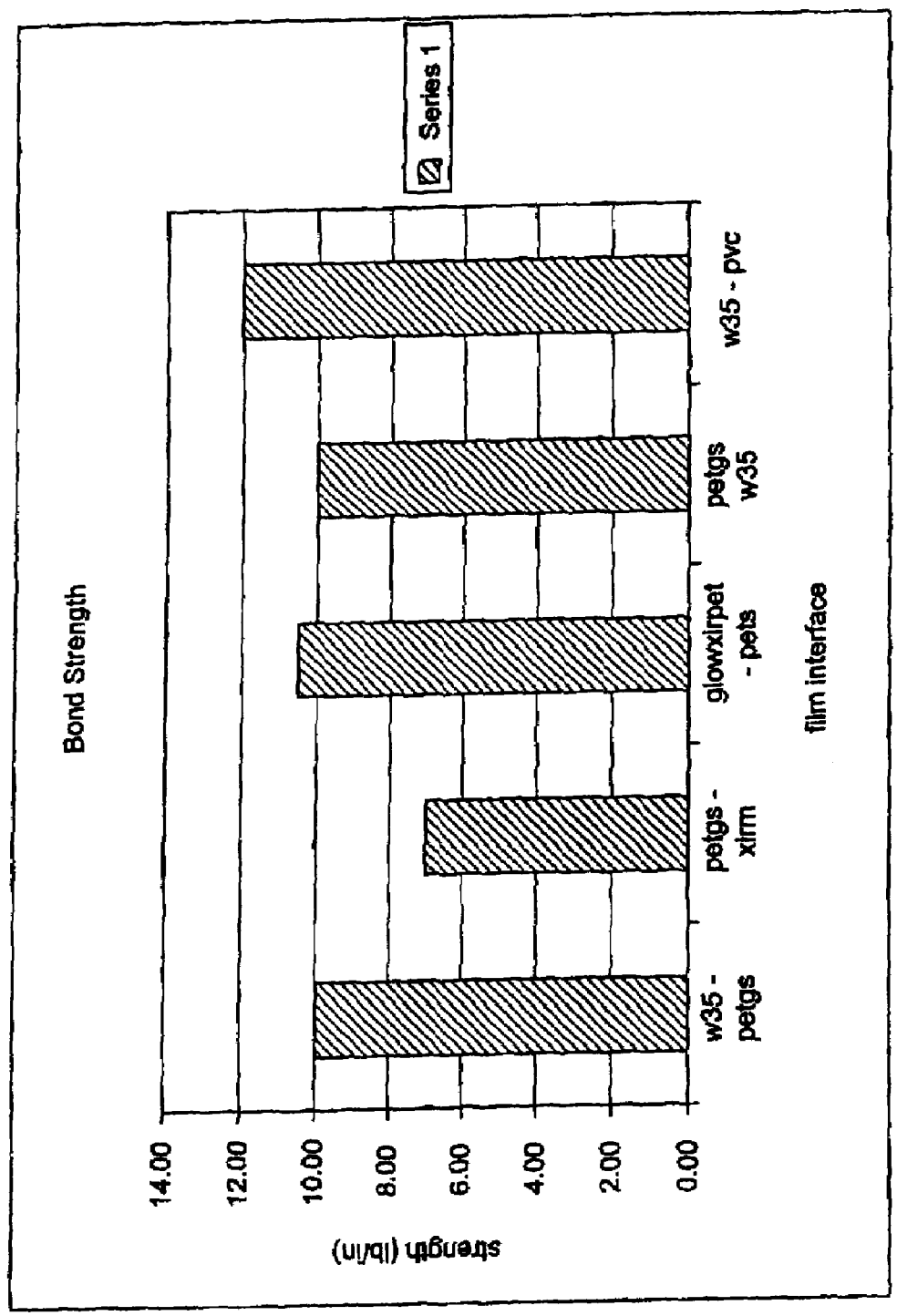
Figure 14:
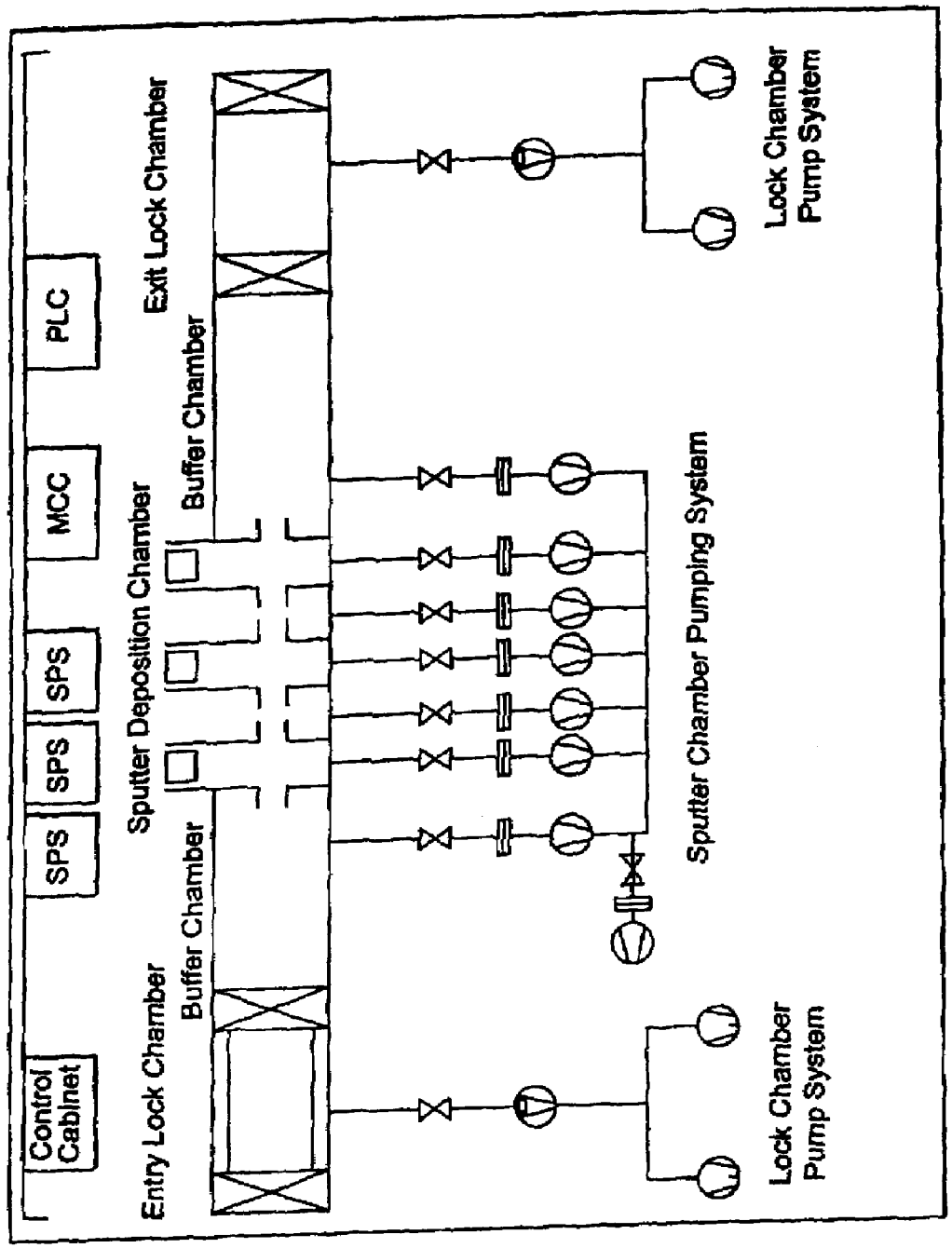
Figure 15A:
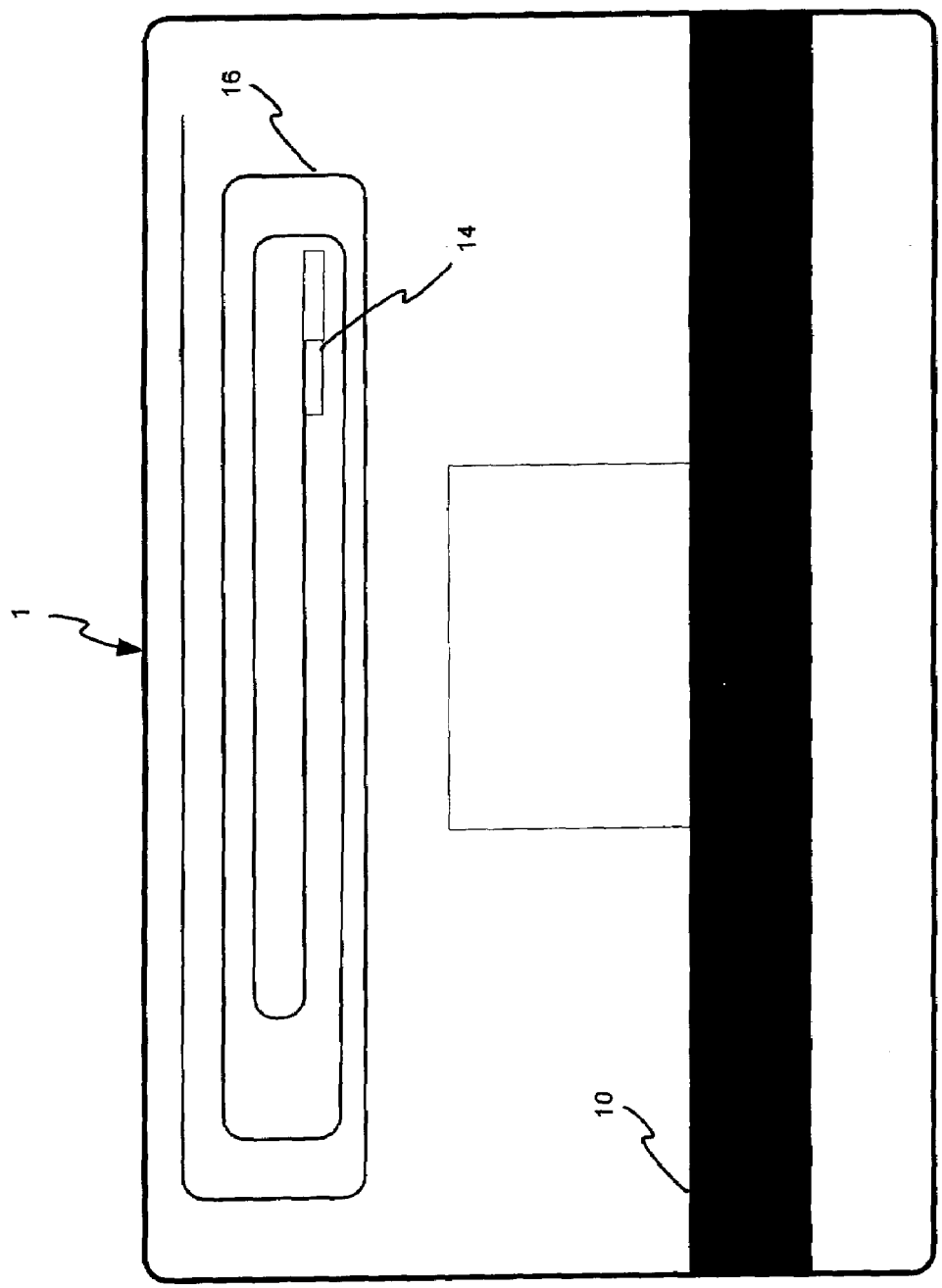
Figure 15B:
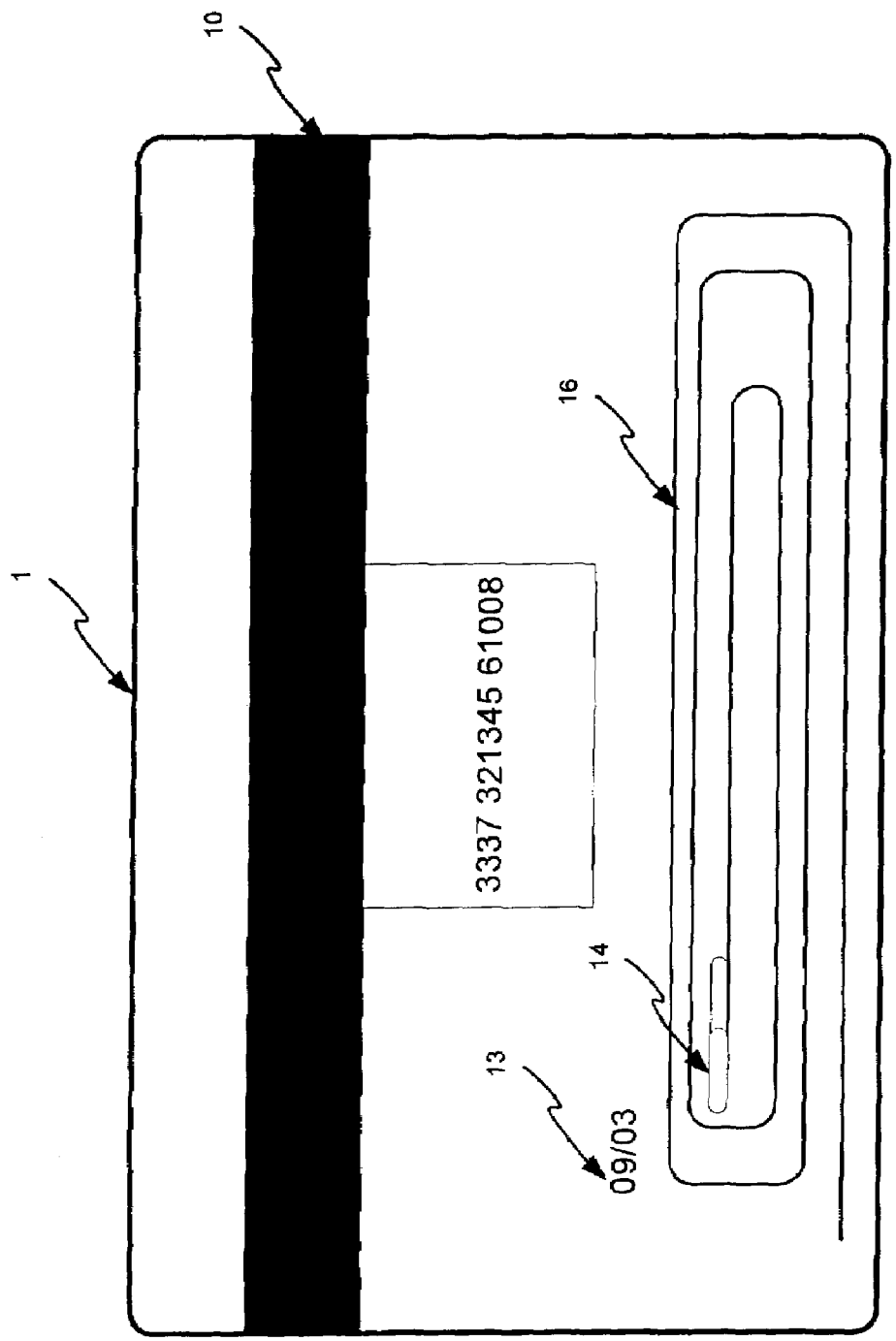
Figure 16:
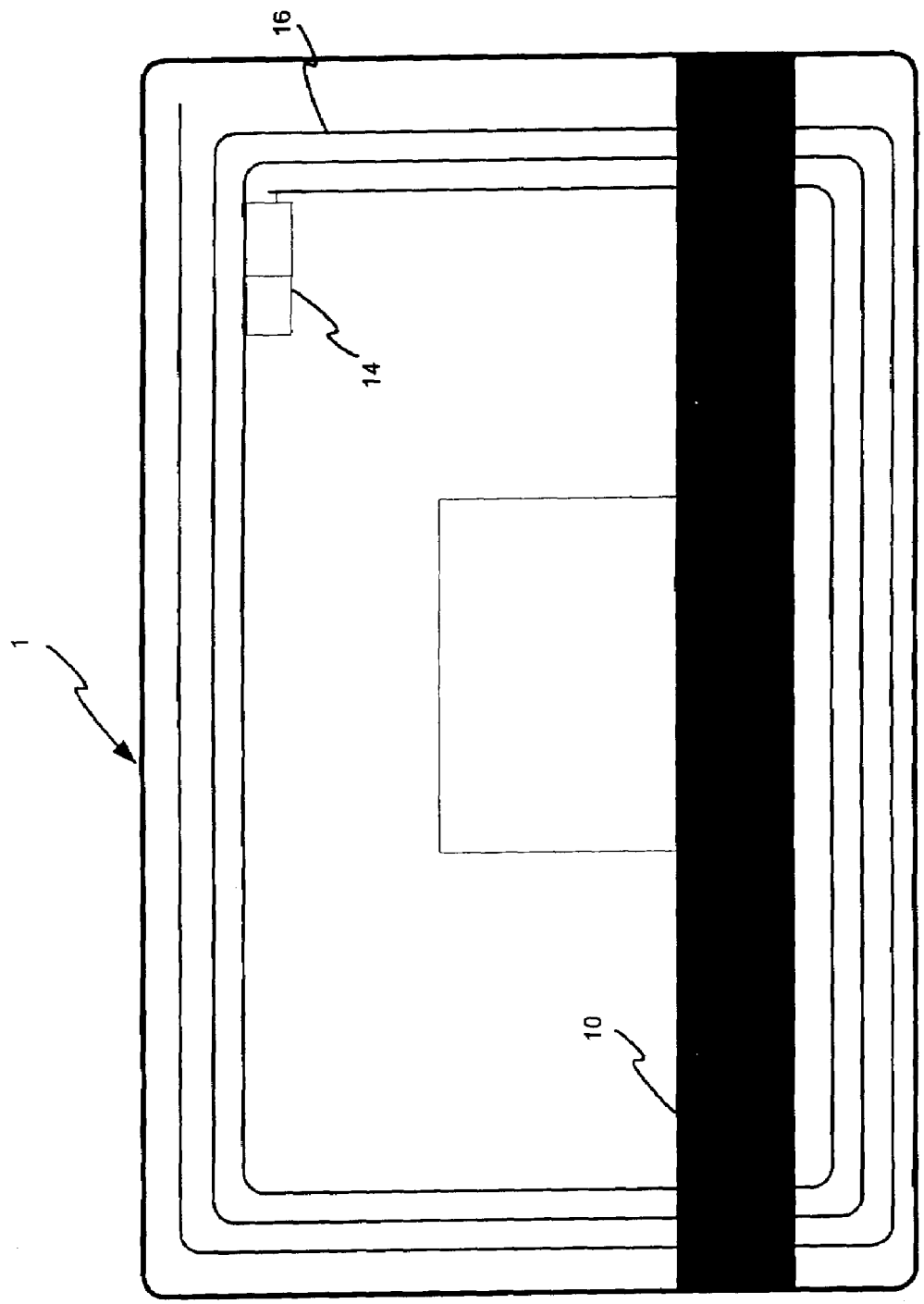
Figure 17:
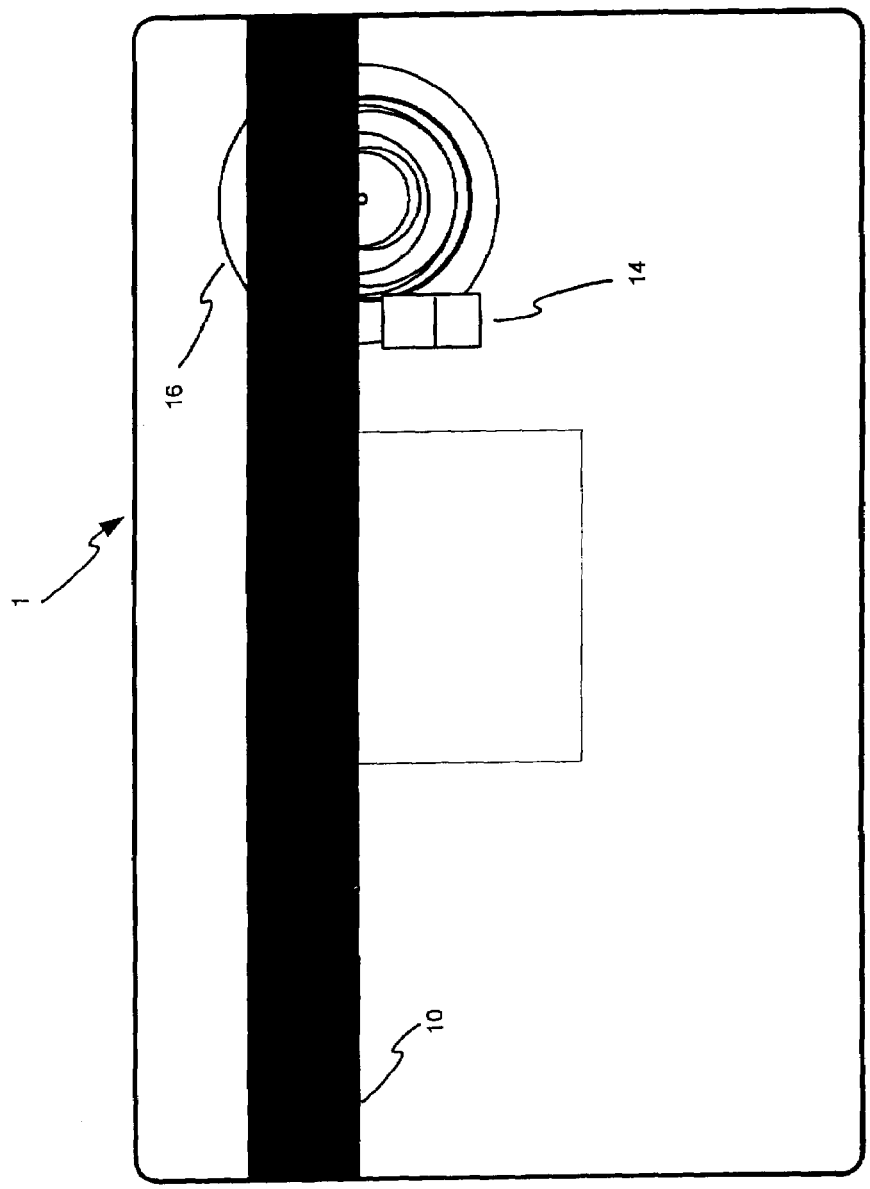

wavelength (nm) in accordance with an exemplary embodiment of the present invention;

FIG. 8 is a graph of energy v. wavelength for the reflection and transmission of IR film in accordance with an exemplary embodiment of the present invention;

FIG. 9 is a schematic diagram of an exemplary sensor mechanism within an ATM in accordance with an exemplary embodiment of the present invention;

FIG. 10 is a flow diagram of the device fabrication process in accordance with an exemplary embodiment of the present invention;

FIGS. 11A–11F show exemplary embodiments of transaction device transparent layers in accordance with an exemplary embodiment of the present invention;

FIG. 12A shows exemplary film bond strengths on a graph of strength (lb/in) v. film bond for various film bonds in accordance with an exemplary embodiment of the present invention;

FIG. 12B shows exemplary bond strengths at the film interfaces on a graph of strength (lb/in) v. film interface for various film interfaces in accordance with an exemplary embodiment of the present invention;

FIG. 13 shows exemplary embodiments of transparent layers for device construction in accordance with an exemplary embodiment of the present invention;

FIG. 14 shows an exemplary system for chemical vapor deposition of PET film in accordance with an exemplary embodiment of the present invention;

FIGS. 15A–15B illustrate plan views of a back side and front side, respectively, of a transparent transaction device having RFID circuitry including an antenna coil embedded therein in accordance with an exemplary embodiment of the present invention; and FIGS. 16–18 illustrate plan views of examples of a transparent transaction device having RFID circuitry including an antenna coil embedded therein in accordance with an exemplary embodiment of the present invention.

DETAILED DESCRIPTION

The present invention relates to contactless transparent transaction devices and methods of making and using the same. Specifically, the present invention relates to a contactless, transparent transaction device, having a plurality of layers that is transparent or otherwise clear so that the transaction device is see through. The transaction device may include means for conducting a transaction in a contactless environment. For example, the transaction device may include a transponder system, which may include a RF-based chip and antenna embedded therein. The contactless transparent transaction device can be utilized to efficiently conduct cashless transactions at merchants, for example, a merchant POS, by permitting the accountholder to maintain possession of the device throughout the transaction. Instead, the device user account information necessary to complete the transaction is retrieved from the device using contactless means. In addition, the transaction device may further include a traditional magnetic stripe so that the transaction device can alternatively be fed through a magnetic stripe reader or inserted in a device acceptance device for transaction completion. In that regard the device material layers may include IR blocking ink or film for activating a card acceptance device in a traditional contact transaction.

Figure 1:
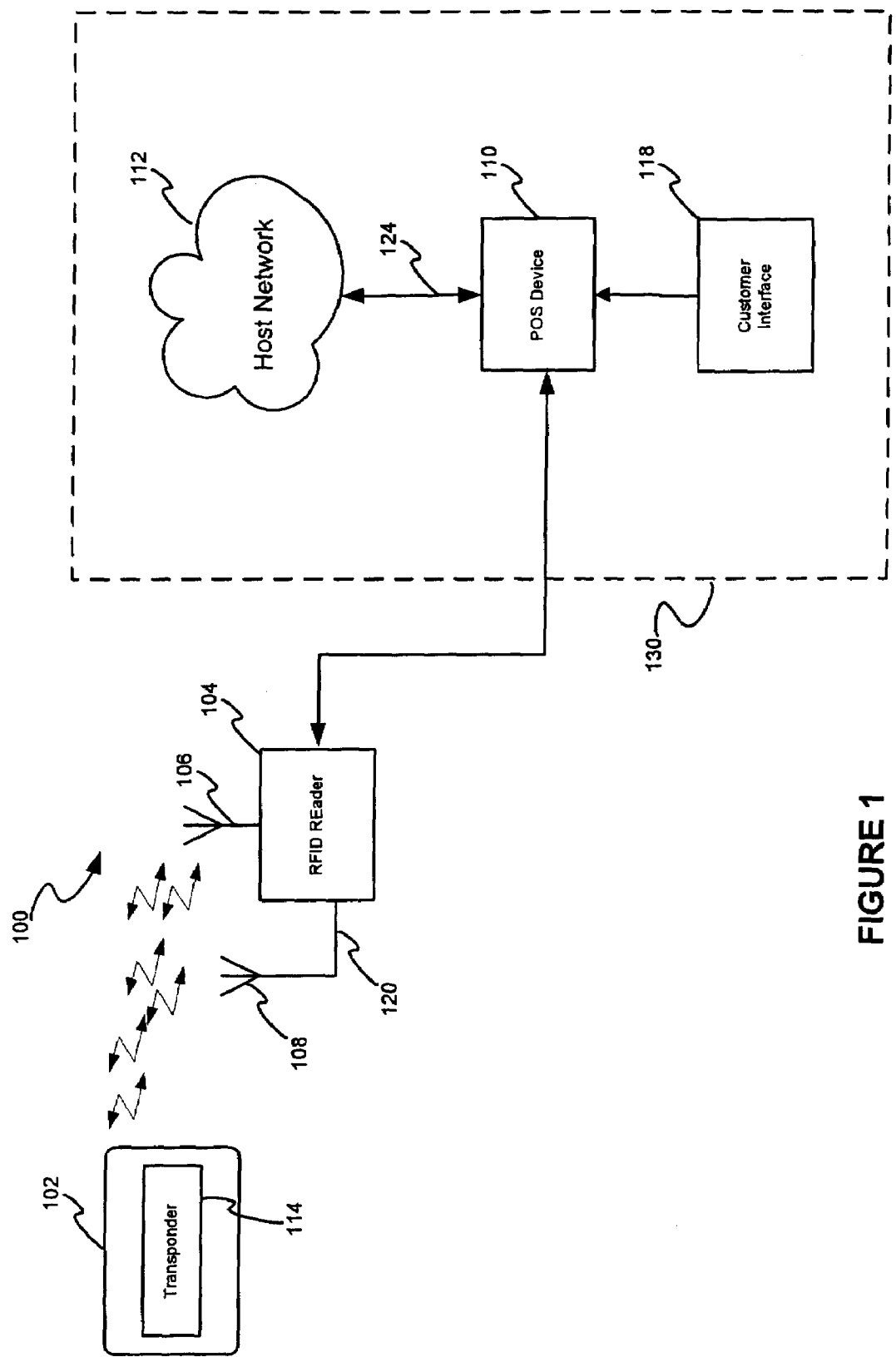
FIG. 1 illustrates an exemplary RF transaction device system in accordance with an exemplary embodiment of the present invention.

FIG. 1 illustrates an exemplary Radio Frequency (RF) transaction device system 100 in accordance with the present invention, wherein exemplary components for use in completing a contactless transparent transaction device transaction are depicted. In general, the operation of system 100 may begin when a contactless transparent transaction device 102 is presented for payment. An RFID reader 104 provides an interrogation signal for powering the device 102. The interrogative signal may power the contactless transparent transaction device thereby initiating operation of the device. The contactless transparent transaction device 102 may provide a transponder identifier and/or account identifier to the RFID reader 104 which may further provide the identifier to the merchant system 130 POS device 110 for transaction completion. Details for the operation of an exemplary RFID transparent system for transaction completion is found in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," and its progeny which is hereby incorporated by reference.

The RFID reader 104 may be configured to communicate using a RFID internal antenna 106. Alternatively, RFID reader 104 may include an external antenna 108 where the external antenna 108 may be made remote to the RFID reader 104 using a suitable cable and/or data link 120. RFID reader 104 may be further in communication with a transaction completion system (e.g., merchant system 130) via a data link 122. In one exemplary embodiment the transaction completion system may include POS device 110 in communication with a RFID reader 104 (via data link 122), and a customer interface 118 in communication with the POS device 110.

Although the point of interaction device is described herein with respect to a merchant point of sale (POS) device, the invention is not to be so limited. Indeed, a merchant POS device is used herein by way of example, and the point of interaction device may be any device capable of receiving device account data. In this regard, the POS may be any point of interaction device or transaction device acceptance device enabling the user to complete a transaction using an RF responsive transponder.

POS device 110 may be in further communication with a customer interface 118 (via data link 128) for entering at least an alternate customer identity verification information such as, for example, a person identification number. POS device 110 may also be in communication with a merchant host network 112 (via data link 124) for processing any transaction request. In this arrangement, information provided by RFID reader 104 is provided to the POS device 110 of merchant system 130 via data link 122. The POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An account number or account identifier, as used herein, may include any identifier for correlating a transaction device to an account (e.g., credit, charge debit, checking, savings, reward, loyalty, or the like) which may be maintained by a transaction account provider (e.g., payment authorization center) and which may be used to complete a financial transaction. A typical account number (e.g., account data) may be correlated to a credit or debit account, loyalty account, or rewards account maintained and serviced by such entities as American Express, Visa and/or MasterCard or the like. For ease in understanding, the present invention may be described with respect to a credit account. However, it should be noted that the invention is not so limited and other accounts permitting an exchange of goods and services for an account data value is contemplated to be within the scope of the present invention (e.g., barter account, rewards or points account).

Figure 2:
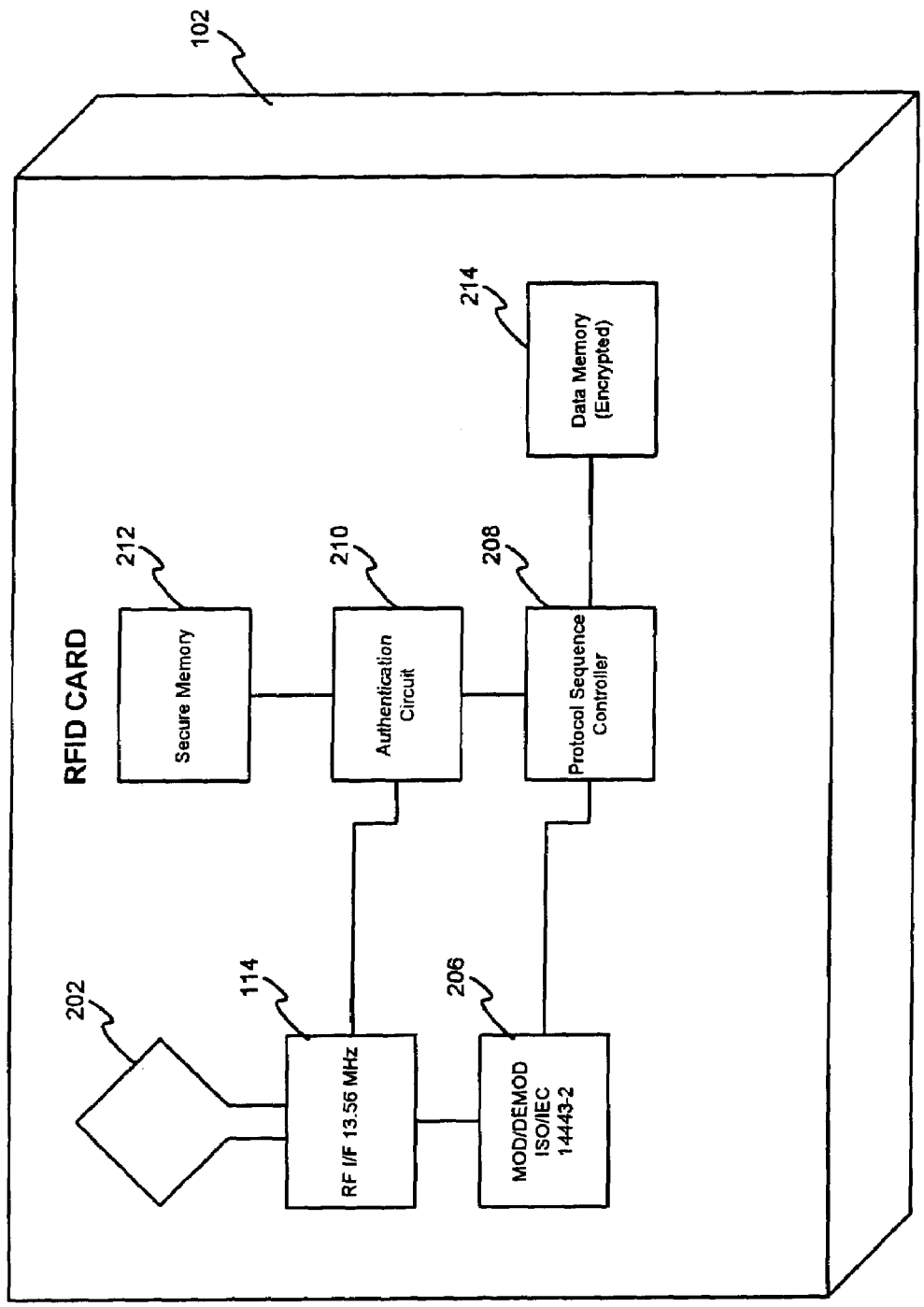
FIG. 2 illustrates an exemplary block diagram of an exemplary RFID transponder circuit for including in a contactless transparent transaction device in accordance with an exemplary embodiment of the present invention.

As noted, in one aspect of the invention, the transaction device 102 comprises transparent layers, as described more fully below. The transparent layers permit the transaction device 102 to be visible therethrough. As such, RFID circuitry included within the transaction device 102 is visible to the casual observer. FIG. 2 illustrates a block diagram of the many functional blocks of exemplary transparent transaction device 102 internal RFID circuitry, which may be used with the present invention. Transparent transaction device 102 may include one or more transponders responsive to RF interrogation by RFID reader 104. As described herein, by way of example, the transparent transaction device 102 may include RFID circuitry which facilitates contactless payment for goods and/or services.

In one exemplary embodiment, transparent transaction device 102 may include an antenna 202 for receiving the RF interrogation signal from the RFID reader 104 via antenna 106 (or alternatively, via external antenna 108). Device antenna 202 may be in communication with a transponder 114. The transponder 114 may be in communication with a transponder compatible modulator/demodulator 206 configured to receive the signal from transponder 114 and modulate the signal into a format readable by any later connected circuitry such as, for example, a protocol/sequence controller 208. Protocol/sequence controller 208 may be useful for controlling the sending of the transparent transaction device 102 identifier to RFID reader 104. For example, protocol/sequence controller 208 may be configured to determine whether the interrogation signal received from the RFID reader 104 is valid, thereby providing to the RFID reader 104 the device identifier stored on device 102, database 214.

Protocol/sequence controller 208 may be in further communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 214 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data may be used by protocol/sequence controller 208 for data analysis and used for management and control purposes, as well as security purposes. Authentication circuitry 210 may authenticate the signal provided by RFID reader 104 by association of the RFID signal to authentication keys stored on database 212. Encryption circuitry may use keys stored on database 212 to perform encryption and/or decryption of signals sent to or from the RFID reader 104.

In addition, protocol/sequence controller 208 may be in communication with a database 214 for storing at least a transparent transaction device 102 account data, and a unique device 102 identification code. Protocol/sequence controller 208 may be configured to retrieve the account number from database 214 as desired. Database 214 may be of the same configuration as database 212 described above. The transaction device account data and/or unique device identification code stored on database 214 may be encrypted prior to storage. Thus, where protocol/sequence controller 208 retrieves the account data, and or unique transaction device identification code from database 214, the account number may be encrypted when being provided to RFID reader 104. Further, the data stored on database 214 may include, for example, an unencrypted unique device 102 identification code, a user identification, Track 1 and Track 2 data, as well as specific application applets.

Figure 3:
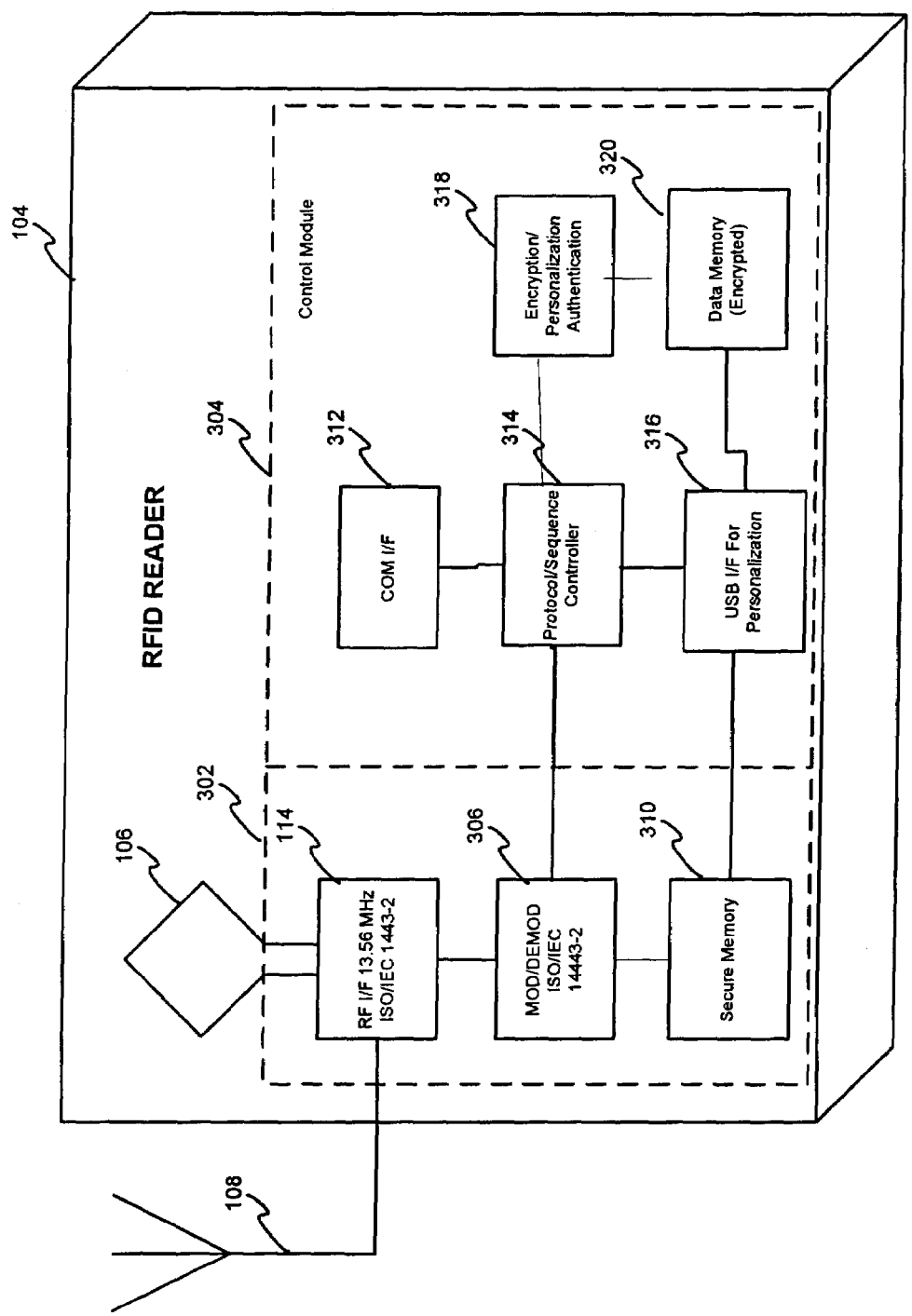
FIG. 3 illustrates an exemplary block diagram of an exemplary RFID reader in accordance with an exemplary embodiment of the present invention.

FIG. 3 illustrates an exemplary block diagram of a RFID reader 104 which may be used in accordance with an exemplary embodiment of the present invention. RFID reader 104 includes, for example, an antenna 106 coupled to a RF module 302, which is further coupled to a control module 304. In addition, RFID reader 104 may include an antenna 108 positioned remotely from the RFID reader 104 and coupled to RFID reader 104 via a suitable cable 120, or other wire or wireless connection.

RF module 302 and antenna 106 may be suitably configured to facilitate communication with an RF responsive transponder 114 contained in a device 102. Where transparent transaction device 102 is formatted to receive a signal at a particular RF frequency, RF module 302 may be configured to provide an interrogation signal at that same frequency. For example, in one exemplary embodiment, transparent transaction device 102 may be configured to respond to an interrogation signal of about 13.56 MHz. In this case, RFID antenna 106 may be 13 MHz and may be configured to transmit an interrogation signal of about 13.56 MHz.

RFID antenna 202 (e.g., antenna 106) may be in communication with a transponder 306 for transmitting an interrogation signal and receiving at least one of an authentication request signal and/or an account data from transaction device 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to the transparent transaction device 102 which are authorized to transact business over system 100. Database 310 may additionally store RFID reader 104 identifying information for providing to device 102 for use in authenticating whether RFID reader 104 is authorized to be provided the device 102 account number stored on card database 214.

Authentication circuitry 308 may be of similar description and operation as authentication circuitry 210. That is, authentication circuitry 308 may be configured to authenticate the signal provided by device 102 in similar manner as authentication circuitry 210 may be configured to authenticate the signal provided by RFID reader 104.

Figure 4:
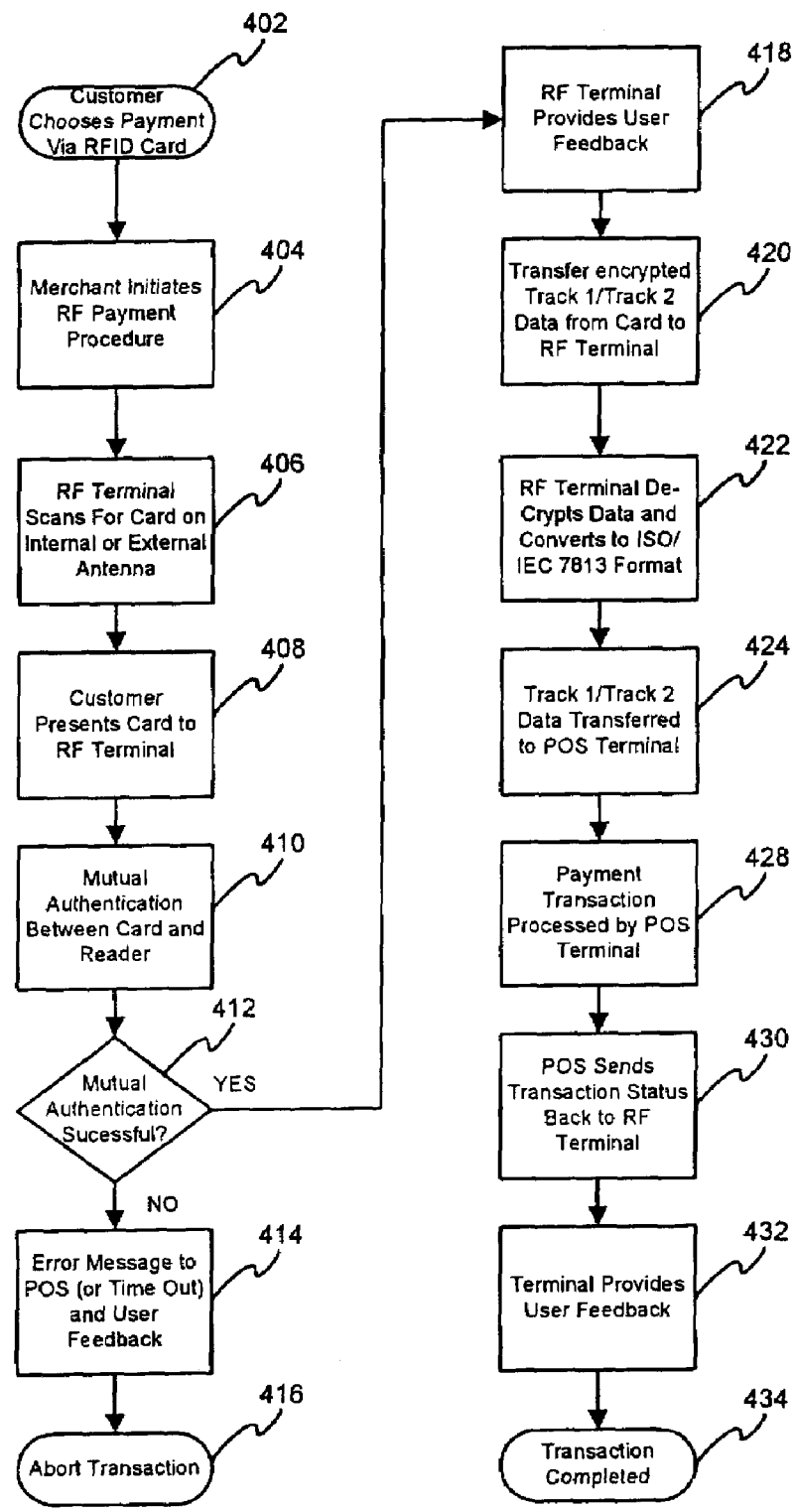
FIG. 4 illustrates an exemplary flow diagram of the operation of an exemplary RF transaction device system in accordance with an exemplary embodiment of the present invention.

FIG. 4 illustrates an exemplary flow diagram for the operation of system 100. The operation may be understood with reference to FIG. 1, which depicts the elements of system 100 which may be used in an exemplary transaction involving the contactless transaction device of the present invention. The process is initiated when a customer desires to present a contactless transparent transaction device 102 for payment (step 402). Upon presentation of the transaction device 102, the merchant initiates the RF payment procedure via a RFID reader 104 (step 404). In particular, the RFID reader sends out an interrogation signal to scan for the presence of transparent transaction device 102 (step 406). The RF signal may be provided via the RFID reader antenna 106 or optionally via an external antenna 108. Upon presenting the transparent transaction device 102 for payment (step 408), the device 102 is activated by the RF interrogation signal provided.

The transparent transaction device 102 and the RFID reader 104 may then engage in mutual authentication (step 410). Where the mutual authentication is unsuccessful, an error message may be provided to the customer via the RFID optical and/or audible indicator (step 414) and the transaction may be aborted (step 416). Where the mutual authentication is successful (step 412), the RFID reader 104 may provide the customer with an appropriate optical and/or audible message (e.g., "transaction processing" or "wait") (step 418). The transparent transaction device protocol/sequence controller 208 may then retrieve from database 214 an encrypted device account number and provide the encrypted account number to the RFID reader 104 (step 420).

The RFID reader 104 may then decrypt the account number (step 422) and convert the account number into magnetic stripe (ISO/IEC 7813) format (step 424) and provide the unencrypted account number to the merchant system 130 (step 428). In particular, the account number may be provided to the POS 110 device for transmission to the merchant network 112 for processing under known business transaction standards. The POS device 110 may then send an optical and/or audible transaction status message to the RFID reader 104 (step 430) for communication to the customer (step 432).

The preceding paragraphs describe in general an exemplary contactless transaction system which may be used with the present invention. It should be noted, however, that the present invention is not limited to the embodiment described. That is, any contactless data transfer system which may be incorporated on a form factor presented by hand may be used. For example, the transponder system described in U.S. Pat. No. 6,073,840, entitled "FUEL DISPENSING AND RETAIL SYSTEM PROVIDING FOR TRANSPONDER PAYMENT," and issued Jul. 13, 2000, and U.S. Pat. No. 5,519,381, entitled "DETECTION OF MULTIPLE ARTICLES," issued May 21, 1996, may be suitable for use with the present invention.

The ability of the transparent transaction device to communicate in a contactless environment is but one aspect of the present invention. In another aspect, the circuitry, such as that described above for facilitating the contactless transaction is preferably included in a transparent transaction device as described below.

As noted, the circuitry is visible by a casual observer, since the layers making up the transaction device body are transparent (i.e., visible therethrough). The layers may be made transparent by incorporating materials having machine recognizable compounds into the layers of the transaction device body. In an exemplary embodiment, the machine recognizable compounds are optically recognizable compounds containing infrared blocking (absorbing, refracting, diffusing, reflecting or otherwise blocking) ingredients. The optically recognizable compounds may be invisible, visible, or colored to produce a desired effect and/or they may contain other detectable compounds, such as, for example, UV-Fluorescent or IR-Fluorescent features. The optical compounds preferably have good stability, resistance properties, durability and other physical properties, such as good appearance, flexibility, hardness, solvent resistance, water resistance, corrosion resistance and exterior stability. Moreover, the use of such compounds typically does not interfere with UV compounds that may be present in many substrates. One skilled in the art will appreciate that the optically recognizable compound is any chemical, solution, dye, ink substrate, material and/or the like which is recognizable by a sensor. In an exemplary embodiment, the optically recognizable ink is an infrared ink which blocks, absorbs or reflects most infrared light, but transmits most other wavelengths of light. The optically recognizable compound is referred to as an IR ink for ease in understanding and not by way of limitation.

In an exemplary embodiment, the optically recognizable compound is incorporated into a material in the form of a film, plastic, fiber, ink, concentrate, thermoplastic or thermoset matrix, thread, planchette, and/or other medium which contains in the range of about 0.001 to 40.0 wt. (%) of a compound derived from organic or inorganic materials. If incorporated in a film, the film containing the compound may be extrusion coated to one or more transparent or translucent layers, as described herein. A suitable process for applying the machine recognizable film is disclosed in U.S. patent application Ser. No. 10/092,681, entitled "TRANSACTION CARD," filed Mar. 7, 2002, and incorporated herein in its entirety.

If incorporated in an ink, the infrared ink may be applied to transparent or translucent layers of transaction card (see, FIGS. 5 and 6) by, for example, a screen printing process or any other printing or coating means such as lithography, gravure, flexo, calendar coating, curtain coating, roller coating and/or the like. An exemplary screen printing process utilizes a screen press equipped with drying equipment (UV curable or convection heat) and a screen with a specific mesh size of about 80 lines/cm. The IR ink may be printed across any portion of the entire card surface of plastic using a silk screen press, as described below.

Because the relative eye sensitivity of an ordinary observer for a specified level of illumination is between around 400–770 nm, infrared ink at over 770 nm is preferable because it is invisible to the human eye in normal white light. As such, the invisible infrared material will not substantially obscure the transparent surface of the transaction card. Additionally, the exemplary ink withstands card production temperatures of about 200 F to 400 F degrees and includes a "light fastness period" (which is the resistance of the ink to fade or degrade in the presence of any light, and specifically, UV light) of about at least three years under normal credit card usage conditions. Moreover, the exemplary ink blocks, absorbs or reflects the spectral output of IRED's, such as, for example, the Sankyo Seiki LED's, which is about 800–1000 nm. In addition, where the transparent transaction device is used with a transaction machine requiring detection of the device using a transaction device detecting phototransistors, the exemplary ink also limits the light reaching the phototransistors, so the presence of a transparent transaction device is detected by the transaction machine.

Exemplary compositions of the machine recognizable compounds of the present invention comprise a mixture of a wide variety of compounds. The active compounds are derived of inorganic, organometallic, ore organic layered materials or rare earth compounds, most commonly rare earth oxides, oxysulfides or oxyhalides. The compounds are relatively inert, so the effects on the performance properties of the final product are minimized. The infrared compound comprises either a dye, layered material, pigment and/or encapsulated pigment that is dispersed in a particular medium which can be incorporated into a wide variety of end-usable products. The particle size of the infrared compound allows the materials (plastic, thread, ink, etc.) to optimally dispersed or dissolved and uniformly exist within the articles which it is incorporated.

Conventionally known infrared materials comprising layered dielectric and metallic materials or doped rare-earth materials can be effectively used as pigments for compounds in accordance with exemplary embodiments of the present invention. In this context, the pigments or dyes absorb specific wavelengths of energy and may change one wavelength of energy to another. The energy conversions or absorptions may be above or below any stimulation within the electromagnetic spectrum. The compounds may absorb specific wavelengths of light or change from one color to another or the compounds may change from invisible to visible and/or the like. The infrared compounds of the present invention are thus incorporated into a system which reversibly changes one wavelength of energy to another, hence causing a "fingerprint"-type of detectable feature within the articles.

Moreover, the prepared films or materials can be mixed with a binder to form infrared compounds for use in threads, fibers, coatings, and the like. Binders that can be incorporated in the present invention include conventional additives such as waxes, thermoplastic resins, thermoset resins, rubbers, natural resins or synthetic resins. Such examples of such binders are, polypropylene, nylon, polyester, ethylene-vinyl acetate copolymer, polyvinyl acetate, polyethylene, chlorinated rubber, acrylic, epoxy, butadiene-nitrile, shellac, zein, cellulose, polyurethane, polyvinylbutyrate, vinyl chloride, silicone, polyvinyl alcohol, polyvinyl methyl ether, nitrocellulose, polyamide, bismaleimide, polyimide, epoxy-polyester hybrid and/or the like. Films that can be used include polyester, polyvinylchloride, polypropylene, polyethylene, acrylic, polycarbonate and/or the like. As discussed below, any film can be laminated or adhered to a transaction device using heat, adhesives, or a combination of both.

If the content of the compound is too low, adequate blocking may not be achieved and the phototransistor may not send the proper signal to the capture device, which will mean that the card will not be detected. Therefore, the infrared compounds are usually present in the composition at a total amount from about 1 PPM to 80.0 wt. (%), and preferably from about 0.25%2–5.0% by weight. Moreover, the present invention contemplates that other materials such as, for example, UV absorbers, reflectors, antioxidants, and/or optical brighteners, may be add in order to achieve better resistance properties, aesthetics, or longevity of the materials.

Particularly, other materials may be added to allow for color shifts from one color to another color after stimulation. Commonly employed materials such as dyes, pigments, fluorescent dyes, luminous pigments, and/or the like, can be used to promote reversible color changes from one color state to another color state. Such materials can be incorporated directly with the infrared compounds during initial processing or may be added after the infrared compounds have been processed. The use of materials such as solvents, water, glycols, and/or the like can be added to adjust rhelogical properties of the material. Also, the use of surfactants, defoamers, release agents, adhesion promoters, leveling agents, and/or the like may be added to the formulations for improved processing properties. Optical brightening materials may also be added to ensure whiteness in a colorless state and to maintain a low level of contrast between many substrates where infrared compounds are located.

The exemplary infrared compounds in accordance with this invention are deposited onto films of various compositions and can be used in most transaction device applications. Moreover, the infrared compounds in accordance with the present invention can be used alone or blended with other materials at ranges from 0.001 to 50.0 parts by weight, but most preferable from 1.0 to 15.0 parts by weight.

Typical examples of suitable inks and films for use with the present invention are described in U.S. Pat. No. 6,581,839 issued Jun. 24, 0203, incorporated herein in its entirety. As such, the various suitable compositions of the IR blocking ink will not be repeated here for brevity.

FIGS. 7A–7I represent various spectra of films, coatings, etc., which demonstrate the ability of the materials used in the transaction device constructions to block sufficient quantities of infrared radiation and transmit visible light in order to produce transparent transaction devices described in the embodiment. The mechanism of blocking may be absorption, reflection, diffusion, dispersion or other methods of blocking radiation in the electromagnetic spectrum. A complete description of the representations in FIGS. 7A–7I may be found in U.S. Pat. No. 6,581,839 incorporated herein. Thus, the description will not be repeated herein for brevity.

In addition to the IR inks, the optically recognizable compound may alternatively be a film or hot mirror which also blocks (absorbs or reflects) infrared light, but transmits all other wavelengths of light. The placement of the optically recognizable compound may be understood with respect to FIG. 5 (depicting a transparent transaction device 500 front surface) and FIG. 6 (depicting a transparent transaction device 500 rear surface). For example, in an exemplary embodiment, the film is set between a transparent/translucent front sheet 11 and back sheet 17. FIG. 8 is a graph of energy v. wavelength for the reflection and transmission of an exemplary IR film including the optically recognizable compound, in accordance with an exemplary embodiment of the present invention. FIG. 8 shows that, while the visible light is transmitted through the film, the infrared light is blocked at higher wavelengths and a substantial amount of infrared light is reflected.

As noted, the optically recognizable compounds may be incorporated into a RF transaction device via a film, plastic, printing ink, coating or other application medium by grinding or the use of dispersed or deposited material into a liquid, paste or other type of medium. To minimize environmental damage to the ink, such as the ink being scratched, the ink is preferably applied directly onto the plastic sheets under the laminate (in step 170 described more fully below). Moreover, the infrared ink may be applied on the inside or outside surface of the plastic sheets.

In an exemplary embodiment, incorporating the optically recognizable compound into a transparent transaction device may not require a separate printing unit, modifications to existing processing equipment or an additional operational step. Particularly, the fabrication of a transaction device, such as a key fob, typically utilizes existing equipment which incorporate colorants anyway, so the application of the optically recognizable compounds to the existing colorants do not add extra equipment or steps to the process.

In a further exemplary embodiment, the optically recognizable compounds block light which is detectable by machines. More particularly, machines suitably detect the presence of a transaction device via infrared interference at one or several wavelengths. In an exemplary embodiment, detection of the transaction device may include the production of a visual effect when the layers of the transaction device are interrogated with invisible infrared radiation from the proper instrument, and when such radiation contacts the infrared material, a visual effect, such as a colored light, can be seen. Alternatively, the material layers may be detected by a remote detector that will indicate the presence of the transaction device. Detection or authentication of the transaction device occurs above and below the stimulation wavelength of the detecting device. As such, once the optically recognizable material has been detected, the detection machine may then provide a positive detection signal.

When used in a contact environment, such as when the transaction device must be detected by a phototransistor of a detection machine to complete a transaction (or for counting devices during manufacture), the detection of the IR materials triggers the phototransistors to enable device detection. In particular, with respect to FIG. 9, the present invention allows for the passage of a greater percentage of visible light (from about 400 nm to 700 nm), which allows the device to appear translucent in nature, while allowing for the blockage of certain light (from about 700 nm and above) to allow the phototransistors to detect that a transaction device is presented for transaction completion. As discussed above, exemplary detection machines include an IRED, a filter and a phototransmitter.

In addition to triggering the phototransistors, RF transparent transaction device 500 may be used in a contact environment, such as when the transaction device includes magnetic stripe or smart card technology. In this way, the optically recognizable material layers of the transparent transaction device permit usage of the transaction device with any magnetic stripe or smart card reader. The detection machine, or reader system, can include a transaction device reader/writer, a point-of-sale terminal, or any other transaction device detection machine as described above. In an exemplary embodiment, transparent transaction device 500 is used in conjunction with a reader which, not only detects the existence of the transaction device 500, but also may illuminate the transparent portion of device 500 when the device 500 is presented to the reader. The illumination source can be either an incandescent or solid-state source (infrared emitting diode or laser). In operation, when the transparent transaction device 500 is presented to a detection machine, the edge of the device 500 may press against the illumination assembly (or activates a switch, interrupts a beam, etc.). Depending upon the application of the transparent transaction device 500, the illumination source can be under the control of the detection machine or an external software. Thus, the illumination source can flash or display a particular color if directed by the external software program. Additionally, depending on the structure of the transparent transaction device, the illumination source could be used to excite an embedded design useful for security or product enhancement.

In an exemplary embodiment, the present invention includes, generally, a transparent transaction device 500 which material layers may be comprised of a base material layer containing transparent or translucent plastic layers 11, 17. The base material layer may additionally include multiple features affixed to the transparent transaction device 500 such as text 30, 32, 34, logos 50, embossed characters 35, magnetic stripe 42, signature field 45, holographic foil 15, and RFID circuitry of similar description as described with respect to FIG. 2, wherein the base material layer includes the opacity gradient 25 of FIGS. 5 and 6.

Transparent transaction device 500 may also include an optically recognizable compound, described above, for allowing the transparent transaction device 500 to be recognized by detection machines, including phototransistors for device 500 detection, and/or for allowing the transparent transaction device 500 to be recognized and counted during device 500 fabrication. The optically recognizable compound on the transparent device 500 is a substantially invisible or translucent infrared ink, mirror or film which blocks (absorbs or reflects) infrared light but transmits all other wavelengths of light (se, FIG. 8).

With respect to FIGS. 10 and 14, an exemplary process for manufacturing a plurality of transparent transaction devices 500 is described. To facilitate understanding material layers 11, 17 are described as sheets 11, 17 which may be used to fabricate a plurality of transaction devices 500. That is, the transaction device fabricated layers may be described as sheets, although one skilled in the art will understand that description applies equally to the manufacture of a single transaction device. To fabricate the transparent transaction devices 500 having at least a front and back surface in accordance with an exemplary embodiment of the present invention, a front sheet 11 and back sheet 17 (FIGS. 5 and 6) consisting of a plastic substrate such as, for example, clear core PVC, are produced (step 100). One skilled in the art will appreciate that sheets 11 and 17 of devices 500 may be any suitable transparent and/or translucent material such as, for example, plastic, acrylic and/or any combination thereof. Each sheet 11, 17 is substantially identical and may vary in size and shape as desired. In one exemplary embodiment, the sheets, 11, 17 may be about 1.5"×2" (38.1 mm×50.8 mm) and about 0.005–0.350 inches, or more preferably 0.01–0.15 inches or 13.5 mil thick although other sizes are contemplated. The front sheet 11 and back sheet may be used as overlays to underlying transparent device materials.

With respect to FIG. 11, the fabrication f the individual device sheets 11 and 17 includes either direct layout (9 layers) of film or the use of a sub-assembly (2–5 layers). An exemplary sub-assembly consists of 5 layers of film with room temperature tack adhesive applied over thermoset and thermoplastic adhesives. In addition, the RFID circuitry for facilitating contactless transactions may be included integral to the subassembly or between one surface of the subassembly and any other card layer by locating the circuitry in an inlay.

In one particular embodiment, the RFID circuitry may be incorporated into an inlay interposed within layers of the transaction device. Alternatively, the RFID circuitry may be included in an inlay, which may be made from polyvinyl chloride (PVC), which in combination form a subassembly. The subassembly may include the RFID circuitry surrounded by at least three llayers: a corelayer of machine recognizable ink, surrounded by a layer of PVC on either side. The RFID circuitry may be added to a surface of the machine recognizable material and laminated between one of the layers of PVC and the machine recognizable material.

Figure 11A:
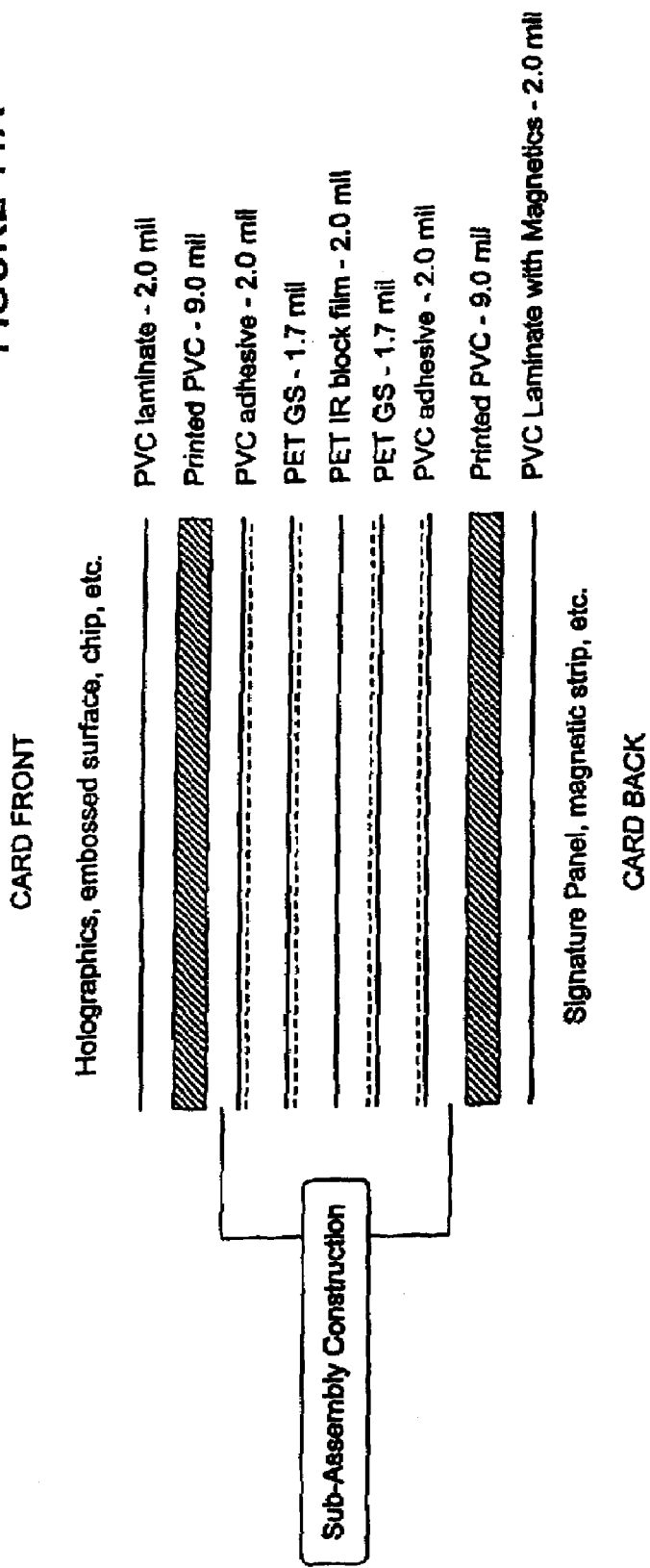
Figure 11B:
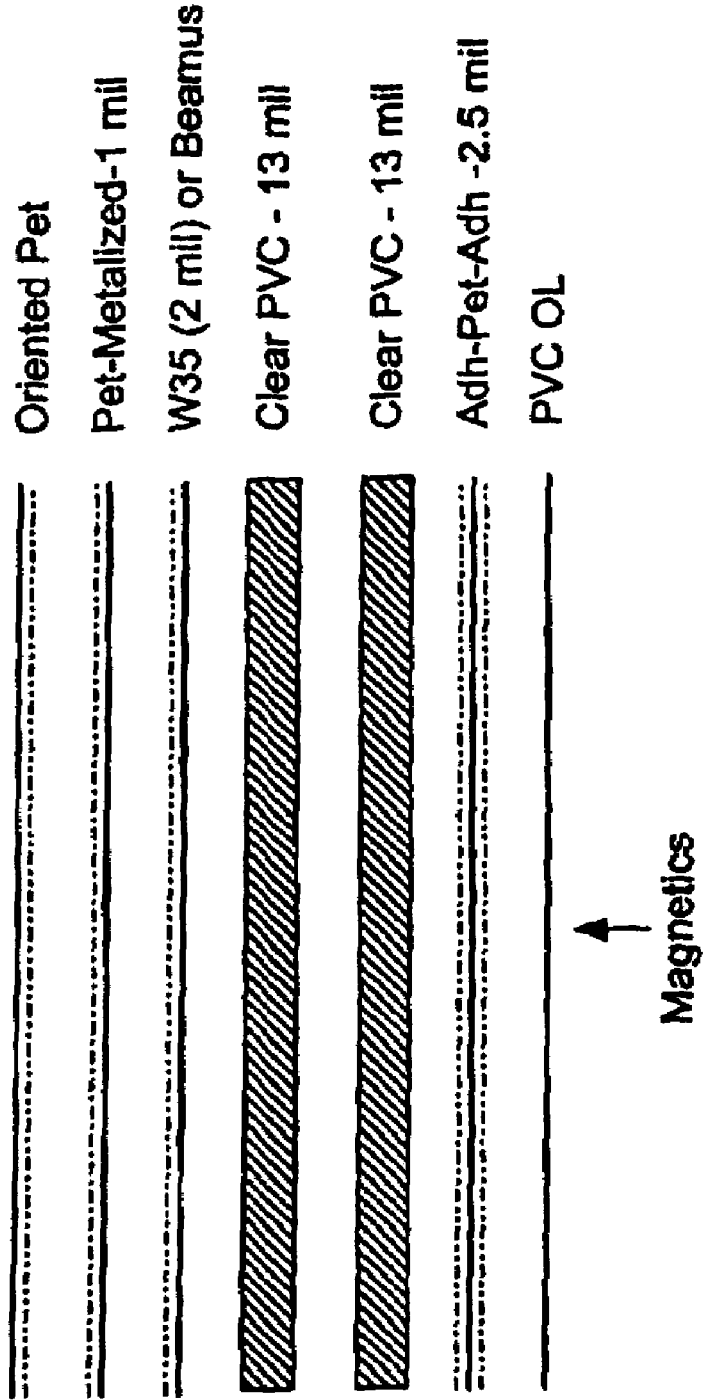
Figure 11C:
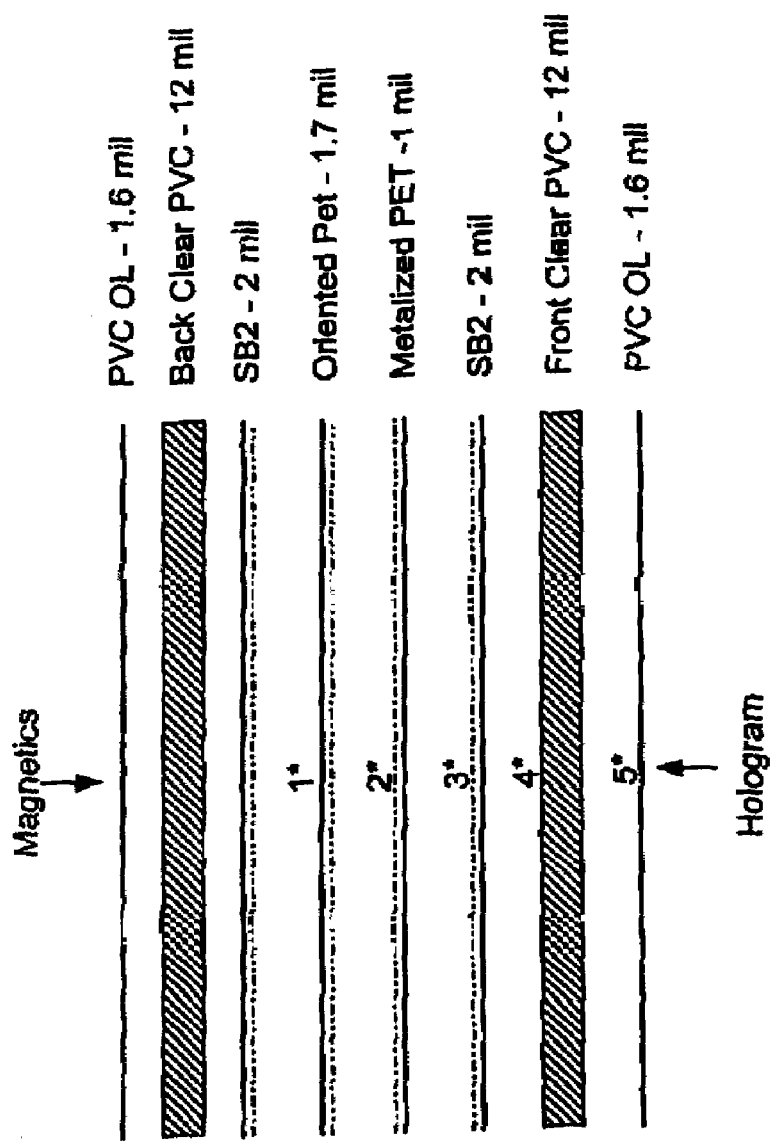
Figure 11D:
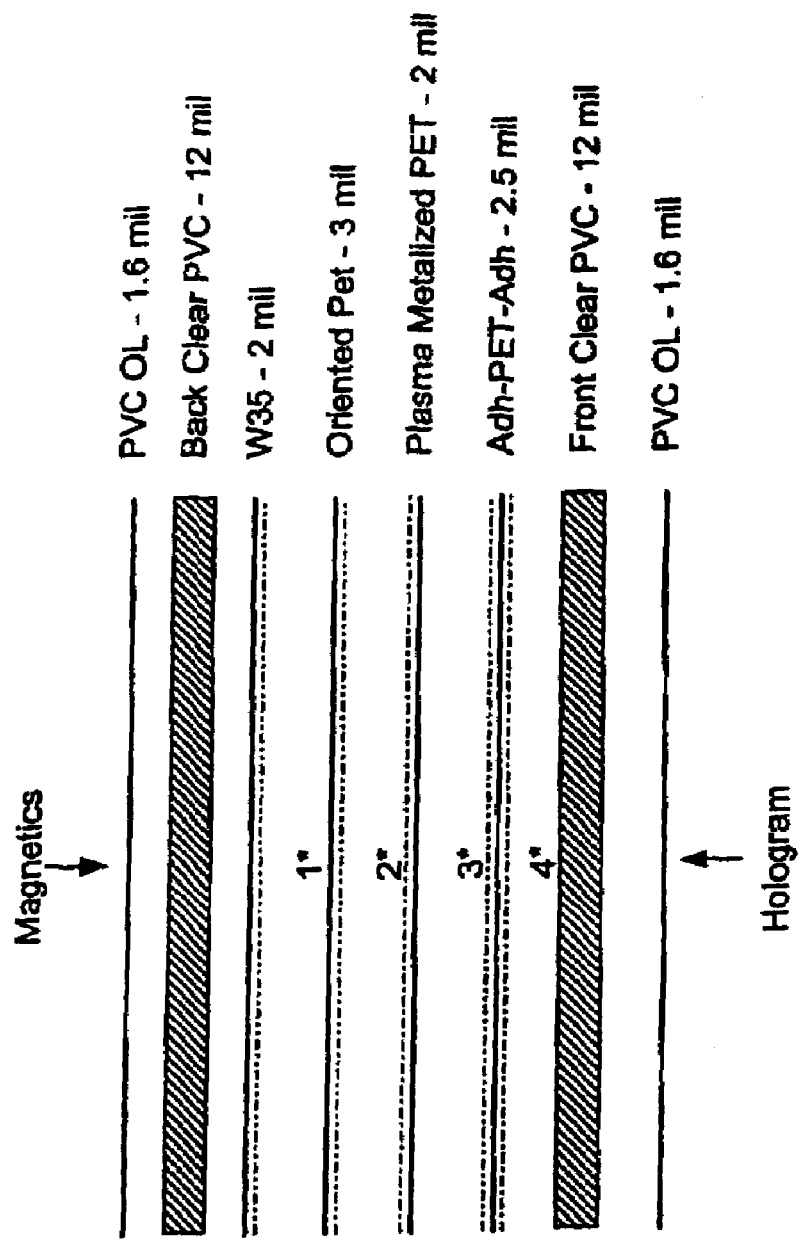
Figure 11E:
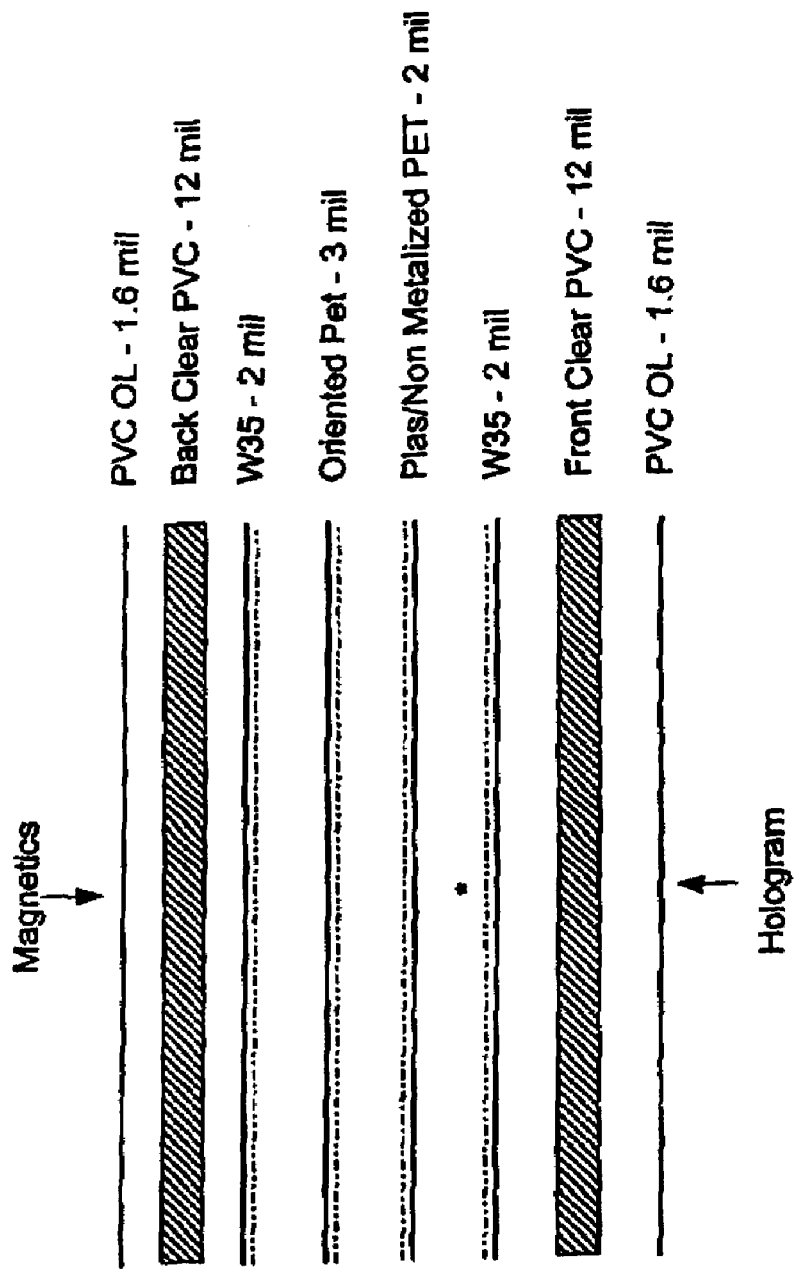
Figure 11F:
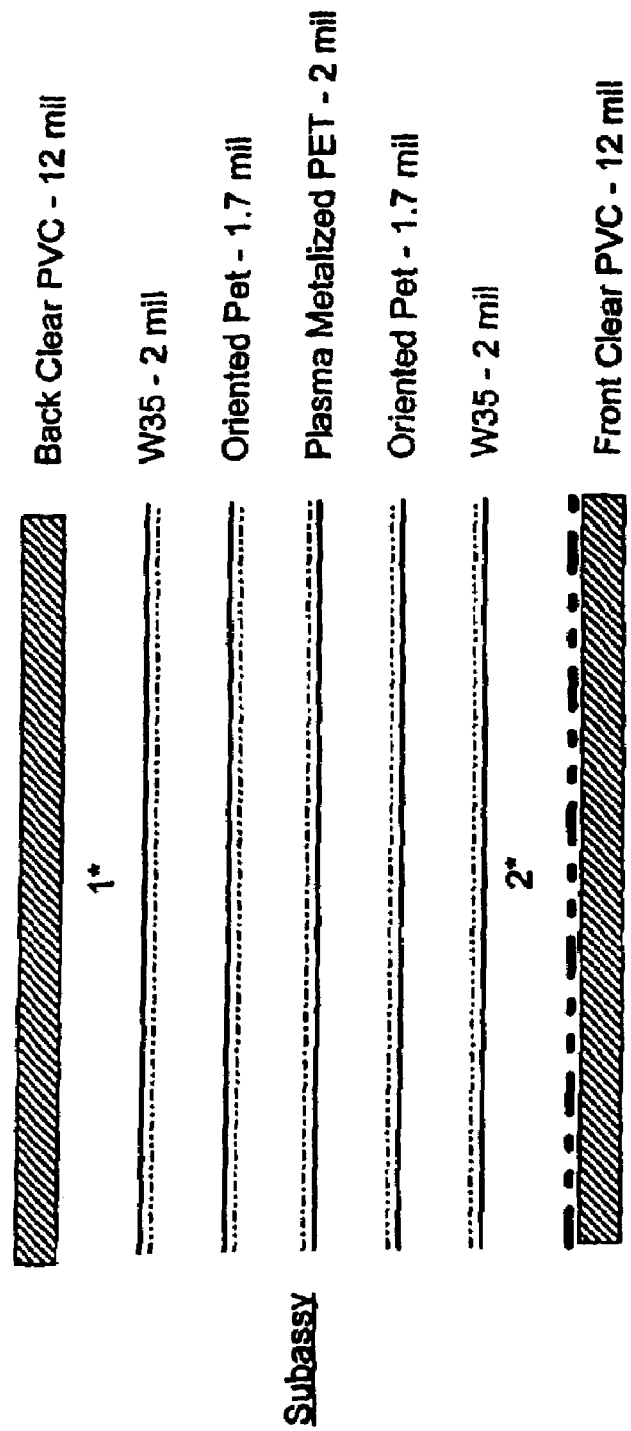

In another exemplary embodiment, the inlay and RFID circuitry may be adhered to the machine recognizable layers after the subassembly is laminated together, whereupon the subassembly is laminated to other layers of the transaction device to provide rigidity and strength. Preferably, the transparent transaction device may include at least from five to seven layers (not including the adhesive layer). For example, as shown in FIG. 11A, the layers may be as follows: two layers of PVC on the outside of the device, which may be adhered to printable layers, and the aforementioned three layers of subassembly (two layers of PVC, one layer of optically recognizable compound) including the RFID circuitry. As noted, the subassembly containing the RFID circuitry including the antenna may be embedded within any other layers according to the present invention. As described herein, the subassembly layers, or other layers within the device, may be milled to provide room for the RFID circuitry so that the device maintains a constant thickness and a smooth surface where desired.

The resulting transparent transaction devices may comprise (from the device front towards the device back) 2.0 mil outer laminate (PVC, polyvinylchloride) having the holographic foil, embossed surface, RFID circuitry, subassembly or inlay, and other indicia on its surface, 9.0 mil printed PVC core with print side out (device front), 2.0 mil PVC adhesive, 1.7 mil PET GS (extrusion coated ppolyethyleneterephthalateu gluable/stampable manufactured y D&K (525 Crossen, Elk Grove Village, Ill. 60007), 2.0 mil PET IR blocking film, 1.7 mil PET GS, 2.0 mil PET adhesive, 9.0 mil printed PVC core with the print side out (device back), and 2.0 mil outer back laminate with a signature panel, applied magnetic stripe and other indicia. Optimally, the PET IR blocking film is fabricated in the middle of the layers to balance the device and minimize warping of the resulting transparent transaction device product. Other exemplary embodiments of the layers are shown in FIGS. 11B–11F and described in U.S. Pat. No. 6,581,839 to Lasch.

FIG. 13 details xemplary embodiments of layers/sheets for transparent transaction device construction, including layer number, material, layer thickness (in mil), source/manufacturer of the material, comments regarding bond strength data and total thickness (in mil). With respect to FIG. 12A, the film bond strength is indicated on a graph of strength (lb/in) v. film bond for various film bonds. With respect to FIG. 12B, the bond strength at the film interfaces is indicated on a graph of strength (lb/in) v. film interface for various film interfaces.

Because the RFID circuitry 20 is eventually embedded into the surface of the substrate (step 195), and the surface of chip 20 is co-extensive with the outer surface of the front sheet 10, the RFID circuitry 20 does not affect the thickness of the overall device 500. Moreover, the sheets include markings which define the boundaries of the individual devices 500 which may be cut from the sheet.

In general, an exemplary process for construction of device 500 having an IR film includes chemical vapor deposition of PET film which has optimal visible and infrared properties (step 105). The chemical deposition is preformed by a Magnetron Machine manufactured by the Magnetron Company. With respect to FIG. 14, the process incorporates a roll chemical vapor deposition sputtering system with three coating zones. The Magnetron roll vapor deposition machine deposits evaporation batches containing Ag, Au and Indium oxide onto optical grade polyethyleneterephthalate using chemical vapor deposition. The Ag/Au/Indium layers are about 100 angstroms each and, depending on the lower wavelength reflections, about three to five layers exist. More details related to vacuum coating, solar coating and Magnetron sputtering can be found in, for example, "Handbook of Optical Properties, Volume I, Thin Films for Optical CCoatings", edited by Rolf Hummel and Karl H. Guenther, 1995, CRC Press, Inc., the entire contents of which is hereby incorporated by reference.

Next, plasma or flame treatment is applied to the PET film for surface tension reduction of the film (step 110). During the deposition and assembly of the layers, the IR film is monitored to optimize the IR blocking spectrum. Thus, the film is then tested against a standard by using a spectrophotometer to test the visible and infrared properties of the PET film (step 115). With respect to FIG. 9, a reflection and transmission monitor with various optical components for vacuum evaporation in-line roll coating operations is utilized to monitor the IR film. In-line spectrophotometric monitoring is part of the vapor deposition process. Transmission at various wavelengths is monitored during the entire run. A tack adhesive is applied to PET GS (polyethyleneterephthalate-gluable/stampable) (step 120) and a pressure laminate is applied to the Indium Oxide metal surface of the PET IR blocking film (step 125). Next, a tack adhesive is applied to the PET side of the IR blocking film (step 130) and a pressure laminate is applied to the PET GS (step 135). Exemplary lamination conditions include 280 F. degrees and 600 psi for 22 minutes, then cooled under pressure for about 18 minutes. A heat seal adhesive is applied to both outer sides of the PET GS, or alternatively, a PVC adhesive is applied to both outer sides of the PET GS (step 140).

In an exemplary embodiment, certain compounds are printed over the surface of sheets 11 and 17. One skilled in the art will appreciate that the printing of the text 30, 32, 34, logos 50, optically recognizable ink and opacity gradient 25 may be applied to any surface of transparent transaction device 500 such as, for example, the front 11 face, the rear 17 face, the inside or outside surface of either face, between the two sheets of base material and/or a combination thereof.

Moreover, any suitable printing, scoring, imprinting, marking or like method is within the scope of the present invention.

The opacity gradient 25 and optically recognizable ink are printed onto the sheets by a silk screen printing process (step 150). With respect to the opacity gradient 25, the exemplary gradient is comprised of a silver pearl ink gradation having an ink stippling which is more dense at the top of transparent transaction device 500 and gradually becomes less dense or clear as it approaches the bottom of the device 500. One skilled in the art will appreciate that the opacity gradient 25 can be any density throughout the gradient 25 and the gradient 25 can traverse any direction across transparent transaction device 500 face. The opacity gradient 25 can be formed by any substance which can provide a similar gradient 25 on device 500. The exemplary ink gradient 25 for each device 500 is printed using known printing inks suitably configured for printing on plastic, such as Pantone colors. In an exemplary embodiment, the ink used for the stippling 25 is a silver pearl ink and is applied to the outside surface of each plastic sheet. Ink gradient 25 is printed on the surface of each of the sheets using a silkscreen printing process which provides an opaque, heavier ink coverage or using offset printing process which provides halftone images in finer detail. A trademark or logo, such as the words "American Express" may e printed in the Pantone colors using a similar silkscreen process.

More particularly, with respect to silk screen printing, artwork containing the desired gradient 25 is duplicated many times to match the number of individual transparent transaction devices 500 to be produced from the sheets. The duplicated artwork is then suitably applied to a screen by any suitable known in the art photo-lithographic process and the screen is then developed. The screen is placed over the sheet and ink is suitably washed across the surface of the screen. The exposed portions of the screen allow the ink to pass through the screen and rest on the sheet in the artwork pattern. If multiple colors are desired, this process can be repeated for each color. Moreover, other security features are optionally silk printed on device 500 such as, for example, an invisible, ultraviolet charge transaction device logo (visible in black light) may be is printed in a duotone of Pantone 307 and 297 using offset and silk screen presses.

The text 30, 32, 34 and logo 50 are printed on the outside surface of each sheet 11, 17 by a known printing process, such as an offset printing process (step 155) which provides a thinner ink coverage, but clearer text. More particularly, with respect to offset printing, the artwork is duplicated onto a metal plate and the metal plate is placed onto an offset press-printing machine which can print up to four colors during a single run. The offset printed text includes, for example, a corporate name 30, a copyright notice 33, a batch code number 34, an "active thru" date 32, contact telephone numbers, legal statements (not shown) and/or the like. The exemplary offset text may be printed in 4 DBC in opaque white ink or a special mix of Pantone Cool Gray 11 called UV AMX Gray.

Because the resulting transaction device 500 is transparent, the text can be seen from both sides of the device 500. As such, if the text is only printed on one sheet, the text may be obscured when viewing the text from the opposite side of device 500 (in other words, viewing the text "through" the plastic substrate). To minimize the obscuring of the text, the front sheet 11 is printed on its outside surface with standard format text and the back sheet 17 is printed on its outside surface with the same text, but the text is in "reverse" format. The back 17 text is aligned with the text on the front face 11, wherein the alignment of the text is aided by device 500 outline markings on the full sheet. Certain text or designs which may be obscured by an compound of device 500 (magnetic stripe 40, transponder system/RFID circuitry 20, etc.) may be printed on only one sheet. For example, in an exemplary embodiment, the corporate logo 50 is printed on only one sheet and is located behind the RFID circuitry 20, thereby being hidden from the front 10 view and hiding at least a portion of the circuitry 20 from the back 17 view. One skilled in the art will appreciate that any of the offset printing can occur on the outside or inside surface of the sheets.

The sheet of laminate which is applied to the back 17 of device 500 (step 170) preferably includes rows of magnetic stripes 40, wherein each magnetic stripe 40 corresponds to an individual device 500. The magnetic stripe 40 may extend along the length of device 500 or a portion thereof and may be applied to the back 17 surface, top portion of device 500 in conformity with ISO standards for magnetic stripe 40 size and placement. However, the magnetic stripe 40 may be any width, length, shape, and placed on any location on device 500. The two track magnetic stripe 40, including the recorded information, can be obtained from, for example, DDai Nippon, 1—1, Ichigaya Kagacho 1-chome, Shinjuku-ku, Tokyo 162-8001, Japan, Tel: Tokyo 03-3266-2111.1 an exemplary embodiment, the magnetic stripe is applied to the outer laminate using a tape layer machine which bonds the cold peel magnetic stripe to the outer laminate roll with a rolling hot die and at suitable pressure. The roll is then cut into sheets at the output of the tape layer before the device material layers are assembled and the stripe is fused to the transparent transaction device during the lamination process.

Although prior art magnetic stripes 40 in current use are black, in a particularly exemplary embodiment, the magnetic stripe 40 of the present invention may be a silver magnetic stripe 40. Exemplary silver magnetic stripe 40 is 2750 oersted and also conforms to ISO standards. Moreover, the silver magnetic stripe 40 includes printing over the magnetic stripe 40. The printing on the magnetic stripe 40 can include any suitable text, logo 50, hologram foil 15 and/or the like; however, in an exemplary embodiment, the printing includes text indicative of an Internet web site address. Dai Nippon Printing Co., Ltd. (more information about Dai Nippon can be found at www.dnp.co.jp) prints a hologram or text on tthe mag stripe using for example, the Dai Nippon CPX10000 card printer which utilizes dye sublimation retransfer technology having a thermal head which does not contact the transparent transaction device surface. The card printer utilizes the double transfer technology to print the image with the thermal head over a clear film and then retransferring the printed image onto the actual transaction device media by heat roller. The printing of information on the surface of the magnetic stripe 40 is preformed by, for example, American Banknote Holographics, 399 Executive Blvd., Elmsford, N.Y. 10523, (914) 592–2355. More information regarding the printing on the surface of a magnetic stripe 40 can be found in, for example, U.S. Pat. No. 4,684,795, issued on Aug. 4, 1987, to United States Banknote Company of New York, the entire contents of which is herein incorporated by reference.

After the desired printing is complete and the magnetic stripe applied, the front 11 and back 17 sheets may be placed together (step 160), and the sheets are preferably adhered together by any suitable adhering process, such as a suitable adhesive. One skilled in the art will appreciate that, instead of printing on two sheets and combining the two sheets, a single device 500 can be used, wherein device 500 is printed on one side, then the same device 500 is re-sent through the printer for printing on the opposite side. In the present invention, after adhering the sheets together, a sheet of lamination, approximately the same dimensions as the plastic sheets, nnamely 3'×4', is applied over he front 10 and back 17 of device 500. After the laminate is applied over the front 11 and back 17 of the combined plastic sheets (step 170), device 500 layers are suitably compressed at a suitable pressure and heated at about 300 degrees, at a pressure of between 90–700 psi, with a suitable dwell time to create a single transparent transaction device 500. The aforementioned device fabrication can be completed by, for example, Oberthur Card Systems, 15 James Hance Court, Exton, Pa.

In an exemplary embodiment, the device layers are fused together in a lamination process using heat and pressure. During the hot press phase, the press is heated to about 300 F. degrees and the pressure builds to about 100 psi and holds for about 90 seconds. The pressure then ramps up to about 350 psi over an about 30 second period and holds for 16 minutes at the same temperature, namely 300 F. degrees. The device layers are then transferred to a cold press which is at about 57 F. degrees. The pressure builds to about 400 psi and is held for about 16 minutes as chilled water of about 57 F. degrees is circulated in the plates. The cold press then unloads the transaction device.

Figure 5:
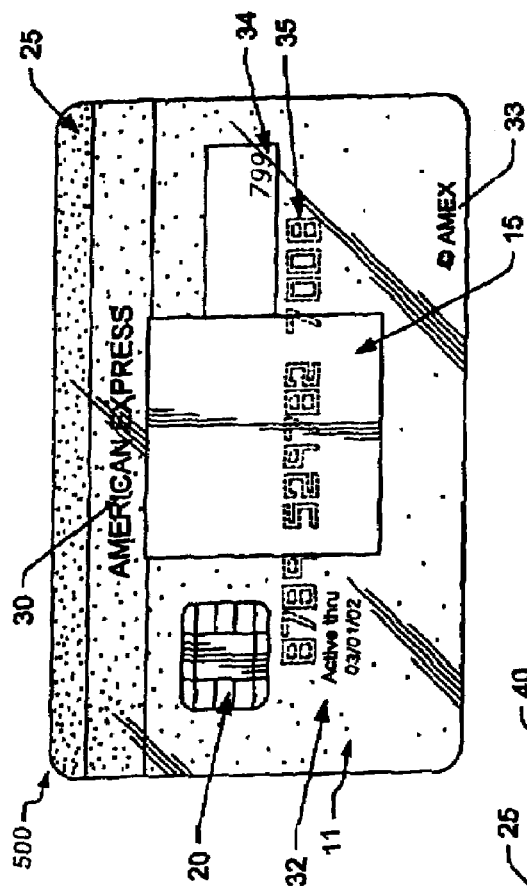
FIG. 5 depicts the front surface of an exemplary contactless transparent transaction device in accordance with an exemplary embodiment of the present invention.
Figure 6:
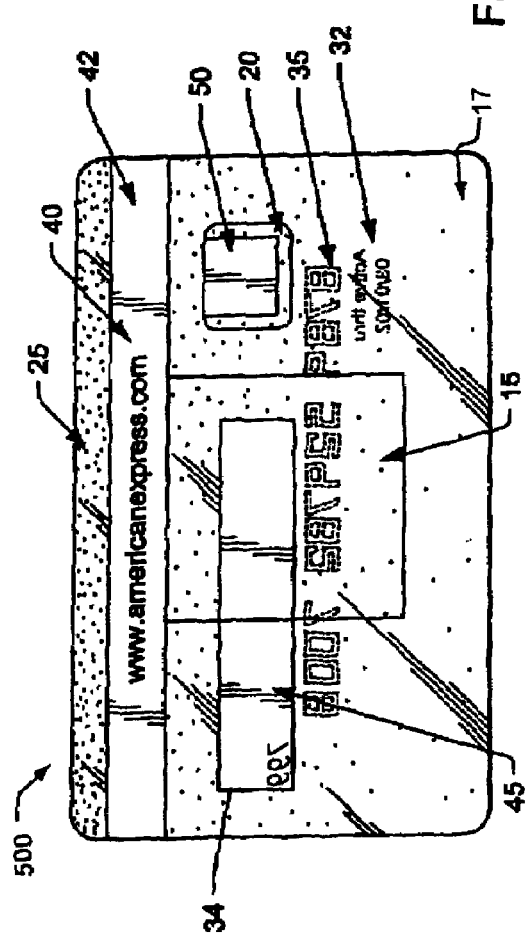
FIG. 6 depicts the rear surface of an exemplary contactless transparent transaction device in accordance with an exemplary embodiment of the present invention.
Figure 7A:
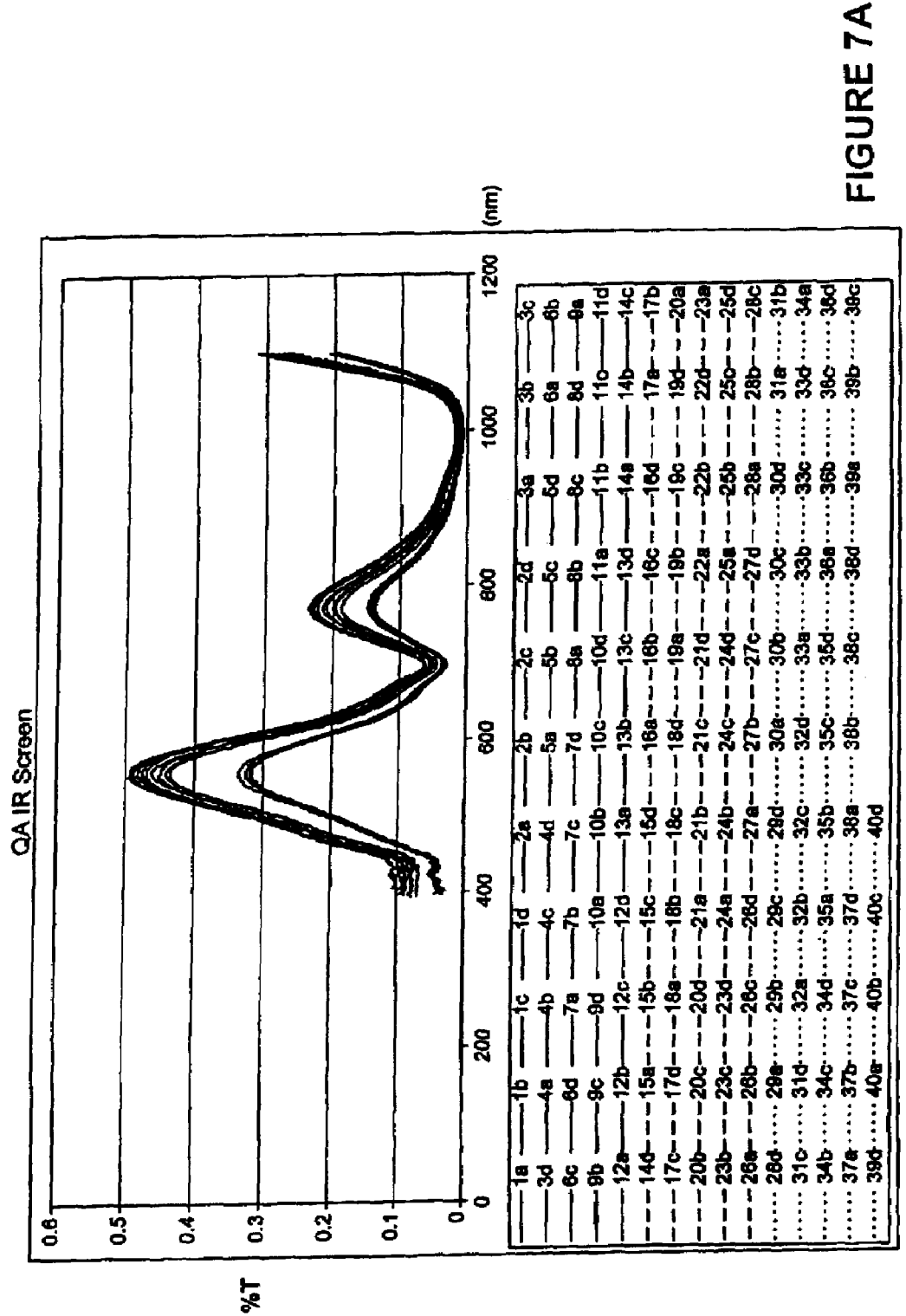
Figure 7B:
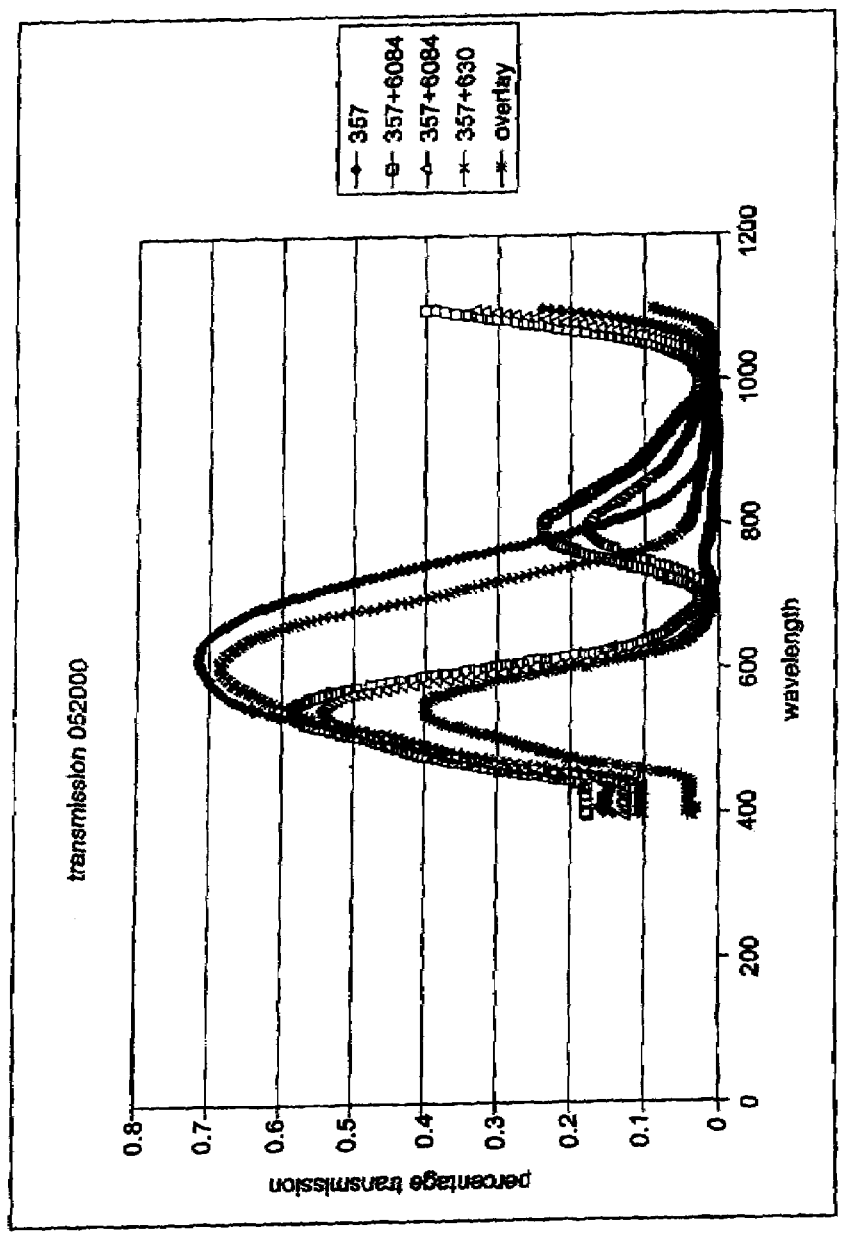
Figure 7C:
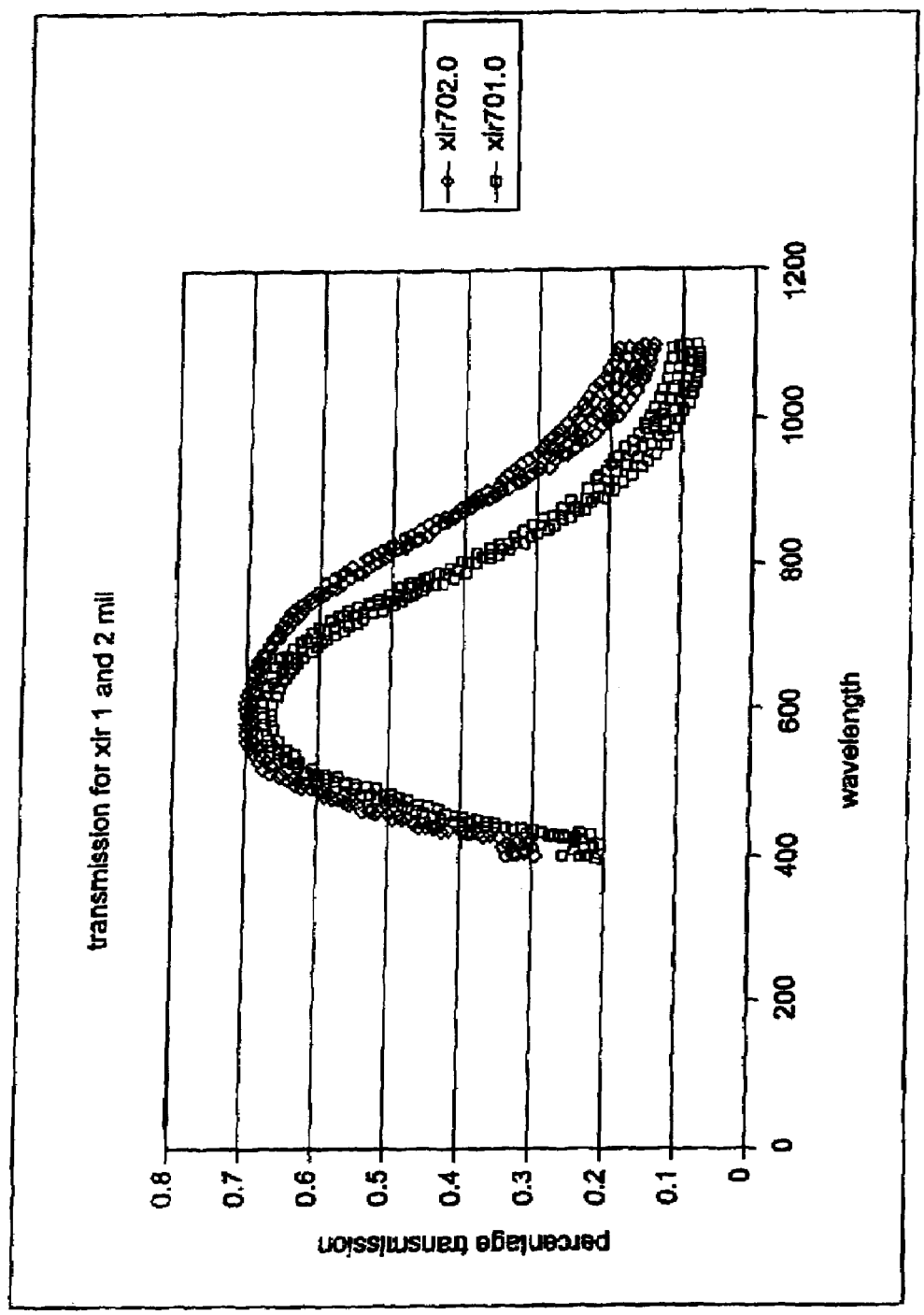
Figure 7D:
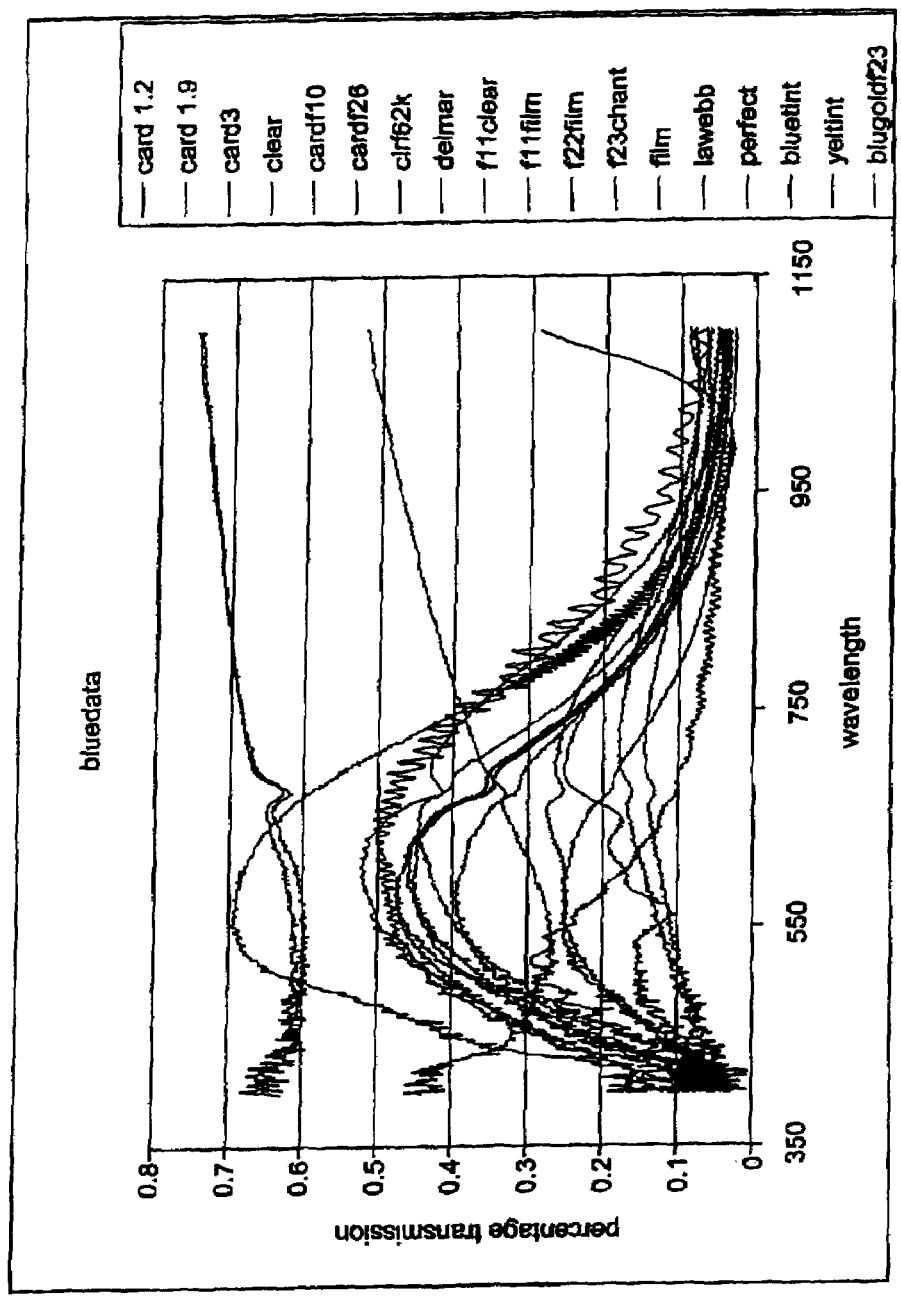
Figure 7E:
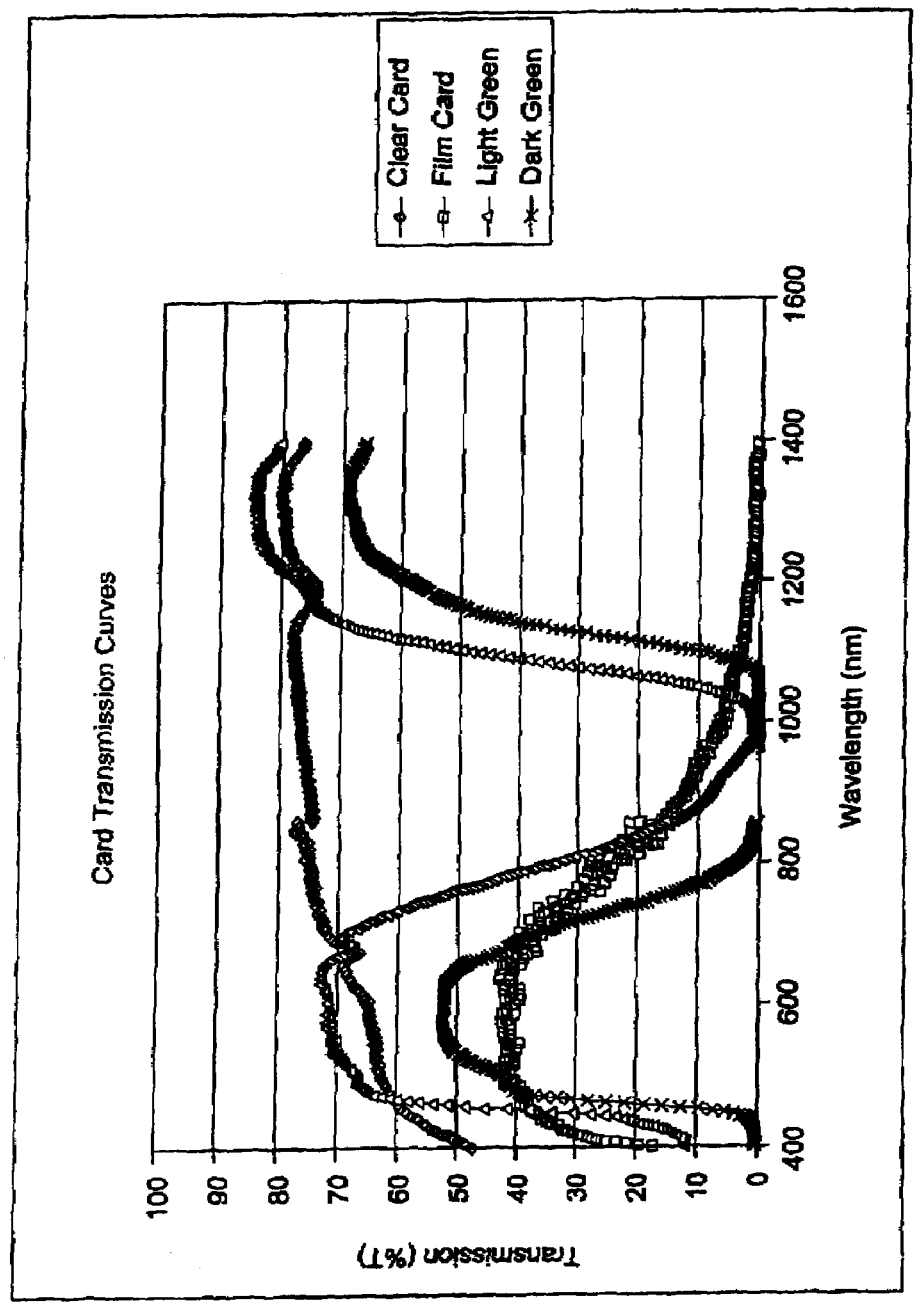
Figure 7F:
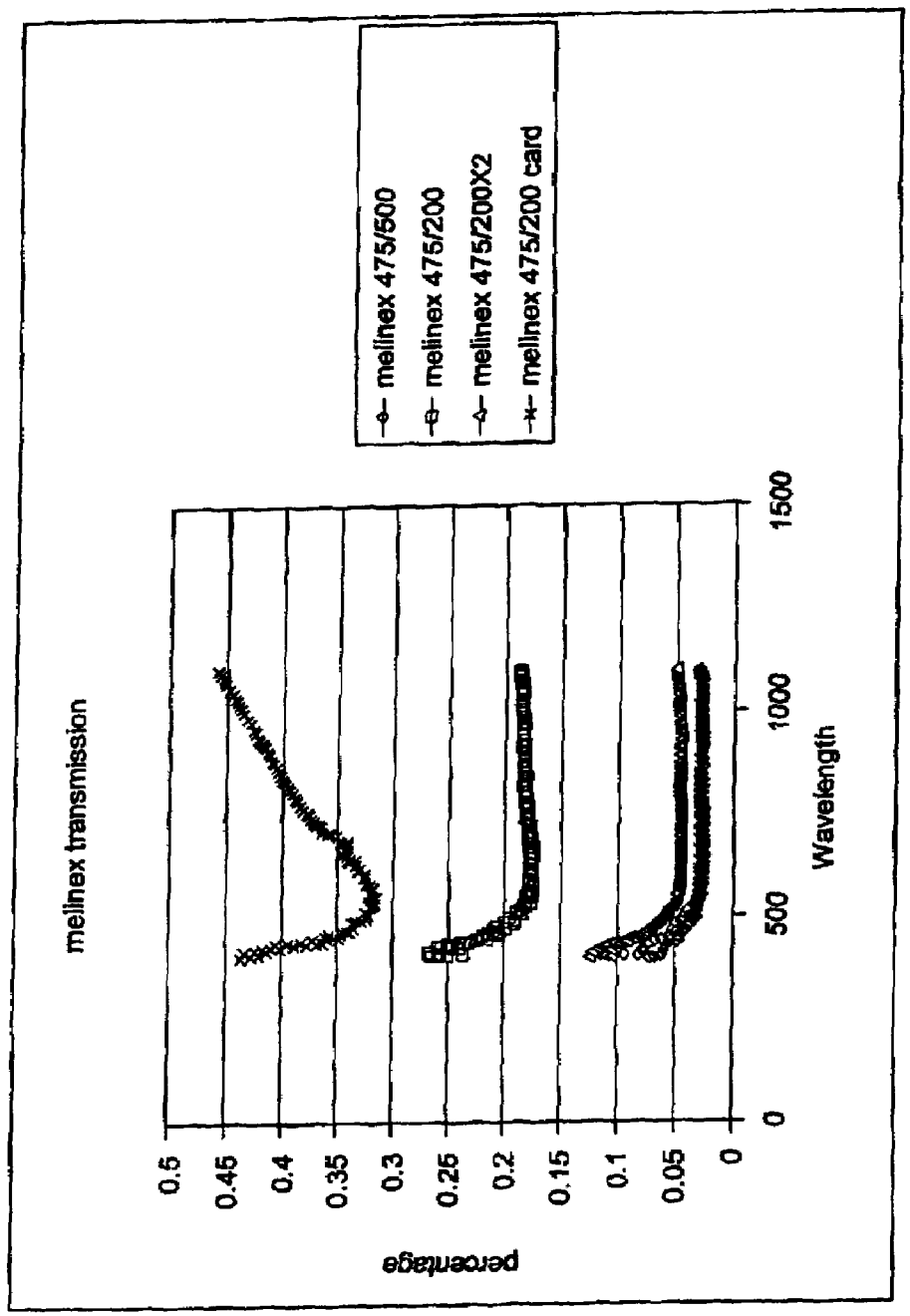
Figure 7G:
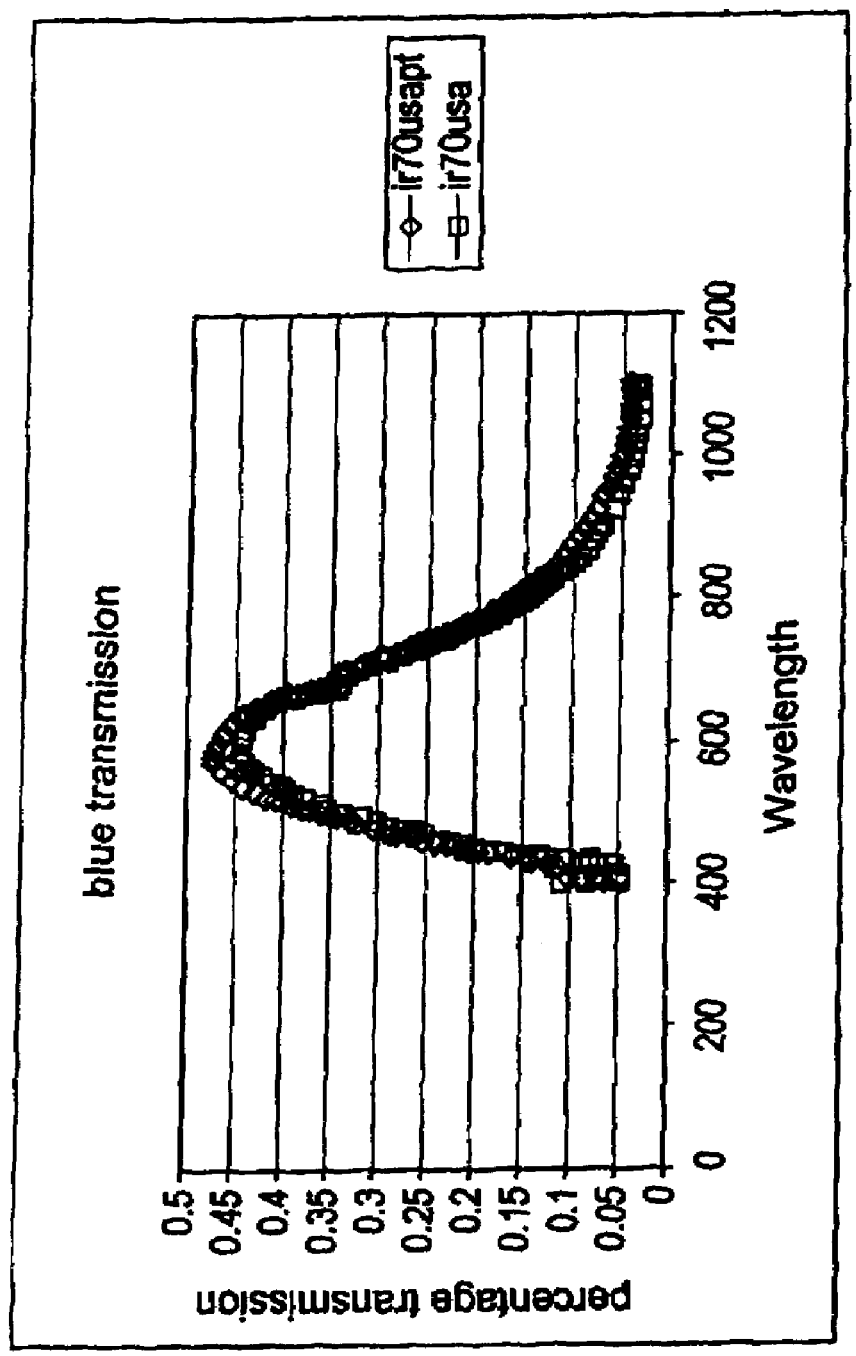
Figure 7H:
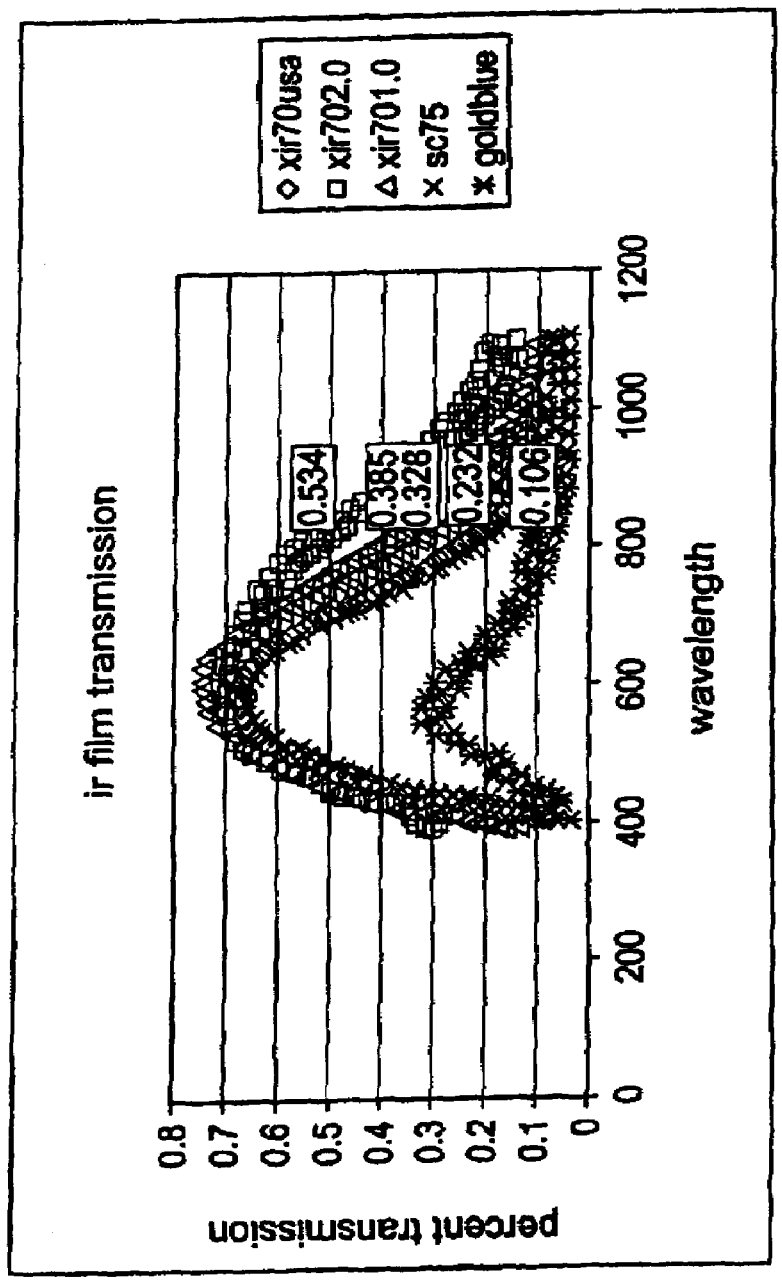
Figure 71:
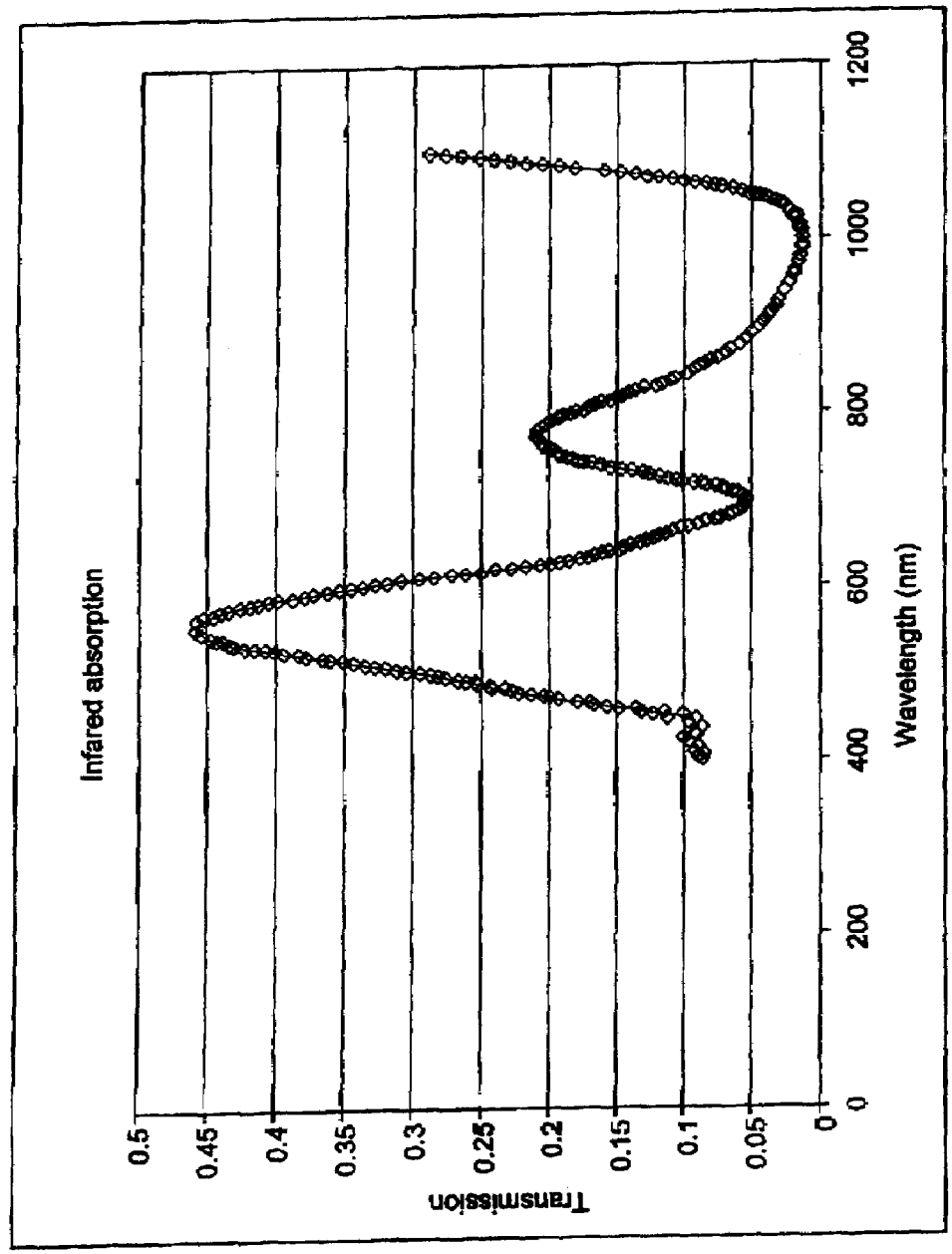

With respect to FIGS. 5 and 6, after the laminate is applied, a signature field may be applied to the back surface 17 of device 500 (step 175) and the holographic foil 15 may be applied to the front 10 of device 500 (step 190). With respect to signature field 45, although prior art signature fields are formed from adhering a paper-like tape to the back 17 of device 500, in an exemplary embodiment of the present invention, the signature field 45 is a translucent box measuring about 2" by ⅜" and is applied to the device using a hot-stamp process. The verification of the signature in signature field 45 by the merchant is often a device 500 issuer requirement for a merchant to avoid financial liability for fraudulent use of device 500. As such, the translucent signature field 45 on the transparent device 500 not only allows the clerk to view at least a portion of the signature field 45 from the front of the device 500, but the signature view also encourages the clerk to turn over device 500 and verify the authenticity of the signature with the signed receipt.

After the device sheets are laminated, the sheets are cut into individual shapes embodying devices 500 (step 180), for example, by a known stamping process, including any necessary curing, burrowing, heating, cleaning and/or sealing of the edges. The individual transaction devices 500 may take any suitable shape and are therefore not limited thereby. Devices 500, for example, may be formed in the shape of conventional key fobs, such as, for example, shapes similar to the Expresspay key fob by American Express, the Speedpass produced by Mobil Gas Company, the Discover 2GO produced by Discover. In an exemplary embodiment, laminated sheets of multiple transaction devices may be cut in half on aa guillotine resulting in two half-sheets of transparent devices. The half-sheets may be loaded onto a transaction device punch machine which aligns the sheets to a die (x and y axes) using predetermined alignment marks visible to the optics of the machine. The half-sheets are then fed under the punch in seven steps. Particularly, a fixed distance feed is followed by another optic sensor search to stop the feed at the pre-printed alignment mark, then the machine punches a row of multiple transaction devices out at one time. After die cutting and finishing according to standard processing, the IR reflection properties are verified in-line (step 185) before application of the holographic foil 15.

With respect to the application of an exemplary holographic foil, the holographic foil 15 is adhered to device 500 (step 190) by any suitable method. In an exemplary embodiment, a substantially square steel die, which is aabout 1¼"×1¼" with rounded corners and a 0.0007" crown across the ontacting surface, stamps out the individual foils 15 from a large sheet of holographic foil 15. The die is part of a hot stamp machine such that the die is sent through a sheet of foil 15, cutting the foil 15 around a particular image and immediately applying the foil 15 with heat to the front 10 surface of card 5 after the card has been laminated. The die temperature may be in the range of about 300 F. degrees [+/−] plus or minus 10 F. degrees. The dwell time is approximately ½ seconds and the application speed is set based upon the individual hot stamp applicator; however, the foregoing temperature and dwell is identified for a speed of 100 transaction devices per minute. U.S. Pat. Nos. 4,206,965, 4,421,380, 4,589,686, and 4,717,221, by Stephen P. McGrew provide more details about hot stamping of a holographic image and are hereby incorporated by reference.

With respect to the holographic foil 15, the foil 15 can be any color, contain any hologram, can be applied to any location on device 500, and can be cut to any size, shape and thickness. In an exemplary embodiment, the holographic foil 15 sheet preferably includes a gray adhesive on the bottom side and a blue, mirror-like, three-dimensional holographic surface on the top side containing numerous holographic images about 1¼"×1¼" each. he exemplary hologram includes a 360 degree viewability and diffracts a rainbow of colors under white light. The full color hologram is created by, for example, American Banknote Holographics.

The corners of the individual foil 15 are preferably rounded to minimize the likelihood that the foil 15 will peal away from the surface of device 500. Moreover, when applied to the transaction device, the blue holographic surface faces away from device 500 while the gray adhesive side is applied to device 500 surface. The top surface of the holographic foil 15 may be created by any suitable method such as reflection holographics, transmission holographics, chemical washing, the incorporation of mirror compounds and/or any combination thereof. The holographic foil 15 can be fabricated by, for example, American Banknote Holographics, Inc., located at 1448 County Line Road, Huntingdon Valley, Pa., 19006.

The exemplary holographic foil includes various layers. One skilled in the art will appreciate that any ordering, combination and/or composition of these layers which provides a similar holographic effect is still within the scope of the present invention. In an exemplary embodiment, the holographic transfer foil structure includes the following layers: 90 gauge polyester carrier, release coat, embossable resin, vacuum deposited aluminum, tie coat and size coat. During the transfer process, the embossable resin, vacuum deposited aluminum, tie coat and size coat layers are deposited onto a substrate.

In an exemplary embodiment, the sheets of holographic foil 15 are transmission holograms suitably created by interfering two or more beams of converging light, namely an object beam and reference beam, from a 20 watt Argon laser at 457.9 nm, onto a positive photoemulsion (spun coat plates using shiply photoresist). The system records the interference pattern produced by the interfering beams of light using, for example, a 303A developer. The object beam is a coherent beam reflected from, or transmitted through, the object to be recorded which is preferably a three-dimensional mirror. The reference beam is preferably a coherent, collimated light beam with a spherical wave front 10.

The incorporation of the holographic foil 15 onto a transaction device 500 provides a more reliable method of determining the authenticity of the transaction device 500 in ordinary white light, namely by observing if the hologram has the illusion of depth and changing colors. Thus, to allow the hologram to be viewed with ordinary, white light, when the hologram is recorded onto the transparent transaction device 500 the image to be recorded is placed near the surface of the substrate. Moreover, the hologram is be embossed on a metalized carrier, such as the holographic foil 15, or alternatively the hologram may be cast directly onto the transparent plastic material. When formed on the clear plastic material, the hologram is made visible by the deposit of a visible substance over the embossed hologram, such as a metal or ink. More information regarding the production of holograms or the production of holographic foil 15 can be found in, for example, U.S. Pat. No. 4,684,795, issued on Aug. 4, 1987, to United States Banknote Company of New York or from the American Banknote Holographics, Inc., web site at www.abnh.com, both of which are herein incorporated by reference.

In an exemplary embodiment, the application of holographic foil onto vinyl materials of the transaction device may be accomplished by using a metallized foil. The foil may be un-sized, metallized, embossable, abrasion, and chemical resistant hot stamping foil on a 1.0 mil (92 gauge) polyester carrier. All of the exemplary materials are tinted with raw materials supplier color code #563 (blue). The foil is vacuum metallized with aluminum and has an optical density range of about 1.60 to 2.00. The optimum foil is free of visible defects and particulate matter. The foil contains release characteristics of about 0 to 7 grams based upon a release testing unit having a die face of 300 F. degrees, 80 psi, 1.0 seconds dwell, 0.1 seconds delay in the removal of the carrier at a 45 degree angle. An exemplary base material is capable of receiving a permanent, high fidelity (based upon an embossing die of 100%, having at least 70% diffraction efficiency) impression of the holographic image surface by embossing with a hard nickel die in the range of about 1600 pounds per linear inch at about 100 pounds air pressure and in the range of about 200 to 350 F. degrees die temperatures. When testing the embossibility of the base material, the testing includes a primary and secondary image to assure the embossable coating is capable of producing an optimal secondary image.

With respect to the mechanical and chemical durability of the holographic foil, the foil resists abrasions. As such, after sizing and stamping the foil onto the vinyl material of the device, the transferred hologram withstands about 100 cycles on the Taber Abrader using CS-10 wheels and about a 500 gram load before signs of breakthrough. The foil resists scuffing such that the foil withstands about 6 cycles on Taber Abrader under the same conditions without any substantial visual marks, scratches or haze. The holographic foil also resists any substantial evidence of cracking the vinyl in the hologram area when embossed on a DC 50000 encoder or an equivalent system. Moreover, the embossed, un-sized foil on the polyester carrier is capable of being stretched 15% without cracking of the base coat. Moreover, the exemplary vinyl material with the exemplary hologram withstands 15 minutes in an oven at 110 C. degrees with the image clearly visible after the test. Additionally, the exemplary hologram does not show any visible effects after 5 cycles of 8 hours at 0 degrees and 16 hours at 60 C. degrees. The exemplary holograms on the vinyl materials also resist plasticizers, alkalis, acids and solvents. In particular, the devices with holograms withstand immersion in warm liquid plasticizers (typically dioctyl phthalate) up to the point of severe swelling of the foil. The image on the device is not substantially affected by contact with plasticized vinyl for a period of five days at 60 C. degrees. With respect to alkalis, the holograms on the devices withstand approximately 1 hour immersion in 10% ammonium hydroxide at room temperature without deterioration. Moreover, the hologram does not show substantial deterioration after 50 hours of immersion at room temperature in artificial alkaline perspiration (10% sodium chloride, 1% sodium phosphate, 4% ammonium carbonate, and pH 8.0). With respect to acids, the exemplary holograms on the transaction devices substantially withstand approximately 1 hour immersion in 10% acetic acid at room temperature without substantial deterioration. Moreover, the exemplary hologram substantially withstand, without substantial deterioration, 50 hours immersion at room temperature in artificial acetic perspiration (10% sodium chloride, 1% sodium phosphate, 1% lactic acid, pH 3.5).

With respect to solvents, the exemplary holograms on cards substantially withstand the following: ethylene glycol (100% and 50% in water) ith no substantial effects after 4 hours at room temperature, ethyl alcohol (100% and 50% in water) with no substantial effect after 4 hours at room temperature, methyl ethyl ketone has no substantial effect after 1 minute at room temperature, toluene has no substantial effect up to severe swelling of the device for (30 minutes at room temperature), water has no substantial effect after 16 hours at 60 C. degrees and concentrated laundry detergent has no substantial effect after 20 hours at room temperature.

Moreover, the exemplary holograms on the vinyl materials do not show substantial effects after being washed and dried in a commercial washer and dryer inside a pants pocket at permanent press settings.

The transparent transaction device substrate may be comprised of a vinyl base or other comparable type material which is suitably capable of accepting a hot stamping of a hologram without substantially violating the present composition of the hologram or its coatings. When adhering the hologram to the vinyl material, the coating exhibits a consistent blush and is uniform in color, viscosity and free of contamination. The adhesion of the hologram to the transparent transaction device is also sufficiently strong enough such that the application of Scotch 610 tape over the hologram which is removed at a 45 degree angle will not result in a significant amount of foil removed from the substrate.

With respect to the brightness of the image, a diffraction reading is obtained at a minimum of about 2 microwatts on the registration blocks. Moreover, with respect to image quality, the images are substantially free of defects such as large spots, scratches, wrinkles, mottle, haze, and/or any other defects which substantially distort the image.

After stamping out the individual device 500 shapes and applying the holographic foil, the RFID circuitry 20 may be applied to device 500 (step 195) by any suitable method, such as adhesive, heat, tape, groove and/or the like. More particularly, a small portion of the front 11 surface of device 500 is machined out using, for example, a milling process. The milling step removes about 0.02 mils of plastic from the front 11 surface, such that the routed hole cuts into the two core layers of plastic, but does not go through the last outer laminate layer of plastic, thereby forming a 5235HST pocket. RFID circuitry may include a 5235 palladium plated with silver, rather than the standard gold plating. Circuitry 20 may be applied to the device using a process known as "potting." Any suitable adhesive, such as a non-conductive adhesive, is placed into the machined hole and the RFID circuitry 20, inincludingntenna, is placed over the adhesive such that the topmost surface of the circuitry 20 and antenna are substantially even with the front 10 surface of device 500. Suitable pressure and heat is applied to the circuitry 20 to ensure that the circuitry 20 is sufficiently affixed to device 500. In an exemplary embodiment, the RFID circuit 20 structure, design, function and placement conforms to ISO standards for RFID circuitry used on conventional key fobs. Further, the antenna may take any form, shape or arrangement permitting the antenna to be positioned for receipt of an interrogation signal. Such methods for constructing and arranging RFID antennas are well known and will not be repeated here for brevity.

After applying the holographic foil 15 and the RFID circuitry 20 to device 500, certain information, such as account number 35 and "active thru" 32 date (not shown), are preferably embossed into device 500 surface layer (step 200) by known embossing methods. The embossing can be completed by, for example, Oberthur Card Systems. Although any information can be embossed anywhere on transaction device 500, in a particularly exemplary embodiment, the account numbers 35 are embossed through the holographic foil 15 to reduce the possibility of the transfer of the holographic foil 15 to a counterfeit device 500 for fraudulent use. Additionally, although prior art transaction devices include a beginning and ending validity date, the present device 500 may only include an "active thru" 32 date, namely a date in which the device expires.

While the foregoing describes an exemplary embodiment for the fabrication of transparent transaction device 500, one skilled in the art will appreciate that any suitable method for incorporating text 30, 32, 34, logos 50, embossed numbers 35, a magnetic stripe 42, a signature field 45, holographic foil 15, an RFID circuitry 20 and opactiy gradient 25 (see, FIGS. 1 and 2) onto a substrate is within the scope of the present invention. Particularly, the holographic foil 15, RFID circuitry 20, logo 50, magnetic stripe 40, signature field 45 or any other compound may be affixed to any portion of device 500 by any suitable means such, for example, heat, pressure, adhesive, grovvoe and/or any combination thereof.

In another exemplary embodiment, the transaction device may have a plurality of perforations through one or more layers of the multilayer transaction device. Alternatively, the transaction device may have infrared-blocking ink printed on a layer of the transaction device thereby giving the transaction device the appearance of having perforations in one or more layers (both called "perforations" herein for ease in understanding). In this way, the perforations can be arranged to form an outline of a shape, a picture, a security enhancing visage or the like. Suitable methods for providing perforations are disclosed in U.S. patent application Ser. No. 10/288,945, entitled "PERFORATED TRANSACTION CARD," filed Nov. 6, 2002, incorporated herein by reference in its entirety.

FIGS. 15A through 18, illustrate exemplary transparent transaction devices in the shape of a key fob constructed in accordance with the present invention. The transparent key fob 1 may be partially, substantially and/or fully transparent throughout. To emphasize this point, FIGS. 15 through 18 show a RFID reader transparent transaction fob 1 including an internally positioned antenna of varying arrangements and configurations which are visible through the fob body. FIGS. 15A and 15B depict a transparent fob 1 including a RFID circuit 20 and antenna coil 16 substantially coiled at one end of the card body. FIG. 15A depicts the transparent fob 1 from a frontal view, and FIG. 15B depicts fob 1 from a rearward view. As can be seen, RFID circuitry 20 and coil 16 (and any other internal card components) are visible from the front and the rear of the fob 1. Although not specifically stated with respect to FIGS. 16 and 17, it should be understood that the internal circuitry of those exemplary embodiments are also visible from the front and the rear of the fobs depicted, in similar manner as described with respect to FIGS. 15A and 15B. For example, FIG. 16 illustrates RFID circuitry 20 and an antenna coil 16 that may be disposed along the edges of the transparent fob 1. With respect to FIG. 17, a representation of a transparent transaction fob 1 having a RFID circuitry 20 and circular antenna coil 16 is shown. It should be noted that the circular antenna pattern may be incorporated in any location of the transparent fob 1 and should not be limited as described herein with reference to FIG. 17. Also, the RFID circuitry 20 and antenna coil 16 may be as illustrated in FIG. 18, which illustrates circuitry 20 and antenna coil 16 formed in the shape of a rectangle that may be disposed in any location of the transparent fob 1.

IoThe location of the RFID circuitry 20 and antenna coil 16, may in general, be in any location within the transparent fob 1 such that the antenna coil may be sthetically pleasing to a user of thfob 1 or that ovides an optimum or improved signal to an RF-based reader (not shown). For example, since the transaction fofob 1 is transparent, the antenna coil 16 may be readily seen, thereby providing the fob 1 with a unique appearance and design. Alternatively, an antenna coil that is disposed along the periphery of the transparent fob 1 may provide a stronger and clearer signal to the RF-based reader when the fob 1 is brought ithin a specific proximity of the RF-based reader.

In an exemplary process, a user of the RFID reading transparent trtransaction fob 1 simply approaches RF-based reader when the user wishes to conduct a transaction. The user simply waves the transparent trtransaction fob 1 at a certainistance from the RF-based reader until the RF-based reader acknowledges that the information contained in the RFID circuitry has been transferred to the RF-based reader. The RF-based reader then utilizes at least a portion of the information to complete the transaction.

Alternatively, the user of the trtransparent fob 1 may approach representative of a merchant and conduct a transaction. After the memerchant's representative adds e transaction information to the RF-based reader, the user of the transparent trtransaction fob 1 a certain stance from the RF-based reader until the RF-based reader acknowledges that it has received the information contained in the RFID circuitry 20. The transaction then proceeds to completion. A user of the transparent trtransaction fob 1 may never ed to relinquish control ofof the fob 1 to any her individual, such as the merchant's representative, or to any other person. In addition, a signature may not be required. However, a signature may be included, or some other form of authentication may be used for high-risk purchases, for example.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented. In addition, although the present description illustrates the invention as embodied in a card or key fob, the invention is not so limited. That is, the present invention contemplates the incorporation of the inventive technology into a form factor presentable by hand.

It should be noted that although the present invention is described herein with reference to including only one RFID transponder system, one RFID or IC chip, the invention is not so limited. The invention contemplates the inclusion of one or more RFID transponder systems, IC chips or modules, or any combination thereof. For example, the dual transponder chip system disclosed in U.S. patent application Ser. No. 10/302,658, entitled "TRANSACTION CARD WITH DUAL IC CHIPS," filed Nov. 22, 2002, discloses a suitable multi-chip arrangement which may be used with the present invention, and is therefore incorporated by reference in its entirety.

The invention claimed is:

1. A translucent or transparent transaction device comprising:
   a. at least one of a translucent and transparent device layer;
   b. a machine recognizable compound substantially covering said device layer; and
   c. a transponder system positioned within said device layer, said transponder system operable to receive a first RF interrogation signal, authenticate said first RF interrogation signal, and transmit a transponder system account data, said transponder system comprising:
      i. a first transponder responsive to said RF interrogation signal;
      ii. a transponder system authentication circuit in communication with said first transponder; and
      iii. a transponder system database in communication with said first transponder.

2. The transaction device of claim 1, wherein said machine recognizable compound is extrusion coated to said device layer.

3. The transaction device of claim 2, wherein said transponder system comprises a transponder system antenna operable to receive said RF interrogation signal.

4. The transaction device of claim 3, wherein said transponder system antenna is disposed between said machine recognizable compound and said device layer.

5. The transaction device of claim 1, wherein said device layer comprises a plurality of perforations.

6. The transaction device of claim 5, wherein said plurality of perforations forms a pattern in said device layer.

7. The transaction device of claim 5, further comprising a subassembly of film layers, wherein said plurality of perforations extend through said subassembly of film layers.

8. The transaction device of claim 7, wherein said subassembly includes said transponder system, said transponder system comprising a transponder system antenna disposed between at least one of said machine recognizable compound and said device layer, said second layer and said device layer, and said machine recognizable compound and said second layer.

9. The transaction device of claim 1, comprising:
   a. a second transponder system positioned within said device layer, said second transponder system operable to receive a second RF interrogation signal, authenticate the second RF interrogation signal, and transmit the transponder system account data, said second transponder system comprising:
      i. a second transponder responsive to said second RF interrogation signal;
      ii. a second transponder system authentication circuit in communication with at least one of said first transponder and said second transponder; and
      iii. a second transponder system database in communication with said second transponder system authentication circuit.

10. The transaction device of claim 9, wherein said transponder system includes a transponder system protocol/sequence controller in communication with at least one of said first transponder, said second transponder, said transponder system authentication circuit, and said transponder system database, said transponder system protocol/sequence controller configured to control the order of operation of said first transponder, said second transponder, said transponder system authentication circuit, and said transponder system database.

11. The transaction device of claim 10, wherein said transponder system comprises at least one of a first transponder system antenna and a second transponder system antenna, said first transponder system antenna configured to receive said first RF interrogation signal, and said second transponder system antenna configured to receive said second RF interrogation signal.

12. The transaction device of claim 11, wherein at least one of said first transponder system antenna and said second transponder system antenna is disposed between one of said machine recognizable compound and said device layer.

13. The transaction device of claim 10, wherein said transponder system protocol/sequence controller is responsive to at least one of said first RF interrogation signal and said second RF interrogation signal, said transponder protocol/sequence controller controlling the sequence of operation at least one of said transponder system authentication circuit, and said transponder system database, in response to at least one of said first RF interrogation signal and said second RF interrogation signal.

14. The transaction device of claim 13, wherein said transponder system protocol/sequence controller is configured to activate said transponder system authentication circuit in response to said first RF interrogation signal, said transponder system authenticating circuit configured to provide an encrypted RF interrogation signal, said transponder system authentication circuit configured to provide said encrypted RF interrogation signal to said first transponder for providing to a RFID reader.

15. The transaction device of claim 1, wherein said device layer comprises a plurality of layers, in which a first layer comprises a first polymer and a second layer comprises a second polymer.

16. The transaction device of claim 15, wherein said transponder system comprises a transponder system antenna operable to receive said interrogation signal.

17. The transaction device of claim 16, wherein said transponder system antenna is disposed between at least two of said plurality of layers.

18. The transaction device of claim 1, wherein said machine recognizable compound includes at least one of a chemical, solution, dye, layered material, pigment, encapsulated pigment, coating, film, thread, plastic, ink, concentrate, thermoplastic matrix, thermoset matrix, fiber, paper, and planchette.

19. The transaction device of claim 1, wherein said machine recognizable compound includes at least one of invisible, visible and colored compounds.

20. The transaction device of claim 1, wherein said machine recognizable compound includes an infrared ink.

21. The transaction device of claim 1, wherein said machine recognizable compound includes an infrared ink comprising in the range of about 0.001 to 40.0 wt.(%) of an infrared activated material.

22. The transaction device of claim 1, wherein said machine recognizable compound includes an optically recognizable compound.

23. The transaction device of claim 1, wherein said machine recognizable compound is configured to at least one of block, diffuse, reflect, refract and absorb infrared light.

24. The transaction device of claim 1, wherein said machine recognizable compound includes at least one of a binder, UV absorber, reflector, antioxidant, optical brightener, color shifter, chemical configured to improve processing, and chemical configured to adjust rheological properties.

25. The transaction device of claim 1, wherein said machine recognizable compound includes: about 2% by weight of a near infrared dye and about 98% by weight of a solvent evaporative screen ink.

26. The transaction device of claim 1, wherein said machine recognizable compound includes: about 1.5% by weight of a near infrared monovalent ammonium dye, about 96.5% by weight of a solvent evaporative screen ink, and about 2% by weight of a near infrared nickel dithiolene dye.

27. The transaction device of claim 1, wherein said machine recognizable compound includes: about 0.04% by weight of a near infrared dye, about 0.96% by weight of polyvinylchloride plastic, and about 99% by weight of PVC.

28. The transaction device of claim 1, wherein said machine recognizable compound includes PET plastic.

29. The transaction device of claim 1, wherein said machine recognizable compound includes: about 80% by weight of a solvent evaporative screen ink, about 7% by weight of VMCA resin, about 10% by weight of cyclohexanone, and about 3% by weight of a near infrared dye.

30. The transaction device of claim 1, wherein said machine recognizable compound includes: about 55% by weight of vinyl VMCA resin, about 35% by weight of EEP solvent, about 5% by weight of cyclohexanone, about 3% by weight of a near infrared monovalent ammonium dye, and 2% by weight of a near infrared nickel dithiolene dye.

31. The transaction device of claim 1, wherein said machine recognizable compound includes: about 90% by weight of a solvent evaporative screen ink, about 3% by weight of cyclohexanone, about 3% by weight of a near infrared monovalent ammonium dye, about 2% by weight of a near infrared nickel dithiolene dye, and about 2% by weight of a phthalocyanine dye.

32. The transaction device of claim 1, comprising a second transponder responsive to a second RF interrogation signal, said first RF interrogation signal different from said second RF interrogation signal.

33. The transaction device of claim 1, wherein said transponder system database is operable to store at least one of a transponder system identification data, a RFID reader decryption security key, and a transponder system account data.

34. The transaction device of claim 33, wherein said transponder system database is configured to provide said RFID reader decryption security key to said transponder system authentication circuit in response to a encrypted authentication code.

35. The transaction device of claim 1, wherein said transponder system includes an internal power source.

36. The transaction device of claim 35, wherein said transponder system includes a biometric circuit, said biometric circuit in communication with said internal power source.

37. The transaction device of claim 36, wherein said biometric circuit is configured to provide a biometric data verification response, said biometric circuit configured to provide said biometric data verification response to at least one of said RFID reader and a merchant system, wherein said biometric data verification response is an identification verification data.

38. A translucent or transparent transaction device comprising:
   a. at least one of a translucent and transparent device layer;
   b. a machine recognizable compound substantially covering said device layer;
   c. at least one of a holographic foil, an integrated circuit chip, a magnetic stripe, an opacity gradient, embossed characters, signature field, and text and logo; and,
   d. a transponder system including RFID circuitry operable to receive a first RF interrogation signal, and to authenticate said first RF interrogation signal, said transponder system comprising a first transponder responsive to said first RF interrogation signal.

39. The transaction device of claim 38, wherein said machine recognizable compound includes at least one of a coating, film, thread, plastic, ink, fiber, paper, and planchette.

40. A process for fabricating a transparent transaction device at least a portion of which is substantially transmissive to visible light, comprising:
   a. placing machine recognizable compound between at least two layers of PET IR forming a subassembly, wherein the machine recognizable compound substantially covers the layers;
   b. placing the subassembly between at least two layers of polyvinylchloride; and
   c. placing RFID circuitry between at least one layer of the polyvinylchloride and at least one layer of the subassembly.

41. A process for fabricating a transparent transaction device comprising a plurality of layers of PET GS, the method comprising:
   placing infrared blocking film between two layers of PET GS; and
   incorporating RFID circuitry between the two layers,
   wherein the infrared blocking film is substantially coextensive with the two layers.

42. The process of claim 41 comprising chemical deposition by at least one of vacuum coating, solar coating and Magnetron sputtering, providing a laminate, and providing a core layer and adhering the layers of the device with adhesive.

43. A transaction device at least a portion of which is substantially transmissive to visible light, comprising:
   a. at least one of a translucent and transparent device layer
   b. a machine recognizable compound substantially covering said device layer, wherein said machine recognizable compound is substantially transmissive to visible light; and
   c. RFID circuitry positioned within said device layer, said RFID circuitry including a transponder responsive to a first interrogation signal.

44. A transaction device at least a portion of which is substantially transmissive to visible light, comprising:
   a. at least one of a translucent and transparent device layer;
   b. at least one of a holographic foil, an integrated circuit chip, a magnetic stripe, an opacity gradient, embossed characters, signature field, text and logo;
   c. a machine recognizable compound substantially covering said device layer, wherein said machine recognizable compound is substantially transmissive to visible light; and
   d. RFID circuitry positioned within said device layer, said RFID circuitry including a transponder responsive to a first interrogation signal.

45. A process for fabricating a transparent transaction device at least a portion of which is substantially transmissive to visible light, comprising:

a. placing machine recognizable compound between at least two layers of PET IR forming a subassembly, wherein the machine recognizable compound substantially covers the layers; and b. placing RFID circuitry between at least one layer of the PET and the machine recognizable compound.

* * * * *